(12) United States Patent
Chaffee et al.

(10) Patent No.: US 7,983,769 B2
(45) Date of Patent: Jul. 19, 2011

(54) TIME STAMPED MOTION CONTROL NETWORK PROTOCOL THAT ENABLES BALANCED SINGLE CYCLE TIMING AND UTILIZATION OF DYNAMIC DATA STRUCTURES

(75) Inventors: Mark A. Chaffee, Chagrin Falls, OH (US); Kendal R. Harris, Mentor, OH (US); John M. Keller, Wauwatosa, OH (US); Juergen K. Weinhofer, Mequon, WI (US); Donald A. Westman, Mentor on the Lake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1692 days.

(21) Appl. No.: 11/241,539

(22) Filed: Sep. 30, 2005

(65) Prior Publication Data

US 2006/0109376 A1 May 25, 2006

Related U.S. Application Data

(60) Provisional application No. 60/630,415, filed on Nov. 23, 2004, provisional application No. 60/685,583, filed on May 27, 2005.

(51) Int. Cl.
*G05B 13/02* (2006.01)
*G05B 19/18* (2006.01)
*G05B 19/42* (2006.01)
*G06F 19/00* (2011.01)
*G06F 17/50* (2006.01)

(52) U.S. Cl. .............. 700/29; 700/61; 700/86; 700/170; 700/182; 703/19

(58) Field of Classification Search ............ 700/29, 700/61, 86, 170, 182; 348/423.1, 700; 386/78; 703/19

See application file for complete search history.

(56) References Cited

U.S. PATENT DOCUMENTS

| 4,333,153 | A | * | 6/1982 | Mletzko et al. ............... 358/474 |
| 5,204,942 | A | | 4/1993 | Otera et al. |
| 5,391,970 | A | | 2/1995 | Chaffee et al. |
| 5,442,565 | A | * | 8/1995 | Galel ........................... 700/160 |

(Continued)

FOREIGN PATENT DOCUMENTS

EP 0903655 A 3/1993

(Continued)

OTHER PUBLICATIONS

European Search Report Dated Oct. 28, 2009 for European Patent Application No. EP 05 02 5479, 8 pages.

(Continued)

*Primary Examiner* — Albert Decady
*Assistant Examiner* — Jason Lin
(74) *Attorney, Agent, or Firm* — Turocy & Watson LLP; R. Scott Speroff; John M. Miller

(57) ABSTRACT

A system that enables controlling motion over a network comprises an interface that receives motion control data that includes a time stamp from the network. Additionally, the system includes a motion control component that utilizes the received motion control data to update properties associated with the motion control component based at least in part on the time stamp. The system can also include a clock that is synchronized with disparate clocks associated with disparate motion control components located on the network.

44 Claims, 22 Drawing Sheets

U.S. PATENT DOCUMENTS

| | | | |
|---|---|---|---|
| 5,508,596 | A | 4/1996 | Olsen |
| 5,533,695 | A * | 7/1996 | Heggestad et al. ............ 246/62 |
| 5,566,180 | A | 10/1996 | Eidson et al. |
| 5,887,029 | A * | 3/1999 | Husted et al. ................ 375/224 |
| 6,037,738 | A | 3/2000 | Morita et al. |
| 6,173,207 | B1 * | 1/2001 | Eidson ........................... 700/14 |
| 6,411,770 | B1 | 6/2002 | Ito et al. |
| 6,411,987 | B1 | 6/2002 | Steger et al. |
| 6,487,680 | B1 | 11/2002 | Skazinski et al. |
| 6,505,247 | B1 | 1/2003 | Steger et al. |
| 6,513,058 | B2 | 1/2003 | Brown et al. |
| 6,609,080 | B1 | 8/2003 | Syrijarinne |
| 6,697,681 | B1 | 2/2004 | Stoddard et al. |
| 6,698,022 | B1 | 2/2004 | Wu |
| 6,898,759 | B1 | 5/2005 | Terada et al. |
| 6,983,393 | B2 | 1/2006 | Truchard et al. |
| 6,998,996 | B1 | 2/2006 | Eidson |
| 7,042,834 | B1 | 5/2006 | Savage |
| 7,194,027 | B2 | 3/2007 | Kim et al. |
| 7,310,678 | B2 | 12/2007 | Gunaseelan et al. |
| 7,369,904 | B2 * | 5/2008 | Amrhein et al. ............... 700/29 |
| 2002/0064157 | A1 | 5/2002 | Krause |
| 2002/0110155 | A1 * | 8/2002 | Pearce et al. ................. 370/519 |
| 2002/0131451 | A1 | 9/2002 | Franke et al. |
| 2002/0131454 | A1 * | 9/2002 | Franke et al. ................ 370/503 |
| 2003/0234817 | A1 * | 12/2003 | Weinhofer et al. ........... 345/771 |
| 2004/0030452 | A1 * | 2/2004 | Graf et al. ..................... 700/245 |
| 2004/0148037 | A1 * | 7/2004 | Frampton et al. ............... 700/29 |
| 2004/0199290 | A1 * | 10/2004 | Stoddard et al. ............... 700/248 |
| 2004/0225382 | A1 | 11/2004 | Brown et al. |
| 2004/0258097 | A1 | 12/2004 | Arnold et al. |
| 2004/0267395 | A1 * | 12/2004 | Discenzo et al. ................ 700/99 |
| 2005/0004707 | A1 * | 1/2005 | Kazi et al. ..................... 700/245 |
| 2005/0083970 | A1 | 4/2005 | Glickman et al. |
| 2006/0164771 | A1 | 7/2006 | Heidepriem |
| 2006/0185502 | A1 | 8/2006 | Nishitani et al. |

FOREIGN PATENT DOCUMENTS

| | | |
|---|---|---|
| EP | 0 903 655 A | 3/1999 |

OTHER PUBLICATIONS

OA dated Oct. 30, 2009 for U.S. Appl. No. 11/536,870, pp. 32.
European Search Report dated Oct. 28, 2009 for European Application No. 05025479.6/2206/1659465, 8 pages.
EP OA dated Jun. 16, 2010 for European Patent Application No. 05025479.6-2206, 6 pages.
OA dated May 12, 2010 for U.S. Appl. No. 11/536,870, 46 pages.
European Search Report dated Nov. 24, 2010 for EP Application No. EP 07 11 6611, 6 pages.
Notice of Allowance dated Oct. 29, 2010 for U.S. Appl. No. 11/536,870, 90 pages.

* cited by examiner

TIME STAMPED MOTION CONTROL NETWORK PROTOCOL THAT ENABLES BALANCED SINGLE CYCLE TIMING AND UTILIZATION OF DYNAMIC DATA STRUCTURES

CROSS-REFERENCE TO RELATED APPLICATIONS

This application claims the benefit of U.S. Provisional Patent application Ser. No. 60/630,415 entitled "CIP-BASED MOTION CONTROL SYSTEM" which was filed Nov. 23, 2004 and U.S. Provisional Patent application Ser. No. 60/685,583 entitled "DRIVE ACCESS OBJECT" which was filed May 27, 2005. The entireties of the aforementioned applications are herein incorporated by reference.

TECHNICAL FIELD

The subject invention relates to industrial control systems and, more particularly, to enabling motion control utilizing a time stamping protocol over a network.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Oftentimes, such as in the case of automobiles, complex assemblies can be manufactured with high technology robotics assisting the industrial control process.

Control systems can be employed to control motion related to machines such as robots. Many of these systems include a source that commands motion in a target system. For example, a source (e.g., controller) can be utilized to move a target (e.g., drive, motor, . . . ). Motion control can be effectuated by regularly updating command data sent from a controller to a drive and actual data sent from the drive to the controller. Conventional motion control networks employ a precise, time synchronized exchange of data between a controller and multiple drive devices in order to achieve high performance coordinated motion. Traditional network solutions use a time slot approach where the network update cycle is divided into time slots. Each node within the network then utilizes a corresponding assigned time slot to transmit its data.

Utilization of the time slotting approach is problematic when employed in connection with an open standard network such as Ethernet. For example, restricting when a node can communicate over the network violates standard Ethernet protocol, and thus, typically requires these motion control protocols to either remain isolated from the general network or apply a gateway device. Additionally, the time slot protocols require extensive configuration and arbitration to setup and are typically not able to be modified while the network is operational. Thus, nodes cannot be added or removed from the network during runtime, which leads to costly downtime associated with updating the network. Further, devices adopting a time slot protocol are constrained to operate in synchrony with a controller's update cycle; thus, a drive device is constrained to a set of update frequencies that are an integer multiple of the controller's update period.

Traditional motion control techniques additionally do not allow communication of non-motion control data over the network, since the time slotting methods tend schedule the network's entire bandwidth. Conventional motion control network protocols can configure or negotiate a specific time slot for each drive node to send its actual data and then a time slot for a controller to send command data. According to some protocols, a portion of the update cycle can be reserved for passing non-motion control data. However, non-motion nodes typically cannot coexist on the network since they would interfere with transmissions associated with the motion specific time slot scheduling. Thus, non-motion messages can only be passed through the network via a gateway that delays its transmission until the non-motion message time slot is available.

Moreover, motion control networks have conventionally been constrained by data structures that are fixed in size and content. Such constraints are due in part to the time slot protocols used by these networks to provide time synchronization and deterministic data transfer. If a data structure exceeds the size limit associated with the associated time slot, the transmission may collide with data from a network node assigned to the next time slot. Current motion control protocols define fixed size data structures at configuration time that typically cannot be changed at runtime, since the time slotting is determined based on the size of the data packets passed between the drive(s) and controller nodes. Accordingly, network bandwidth is wasted due to the data packets oftentimes being an improper size (e.g., if a data packet is too large then extra "pad" data is transmitted over the network, if a data packet is too small then multiple transmissions may be required to convey the data).

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter described herein relates to enabling motion control over a network via utilizing a time stamping protocol in an industrial automation environment. A controller and a drive can communicate via an open network that supports motion control. For example, the controller and drive can communicate over an Ethernet based network. Motion related communications can be generated by the controller and/or the drive. The drive, for instance, can measure associated physical properties (e.g., actual data) and the controller can produce commands (e.g., command data) that can be effectuated by a particular drive. The motion related data can include a time stamp that can be associated with a time that a measurement was taken (e.g., actual data) and/or a time that the data is to be effectuated (e.g., command data). Additionally, each node (e.g., controller, control axis object, drive, drive axis object, . . . ) within the motion control network can utilize a clock that can be synchronized with other disparate clocks associated with disparate network nodes. Thus, the nodes within the motion control network can obtain a common understanding of time. Utilizing the network time, a drive can effectuate new commands, which can be associated with received command data, at a time associated with the time stamp. Additionally, the drive can include a time stamp associated with a time that a measurement is taken with actual data that can be thereafter transferred to a controller to be analyzed.

According to an aspect, a balanced update cycle can be employed such that motion related data and non-motion related data can be transmitted over a network. For example, an update cycle can be divided into disparate intervals such as an input transfer interval, a calculation interval, and an output transfer interval. The motion related data can be transferred during the input transfer interval (e.g., transmit actual data from a drive to a controller) and/or during the output transfer interval (e.g., transmit command data from a controller to a drive). During these intervals, the motion related data can be assigned a higher priority as compared to non-motion related data. Thus, if both motion related data and non-motion related data are transmitted over the network during these intervals, the higher priority motion related data can be queued before the non-motion related data to facilitate delivery of the motion related data with minimum latency. Additionally, during the calculation interval, the controller can evaluate the received actual data, and further, the lower priority non-motion data that was queued to transmit after the motion input data can then be transmitted over the network, while transmission of motion related data is quiescent. Thus, lower priority non-motion data packet traffic is naturally reorganized to transmit during the calculation interval in the middle of the update cycle. Division of an update cycle into distinct intervals, while not utilizing time slotting to assign a particular node to a particular time during which to transfer data, enables the motion control data and the non-motion control data to be transmitted over the same network and mitigates the motion control data from utilizing all or a majority of the network's resources.

Moreover, dynamic data associated with any size and/or structure can be utilized in connection with the time stamping protocol of the claimed subject matter described herein. For instance, the data structure can vary in size and/or content from update to update. According to an example, the data can include information in a header of a data packet that describes that structure and enables a receiving node to utilize the received data.

Utilization of time stamp motion control data improves efficiency of a motion control network as opposed to time slotting protocols. For instance, time stamping enables employing variable sized data packets; thus, additional data and/or packets need not be transferred over the network as is often the case with the fixed data structures associated with time slotting techniques. Additionally, complexity can be reduced via utilizing a time stamping protocol. Further, nodes can be added and/or removed from the motion control network when the time stamping protocol is utilized.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
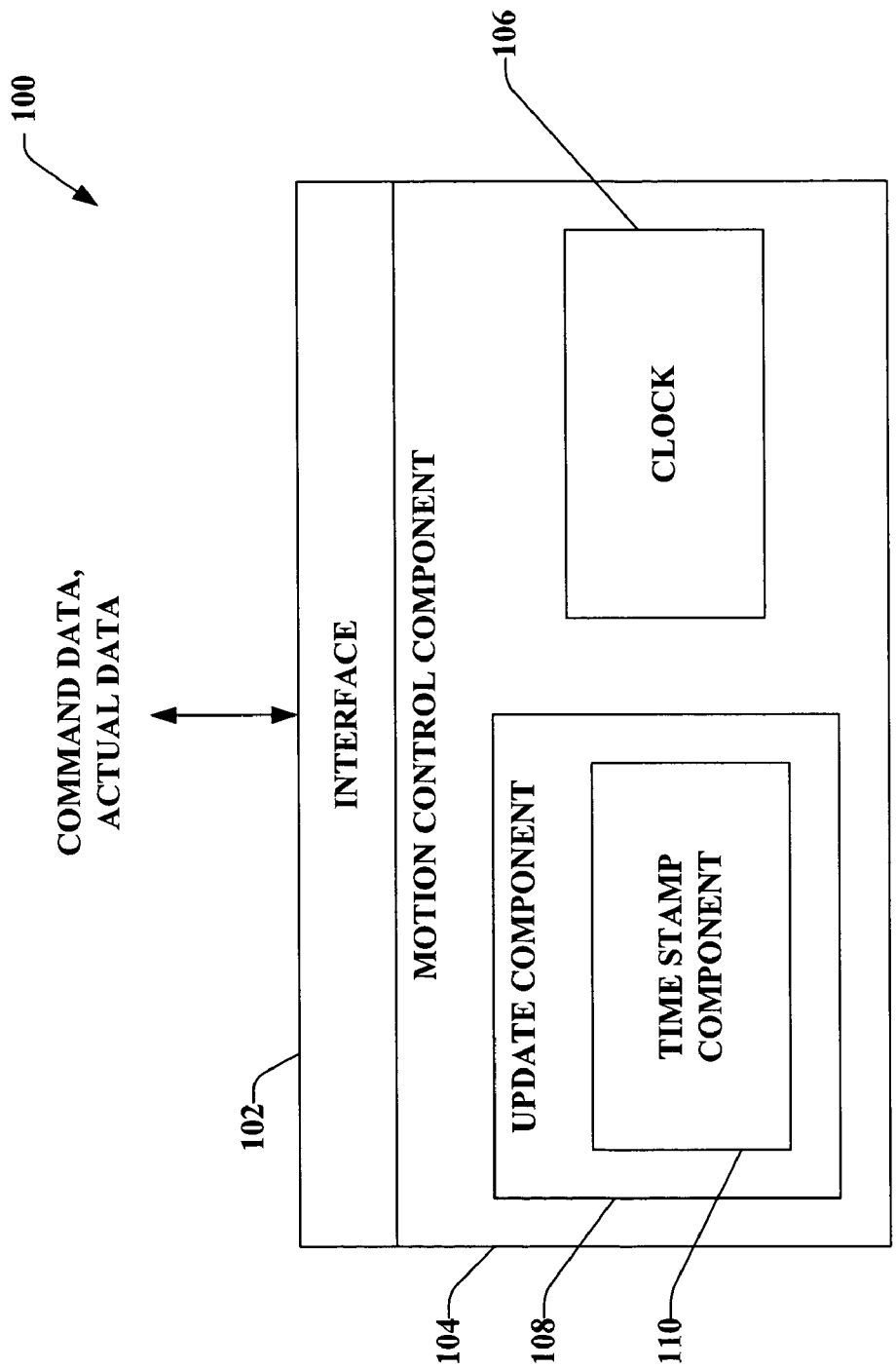
FIG. 1 illustrates a system that utilizes a time stamping scheme to facilitate controlling motion in an industrial automation environment.

Appendix A describes various exemplary aspects associated with time stamping motion control—this appendix is to be considered part of the specification of the subject application.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that utilizes a time stamping scheme to facilitate controlling motion in an industrial automation environment. The system 100 includes an interface 102 that receives and/or transmits data over a motion control network (not shown). The interface 102 provides the data to a motion control component 104, which employs the received data and produces an output that can thereafter be transmitted back over the network to a disparate motion control component (not shown). The motion control component 104 includes a clock 106 and an update component 108 that utilizes a time stamp component 110.

The interface 102 can be communicatively coupled to a network and can receive and/or transmit data via that network. The interface 102 can be hardware, software, or a combination thereof. Additionally, the interface 102 can be a wired connection, a wireless connection, a port, etc. The interface 102 obtains data from and/or provides data to the network, which can be an open standard network such as, for example, an Ethernet based network. Additionally, the network can be a DeviceNet and/or a ControlNet network; however, the claimed subject matter is not so limited to such examples. The network can be any network that supports motion control (e.g., Common Industrial Protocol (CIP) network). Any type of data can be received and/or provided by the interface 102. For example, command data and/or actual data (e.g., actual data associated with a drive such as actual primary position, actual secondary position, actual velocity, actual acceleration, actual torque, actual current, actual voltage, actual frequency, . . . ) can be transceived by the interface 102. By way of further illustration, input/output data, human machine interface data, streaming video data, messaging data, and the like can also be exchanged via the interface 102.

The interface 102 is communicatively coupled to the motion control component 104. The motion control component 104 is associated with a node in a motion control network. For example, the motion control component 104 can be a controller, a drive, a control axis object, a drive axis object, etc. A drive can be a device that is designed to control dynamics of a motor. A control axis object can be an object that defines attributes, services, and behaviors of a controller based axis. Additionally, a drive axis object can be an object that defines attributes, services, and behaviors of a drive based axis. An axis can be a logical element of a motion control system that exhibits some form of movement. Axes can be rotary, linear, physical, virtual, controlled, observed, etc. The objects can utilize a motion standard such as, for example, the Common Industrial Protocol (CIP) Motion standard. It is contemplated that a network can include any number of disparate motion control components in addition to and similar to motion control component 104, where each motion control component is associated with a disparate node of the network.

The motion control component 104 includes the clock 106. The clock 106 can be synchronized with all other clocks associated with disparate motion control components located at various nodes within the motion control network. Alternatively, a subset of all of the nodes in the network can have their clocks synchronized together, for instance. The IEEE 1588 precision time protocol, for example, can enable synchronization of the clock 106 with clocks associated with other networks nodes. Other protocols that are contemplated to synchronize the clock 106 are NTM, NTP, etc.; however, the herein appended claims are not so limited. By synchronizing the clock 106 with other nodes, a common understanding of time exists across the network. By way of example, the clock 106 can be synchronized with disparate clocks in the network such that the accuracy can be in the range of nanoseconds (e.g., accuracy to 50-100 nanoseconds). The clock 106 can be synchronized by receiving a multicast packet via the interface 102. According to an example, the multicast packet can include a time stamp that is transmitted over the motion control network every millisecond, every two milliseconds, etc. The clock 106 can obtain the multicast packet and synchronize to the time stamp. Additionally, the clock 106 can compensate for network delays when synchronizing to the received multicast packets.

The motion control component 102 also includes the update component 108 which can modify properties associated with the motion control component 104. By way of illustration, the update component 108 can facilitate modifying commands that are utilized by the motion control component 104, generating commands that are to be utilized by a disparate motion control component, updating measured data associated with the motion control component 104, etc. For example, the motion control component 102 can be a drive and/or drive axis object that can receive a new set of command data generated by a controller. The command data can be received by the interface 102 and processed by the update component 108. By way of illustration, the command data can indicate that the drive should be associated with a particular position, velocity, torque, etc., and the update component 108 can effectuate carrying out such modifications. Additionally, the update component 108 can measure actual data associated with the drive and send the actual data to a controller and/or a control axis object over the network via the interface 102. Pursuant to another illustration, the motion control component 104 can be a controller and/or control axis object that receives actual data via the interface 102 from a drive and/or drive axis object. Accordingly, the controller and/or control axis object can generate command data based on an evaluation of the received actual data associated with the drive by utilizing the update component 108. Thereafter, the command data can be sent over the network to the appropriate drive and/or drive axis object via the interface 102 to effectuate such variations.

The update component 108 can utilize the time stamp component 110 to effectuate updating the motion control component 104 and/or corresponding data. The time stamp component 110 can incorporate a time stamp into data that is generated for transfer over the network via the interface 102. Additionally or alternatively, the time stamp component 110 can evaluate data received via the interface 102 to identify a time stamp associated with the data. Including the time stamp with the data allows the data to be delivered without rigid data delivery timing. Time is conveyed explicitly by incorporating the time stamp into the data. When new data is received by the motion control component 104, the update component 108 can utilize the data at an appropriate time corresponding to the time stamp identified by the time stamp component 110 by comparing the time stamp value to the time identified by the clock 106. Additionally, the time at which a measurement is taken as indicated by the clock 106 can be incorporated into actual data by the time stamp component 110. By contrast, conventional time slot protocols convey time implicitly as part of the update cycle. This typically necessitates rigid or "hard" synchronization of the motion control components. If data associated with a time slot protocol is late, the data is effectively lost since it is no longer related to its original update cycle or time slot.

Incorporation of a time stamp into data transferred over the system 100 mitigates the need to schedule transmissions over the motion control network into time slots as is common with conventional techniques. Accordingly, the time stamping protocol does not require complex configuration and negotiation of individual time slots within a cycle during which times particular nodes are allowed to communicate. Additionally, by time stamping data sent over the network, scheduling requirements are not imposed on the network, and thus, motion control can operate on a network that also includes non-motion network traffic.

Figure 2:
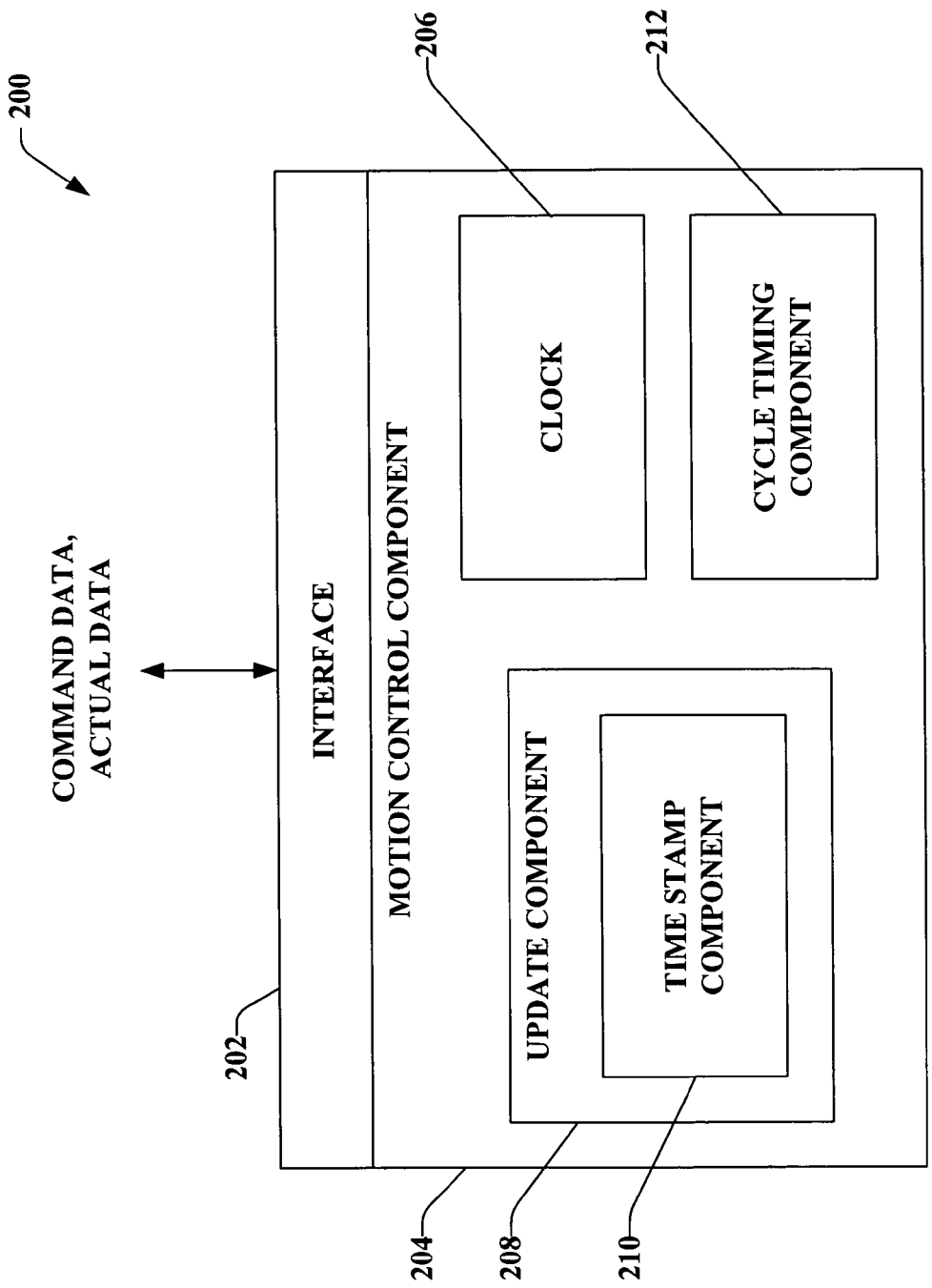
FIG. 2 illustrates a system that enables balancing utilization of network resources in a motion control network.

Turning to FIG. 2, illustrated is a system 200 that enables balancing utilization of network resources in a motion control network. The system 200 includes an interface 202 that receives and/or transmits command data, actual data, non-motion related data, etc. over a network to other nodes. The interface 202 is coupled to a motion control component 204, which includes a clock 206 and an update component 208. The motion control component 204 can be hardware and/or an object associated with a node in a motion control network. The update component 208 can facilitate updating commands and/or data associated with the motion control component 204. The update component 208 further comprises a time stamp component 210 which can incorporate a time stamp into data and/or evaluate a time stamp that is associated with data.

The motion control component 212 additionally includes a cycle timing component 212 which enables dividing a connection update period into distinct intervals. For example, the connection update period can be divided into three distinct intervals: an input transfer interval, a calculation interval, and an output transfer interval. By way of illustration, the clock 206 can identify a current time, which is uniform across the nodes of the motion control network. The cycle timing component 212 can determine an interval that corresponds to the current time and accordingly enable the motion control component 204 to effectuate particular actions. Even though depicted as being included in the motion control component 204, it is contemplated that the cycle timing component 212 can be separate from the motion control component 204, included in only a portion of the motion control components in a motion control network, etc.

According to an illustration, the cycle timing component 212 can recognize that the current time is within an input transfer interval. Thus, the cycle timing component 212 can enable data to be transmitted over the network via the interface 202 from a drive and/or drive axis object to a controller and/or control axis object. Hence, if the motion control component 204 is a drive and/or a drive axis object, the cycle timing component 212 can enable the interface 202 and/or the motion control component 204 to transmit actual data during this time interval to a controller and/or control axis object.

Pursuant to a further example, the cycle timing component 212 can identify a calculation interval and/or an output transfer interval. During a calculation interval, a controller processes drive input data received during the input transfer interval and computes new output data to send back to the drives. Transmission of this data can be initiated by the end of the computation interval. Additionally, during the output transfer interval, output data packets can be sent to the drives and can arrive prior to the start of the next connection update cycle.

The cycle timing component 212 can enable drive nodes (e.g., motion control component 204, disparate motion control components) within the motion control network to transmit actual data at a similar time and/or simultaneously rather than scheduling each node to transmit data at a disparate time according to a time slotting technique. If the cycle timing component 212 is employed in connection with a switched full duplex Ethernet, more efficient use of the network bandwidth is provided by packing drive packets back to back over a network segment between a central switch and a controller as opposed to utilizing a time slotting technique. Additionally, the packets can be separated by the network's inter-packet gap by employing the time stamping protocol. In comparison, time slot protocols require additional margin between transmitted packets to accommodate effects of time-base skew and/or other latencies.

Utilization of the cycle timing component 212 enables non-motion related data (e.g., input/output data, human machine interface data, streaming video data, controller to controller explicit or implicit messaging data, . . . ) to be transmitted over the network in addition to the motion related data (e.g., command data, actual data, . . . ). For example, the cycle timing component 212 can facilitate identifying that a current time is associated with a calculation interval. Prior to the calculation interval, input data (e.g., actual data) can arrive at the controller(s) from the drive(s). During the calculation interval, lower priority data (e.g., non-motion related data) can be communicated across the network.

Also during the calculation interval, the controller(s) (e.g., motion control component 204) can evaluate the input data and compute new command positions for the drive nodes. The input data can be evaluated since oftentimes there is a gearing and/or camming relationship between master drives and slave drives. Thus, for a new command to be calculated for a slave drive, the current position of the master drive is determined.

The update cycle can be partitioned into thirds with the cycle timing component 212, for instance; however, any partition can be utilized and thus the subject claims are not limited to this example. According to this example, the first third can be for input traffic from drive(s) to the controller and the last third can be for data to be transferred from the controller to drive(s). During the calculation interval, lower priority non-motion data can be sent to and from various nodes in the network.

According to an example, the motion control packets can be associated with a highest priority for transfer over the network and non-motion related packets can be associated with lower priorities. Transmitting drive packets simultaneously can enable effective use of Quality of Service (QoS) functionality built into an Ethernet switch to defer transmission of lower priority non-motion packets until after time critical high priority drive packets have been transmitted to the controller. The non-motion packets can then be transmitted during the calculation interval when the controller is performing calculations. This segregation of motion and non-motion packets can be effectuated automatically without utilizing a particular time slot during which time certain packets are to be transmitted.

When the cycle timing component 212 identifies an end of a calculation interval, the motion control packets can be sent out over the network to the drive(s). Thus, new command data is provided to the drive(s) for use during a next cycle. The cycle timing component 212 can support drive devices that have synchronization services and drive devices that do not have synchronization services. For example, drives that are synchronized can send data to a controller without controller intervention by utilizing a timer event. Pursuant to another example, drives without synchronization can wait for a command update from the controller before sending actual data back to the controller.

The cycle timing component 212 can enable utilizing a single cycle timing model. For instance, a master actual position capture through a slave command position delivery can be completed in a single cycle via the cycle timing component 212. By contrast, conventional techniques associated with time slotting typically employ a two-cycle timing model since time slotting protocols commonly allow no time for actual position data to be processed and new command data to be transmitted before the controller's command data is transmitted.

Figure 3:
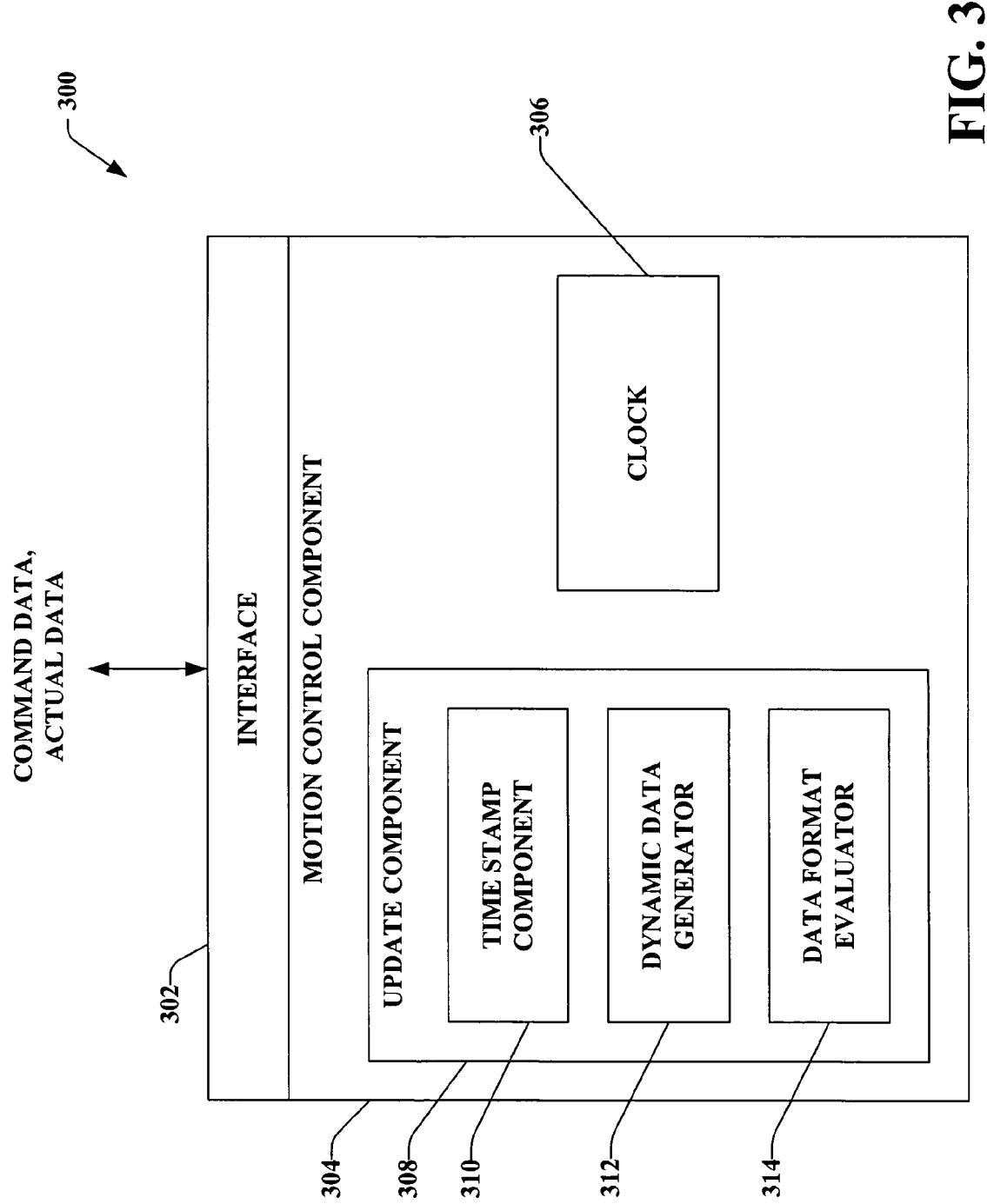
FIG. 3 illustrates a system that enables transferring dynamically structured data in a motion control network.

Turning to FIG. 3, illustrated is a system 300 that enables transferring dynamically structured data in a motion control network. The system 300 includes an interface 302 that receives and/or transmits data over a network (e.g., Ethernet, DeviceNet, ControlNet, . . . ) and a motion control component 304 (e.g., controller, control axis object, drive, drive axis object, . . . ) that is associated with a particular node within the motion control network. The motion control component 304 includes a clock 306 which is synchronized with other clocks that are associated with disparate motion control components (not shown) within the motion control network to provide a common understanding of time. The motion control component 304 further includes an update component 308 which enables updating commands and/or data associated with the motion control component 304. The update component 308 can include a time stamp component 310, a dynamic data generator 312, and a data format evaluator 314.

The update component 308 can update commands associated with the motion control component 304 (e.g., drive, drive axis object, . . . ), for example, based on received command data generated by a controller located at a remote node within the motion control network. Additionally or alternatively, the update component 308 can be employed to measure properties (e.g., position, velocity, torque, . . . ) associated with the motion control component 304 (e.g., drive, drive axis object, . . . ), which can thereafter be transmitted to a disparate motion control component located at a different node on the motion control network. Further, the update component 308 can be utilized to analyze actual data received by the motion control component 304 (e.g., controller, control axis object, . . . ) from any number of drives located at various nodes within the motion control network to generate command data. This command data can be transmitted to corresponding drives and/or drive axis objects. The data generated by the motion control component 304 and/or the update component 308 includes a time stamp, which can be incorporated into a packet via the time stamp component 310. Additionally, the time stamp component 310 can evaluate the time stamp to enable performing an action at a particular time as determined by the clock 306.

The update component 308 includes the dynamic data generator 312 which produces dynamic data that can be associated with any size and/or content. The data structure can vary in size and/or content from update to update. The dynamic data generator 312 can include a description of the structure within the data. For example, the dynamic data generator 312 can include information in a data block header that indicates the structure of the data.

Additionally, the dynamic data generator 312 can generate data blocks with disparate levels of priority within a single dynamic data packet. The level of priority can determine the rate at which the data is applied at a drive (e.g., via a receiving motion control component). For example, the dynamic data generator 312 can produce a cyclic data block with a high priority, an event data block with a medium priority, and a service data block with a low priority. Combining these three data blocks within a single dynamic data packet yields efficient use of Ethernet bandwidth as compared to sending individual packets for each type of data.

The cyclic data can be high priority real-time data that can be transferred by a CIP Motion connection on a periodic basis. The event data can be medium priority real-time data that can be transferred by a CIP Motion connection after a specified event occurs. The event can be, for instance, registration, market input transactions, etc. The service data can be lower priority real-time data that can be transferred by a CIP Motion connection on a periodic basis when requested by a controller. The service data can include service request messages to access drive axis object attributes, run a drive based motion planner, perform drive diagnostics, etc.

The update component 308 additionally includes the data format evaluator 314 which can be utilized to evaluate data received via the interface 302 from a disparate node within the motion control network to determine the formatting. For example, the dynamic data that is received can include offsets in a header to enable disparate data blocks, having different processing priority, to be copied to fixed address buffers (not shown) within the motion control component 304 (e.g., controller, drive, . . . ). The data format evaluator 314 can facilitate understanding the structure of a received data packet, which can thereafter be employed by the update component 308.

The size of a data packet can vary between updates for a number of reasons. For example, the operating mode of a drive can change such as from a position loop controller to a torque loop controller. Different data is required for each of these disparate operating modes and accordingly the data size will vary when a change occurs. Additionally, the size of the packet can change when periodic information is provided from a drive to a controller (e.g., diagnostic information, data associated with trending a position error of a drive, . . . ). Accordingly, the dynamic data generator 312 can add this information to the transmitted data Conventional motion control protocols utilize fixed size data structures at configuration time that cannot be changed at run time. Thus, network bandwidth tends to be wasted since fixed portions of the data structure are associated with event data and service data that are transferred infrequently. On the contrary, a flexible, dynamic format for the data transmitted over the network is provided by utilizing the dynamic data generator 312 and/or the data format evaluator 314.

Figure 4:
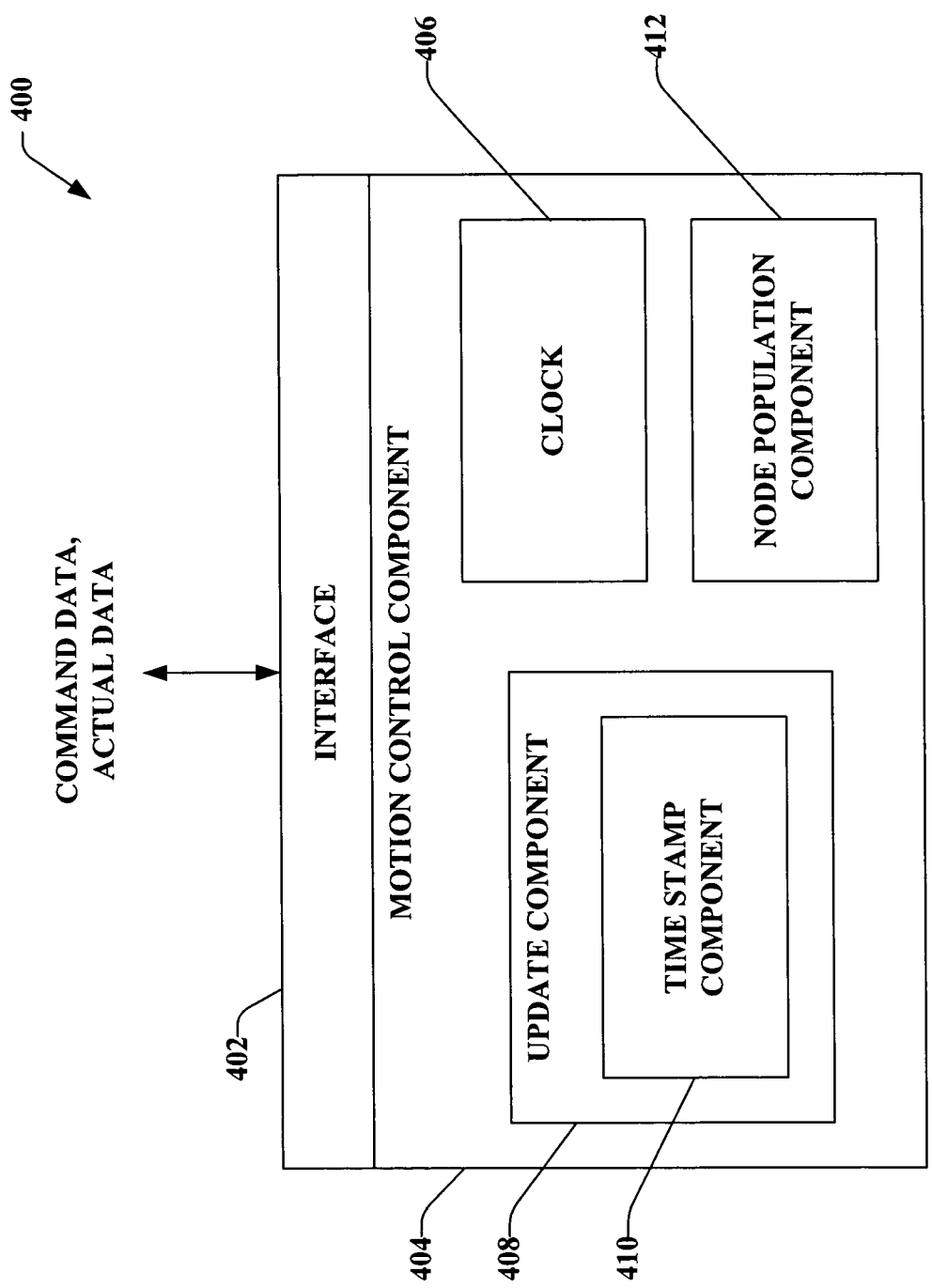
FIG. 4 illustrates a system that facilitates adding and/or removing a node from a motion control network.

Turning to FIG. 4, illustrated is a system 400 that facilitates adding and/or removing a node from a motion control network. The system 400 includes an interface 402 that receives and/or transmits communications over the network. For example, actual data, command data, and/or non-motion related data can be sent and/or obtained via the interface 402. The system 400 additionally includes a motion control component 404, which can be associated with a node within the motion control network. For example, the motion control component 404 can be a controller, a control axis object, a drive, a drive axis object, etc. Pursuant to an illustration, if the motion control component 404 is a drive, it can effectuate controlling the dynamics of a motor. According to another aspect, the motion control component 404 can be a controller that can generate command data that can be transmitted to drives and/or drive axis objects located at remote nodes in the network via the interface 402.

The motion control component 404 includes a clock 406 that is synchronized with clocks associated with disparate motion control components (not shown) to provide a common understanding of time throughout the network. Additionally, the motion control component includes an update component 408 which facilitates updating commands, data, etc. associated with the motion control component 404. For example, the motion control component 404 can be a drive that receives command data for a particular update cycle via the interface 402 from a controller located at a disparate network node. The update component 408 can enable modifying the commands associated with the drive to conform to the received command data. The received command data generated by a controller can have an associated time stamp that indicates a time when the command data is to be applied to a control loop. Thus, the update component 408 can utilize a time stamp component 410 that evaluates the time stamp associated with the received command data. Utilization of the time stamp component 410 enables a motion control component (e.g., motion control component 404, drive, drive axis object, . . . ) at a consuming node to receive command data with the time stamp, and even if the data arrives late due to latencies on the network, the motion control component 404 can compensate for the latencies of the data and apply the data in an appropriate fashion to a control loop. Thus, the time stamp protocol allows for receipt of late data and enables applying the late data, whereas conventional time slotting protocols that are hard synchronized typically do not tolerate late data and therefore commonly discard such late data. Additionally, the time stamp component 410 can incorporate a time stamp into actual data that is to be sent from a drive to a controller. In such a case, the time stamp can be related to the time when the data was captured.

The motion control component 404 additionally can include a node population component 412, which can support adding and/or removing nodes (e.g., disparate motion control components at various remote network locations) from the motion control network. By way of example, a new drive node can be added to a network and the node population component 412 can facilitate instantiating a new control axis object in a controller assigned to the new drive node address. It is to be appreciated that the new drive node can be added to the network subsequent to network configuration. In comparison, conventional techniques do not support adding or removing nodes after a configuration tool has scheduled a motion control update cycle to permit certain nodes to communicate within certain time slots. Thus, the conventional techniques typically required reconfiguring of a time slot mapping to enable changing the number of nodes within the network. In contrast, the node population component 412 allows nodes to be added to and/or removed from the network subsequent to configuration and/or while the network is operational. Although depicted as being comprised in the motion control component 404 (e.g., controller), it is to be appreciated that the node population component 412 can be a stand alone component, located anywhere within a motion control network, a combination thereof, etc.

Figure 5:
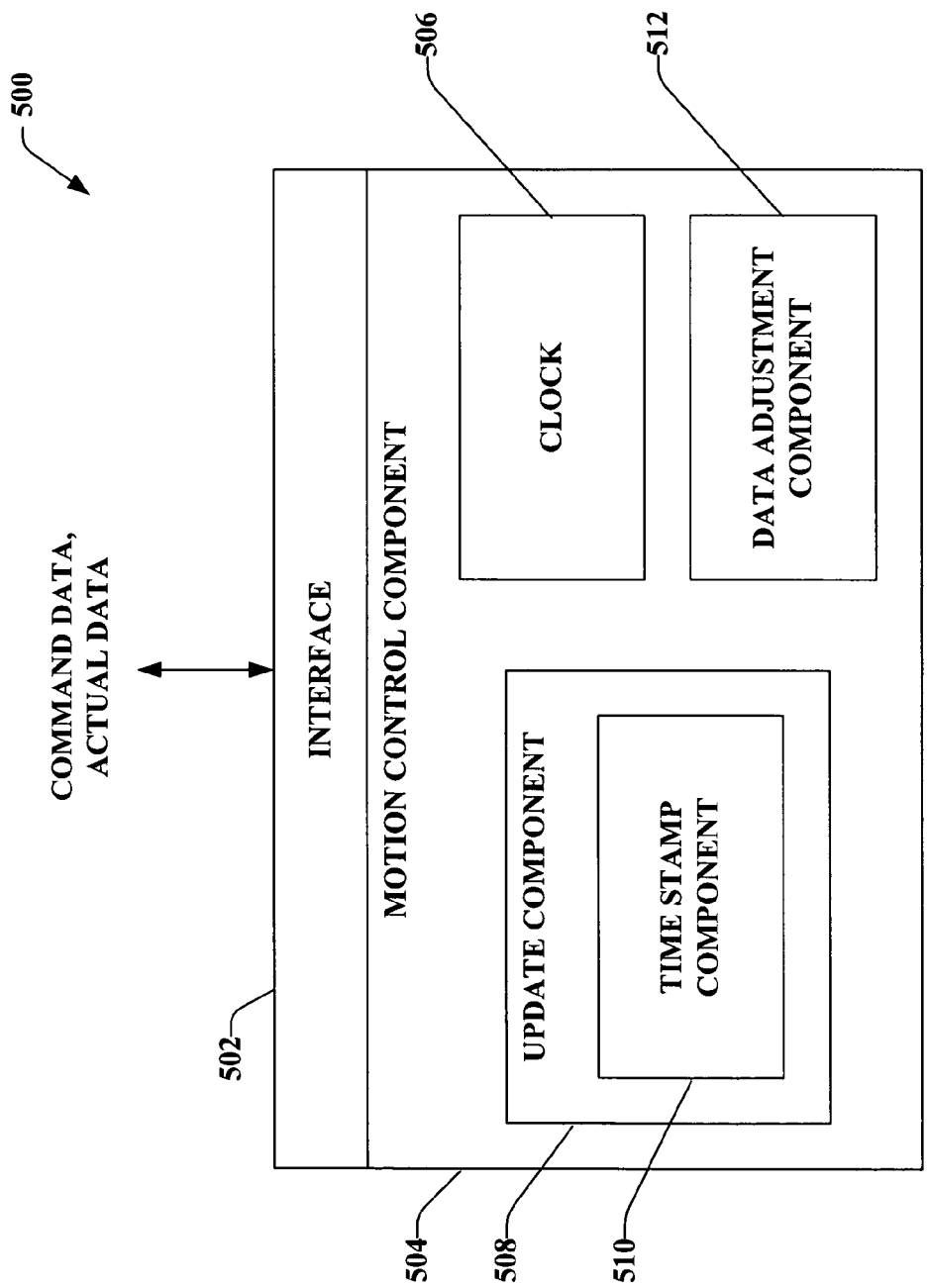
FIG. 5 illustrates a system that enables controlling motion over an open network in an industrial automation environment.

With reference to FIG. 5, illustrated is a system 500 that enables controlling motion over an open network in an industrial automation environment. The system 500 includes an interface 502 that receives and provides data (e.g., command data, actual data, . . . ) with a time stamp to a motion control component 504 (e.g., drive, drive axis object, controller, control axis object, . . . ). The motion control component 504 can include a clock 506 that is synchronized to other clocks within the motion control network. Additionally, the motion control component 504 can include an update component 508 that includes a time stamp component 510 that evaluates and/or includes the time stamp associated with data that is received and/or transmitted via the interface 502 in connection with updating the motion control component 504.

The motion control component 504 can further include a data adjustment component 512 that can interpolate and/or extrapolate the received data utilizing the time stamp. By way of illustration, the motion control component 504 (e.g., controller) can receive actual data with a time stamp from a drive and the data adjustment component 512 can use the actual data time stamp to extrapolate the actual data to a time associated with a start of a control update period. Thus, actual data represented by the controller can be referenced to the control update period start time. According to another example, command data received by the motion control component 504 (e.g., drive) can be extrapolated via the data adjustment component 512 to align with a start of a drive update period when the command is to be applied to a control loop. The motion control component 504 (e.g., drive) can also utilize the data adjustment component 512 to extrapolate command data for drive updates when fresh command data for a new drive update period fails to be provided by a controller. Thus, the data adjustment component 512 can enable continued operation through a transmission latency disturbance.

Figure 6:
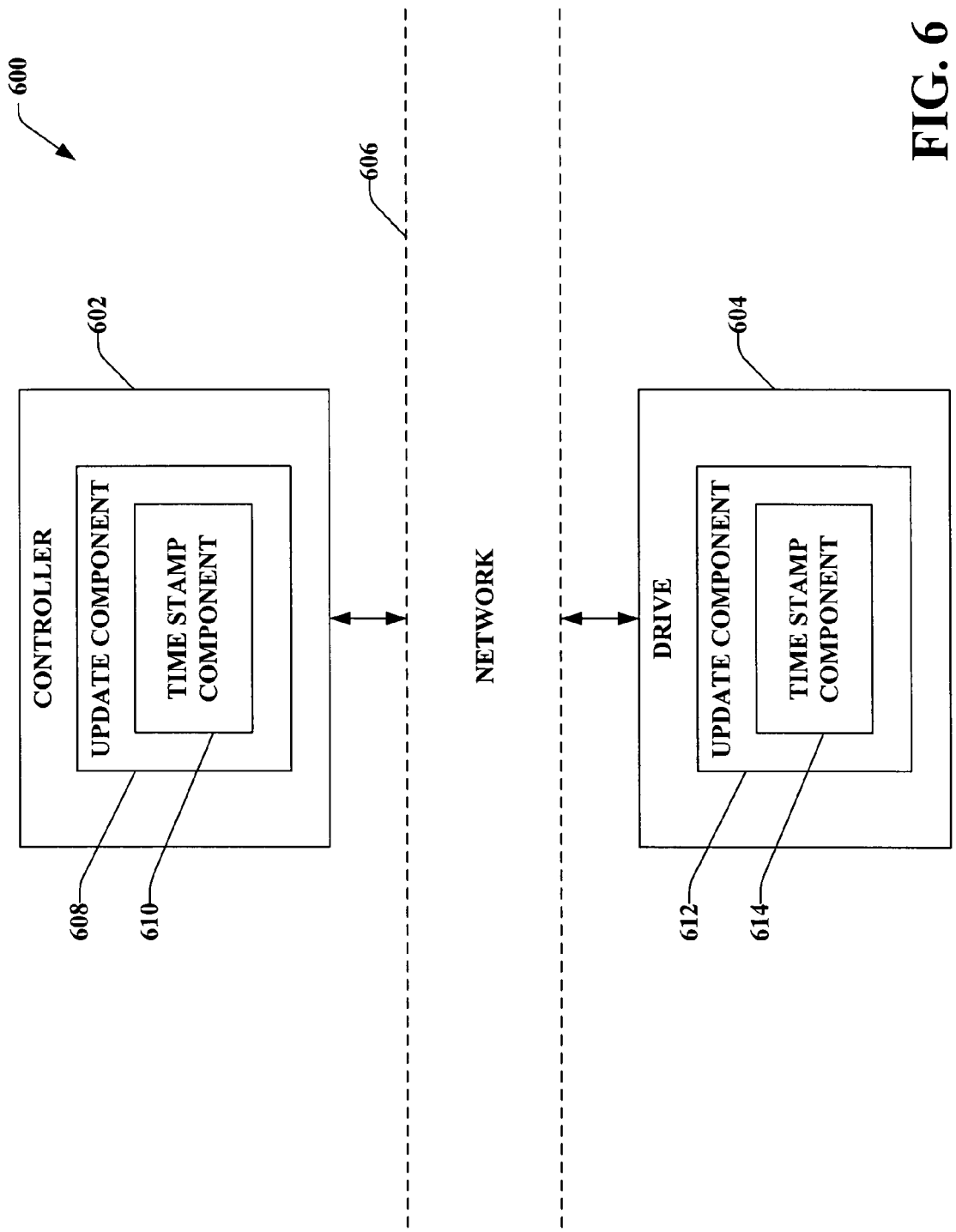
FIG. 6 illustrates a system that facilitates communicating between a controller and drive over a motion control network utilizing a time stamping protocol.

Turning to FIG. 6, illustrated is a system 600 that facilitates communicating between a controller and drive over a motion control network utilizing a time stamping protocol. The system 600 includes a controller 602 (e.g., control axis object) and a drive 604 (e.g., drive axis object) that transmit data over a network 606. The controller 602 includes an update component 608 that can evaluate received actual data and/or generate command data based on such an evaluation. The update component 608 utilizes a time stamp component 610 that can evaluate a time stamp associated with the received actual data and/or include a time stamp with the command data that is to be transmitted to the drive 604 via the network 606. The time stamp of the actual data can be associated with a time at which the drive measured actual properties. Additionally, the time stamp of the command data can be related to a time at which a drive is to effectuate the associated commands.

The drive 604 additionally can include an update component 612 and a time stamp component 614. It is to be appreciated that the update component 608 and the update component 612 can be substantially similar and/or the time stamp component 610 and the time stamp component 614 can be substantially similar; however, the claimed subject matter is not so limited.

A cycle timing component (not shown) (e.g., the cycle timing component 212 of FIG. 2) can be utilized in connection with the system 600 to enable partitioning an update cycle into disparate intervals. For instance, the cycle timing component could partition the update cycle into three intervals: an input transfer interval, a calculation interval, and an output transfer interval. According to this example, during the input transfer interval the drive 604 can transfer actual data corresponding to a measured value over the network 606 to the controller 602. The calculation interval, additionally, can provide a time during which the controller 602 evaluates the transmitted actual data and/or generates new command data for use by the drive 604. While the calculation interval is ongoing, non-motion related data can be transmitted over the network 606. Further, during the output transfer interval, the controller 602 can provide the generated command data to the drive 604 via the network 606. The three intervals can be any length of time in comparison to each other. For example, the intervals can be such that one-third of an update cycle is allocated to each of the intervals; however, the claimed subject matter is not so limited and instead contemplates the use of any proportions. Additionally, the intervals can change in length during runtime. By way of illustration, if the network 606 transfers only a slight amount of motion control data, but communicates a high volume of I/O data, the calculation interval can be enlarged to accommodate the higher I/O traffic. According to another example, an optimization can be effectuated in real time such that the calculation interval is determined based on I/O demands, motion control traffic, computational requirements, number of axes, etc.

Pursuant to a further example utilizing the cycle timing component, it is contemplated that non-motion data can be sent during any interval of an update cycle. For example, a switch can queue data such that high priority motion related data can be queued at the front of a buffer during an appropriate interval, while the low-priority non-motion related data can be transmitted during the calculation interval. Additionally, if an input transfer interval and/or an output transfer interval is not completely filled with motion related data, the non-motion related data can be transmitted subsequent to the transmission of the motion related data, making maximum use of network bandwidth.

Figure 7:
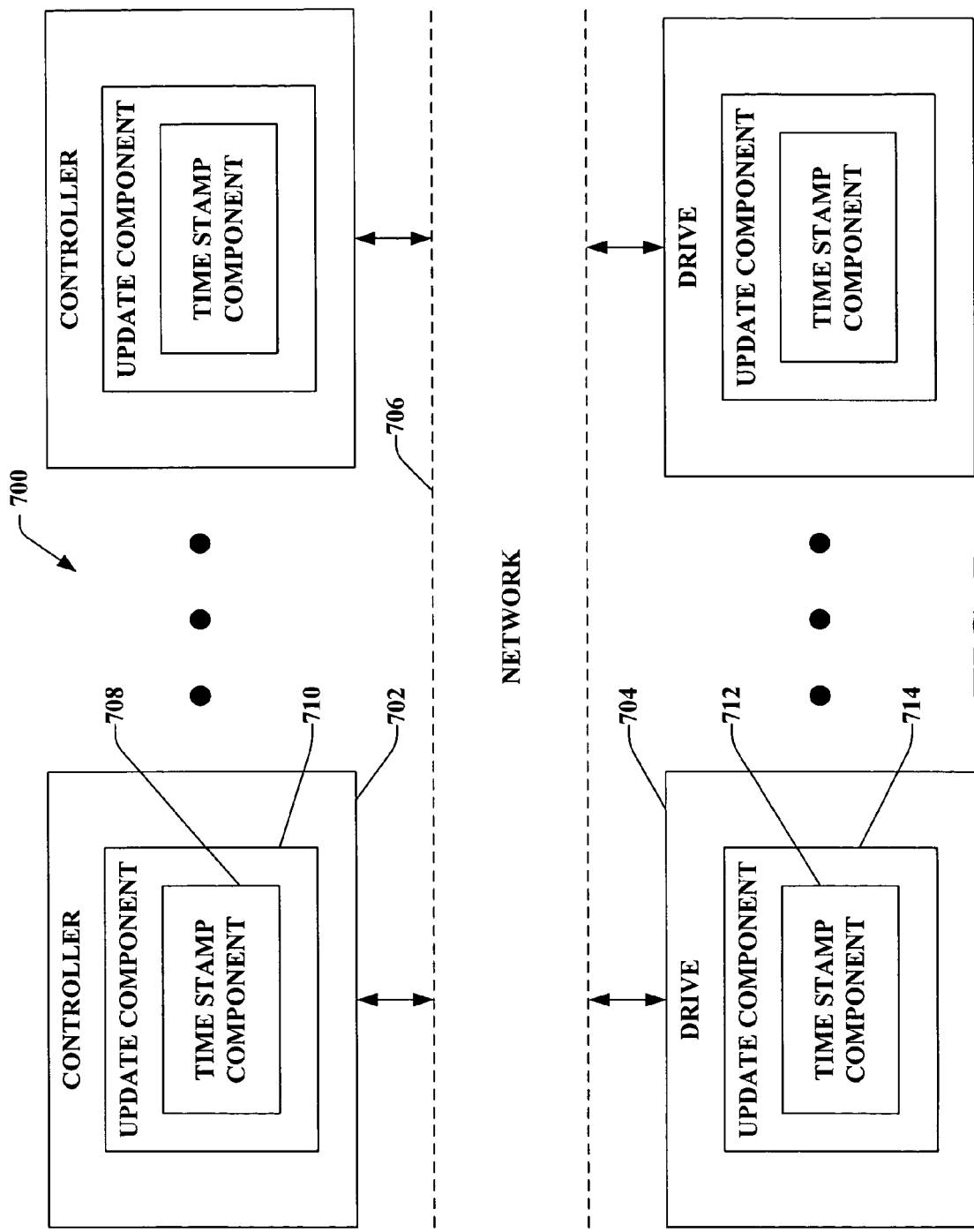
FIG. 7 illustrates a system that enables communicating motion control data and/or non-motion data over a network between controller(s) and drive(s) via employing a time stamping protocol.

Turning to FIG. 7, illustrated is a system 700 that enables communicating motion control data and/or non-motion data over a network between controller(s) and drive(s) via employing a time stamping protocol. The system 700 includes M controllers 702, where M is any positive integer and N drives 704, where N is any positive integer. The controller(s) 702 communicate with the drive(s) via the network 706. The controller(s) 702 can include an update component 708, which utilizes a time stamp component 710 in connection with updating the controller(s) 702. Further, the drive(s) can include an update component 712, which can be substantially similar to the update component 708, and a time stamp component 714, which can be substantially similar to the time stamp component 710. Additionally, CIP Motion can support peer-to-peer connections between either peer controllers 702 or peer drives 704. For example, a multicast peer-to-peer connection can be employed.

The system 700 supports utilizing multiple controllers 702, for instance. In comparison, conventional time slotting protocols typically are unable to employ multiple controllers on one network. The controllers 702 can operate with substantially similar update periods or different update periods. According to an example, the controllers 702 can utilize phase shifting to balance the motion data traffic corresponding to each of the controllers 702; however, the claimed subject matter is not so limited.

The system 700 supports adding and/or removing drive(s) 704 at any time. According to an example, a drive 704 can be added after configuration, which is not permissible with conventional motion control protocols that employ time slotting. Additionally, a drive 704 can be added and/or removed while the system 700 is operation; thus, downtime typically associated with time slot protocol reconfiguration is reduced.

Figure 8:
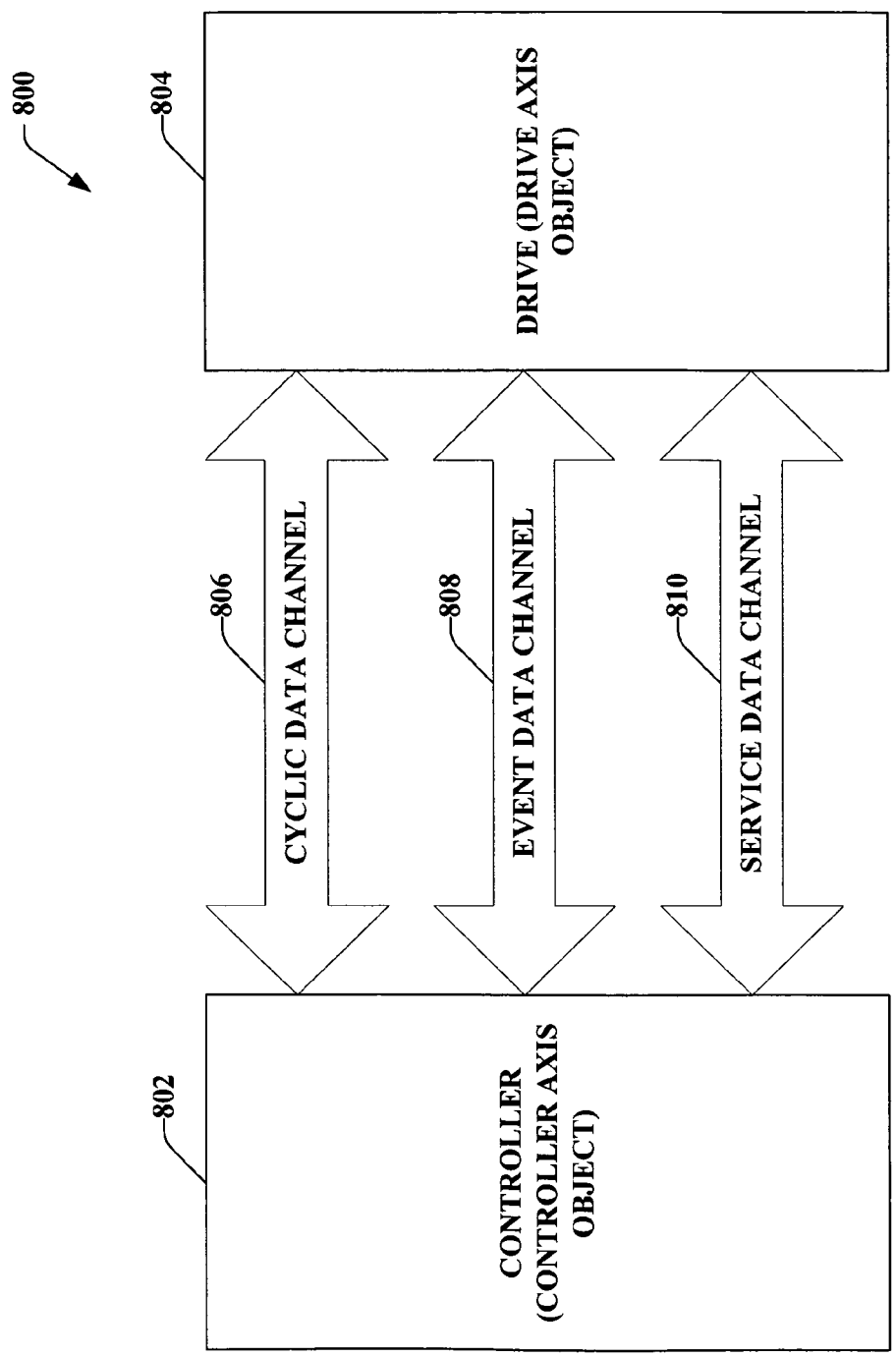
FIG. 8 illustrates a system that facilitates communicating data over a CIP Motion Drive Connection.

With reference to FIG. 8, illustrated is a system 800 that facilitates communicating data over a CIP Motion Drive Connection. A CIP Motion Drive Connection can include two unidirectional unicast connections: one passing data from a controller 802 to a drive 804 and the other passing data from the drive 804 to the controller 802. Both connections can utilize a data structure that includes a header that comprises a time stamp (e.g., 32-bit time stamp) and a series of data blocks for each axis instance supported by a drive node. Instances can be further organized by rack slots for multi-axis drive platforms.

Data exchange between the drive 804 and the controller 802 can be paced by the controller 802, such that one Drive-to-Controller data packet can be sent for every Controller-to-Drive data packet received. The Controller-to-Drive connection packets can be sent periodically according to a configured Controller Update Period, which is the same as a Connection Update Period. A Drive Update Period that corresponds to an update period at which the drive performs its control calculates can be, and typically is, faster than the Controller Update Period. Conventional time slotted motion control protocols are hard synchronized and utilize a Controller Update Period that is an integer multiple of the Drive Update Period. However, since the CIP Motion drive connection packet includes a time stamp, the Controller Update Period is not required to have an integer relationship with the Drive Update Period.

Each instance data block within the CIP Motion Drive Connection packet can include three sets of data blocks associated with a cyclic data channel 806, an event data channel 808, and a service data channel 810. The size of the data blocks for a given update can be variable and determined by a connection and instance data block headers. Additionally, according to an example, the data channels (e.g., cyclic data channel 806, event data channel 808, service data channel 810) can have disparate data processing priorities.

The cyclic data channel 806 can carry cyclic data blocks that can be sampled and/or calculated during a Connection Update Period. Additionally, the cyclic data channel 806 can be synchronized with other nodes in a motion control system via utilizing distributed System Time. Cyclic data can be high priority data that is immediately processed and/or applied to a drive axis within a Drive Update Period.

The event data channel 808 can carry data associated with drive event(s) (e.g., registration, homing, . . . ). These event(s) can occur within a Connection Update Period. The event data can have a medium priority and can be processed and/or applied within a Connection Update Period.

The service data channel 810 can carry data associated with service requests to read and/or write attribute values of a drive axis object as part of an on-line configuration and/or diagnostic functionality. Additionally, the service data channel 810 can provide services requests to affect drive axis object behavior as part of controller instruction execution. Service data can have a lowest priority and can be buffered and/or processed as a background task. Further, the service request can be processed within a Connection Update Period or at any later time.

The structure of the CIP Motion Drive Connection can be dynamic in size and/or content. The structure of each block can be determined by the contents of the headers within the connection structure, and thus, the need to send a separate structure format definition to the drive to interpret the connection data is mitigated. Additionally, the data within the CIP Motion Connection data structure can all target a single object, for instance.

Figure 9:
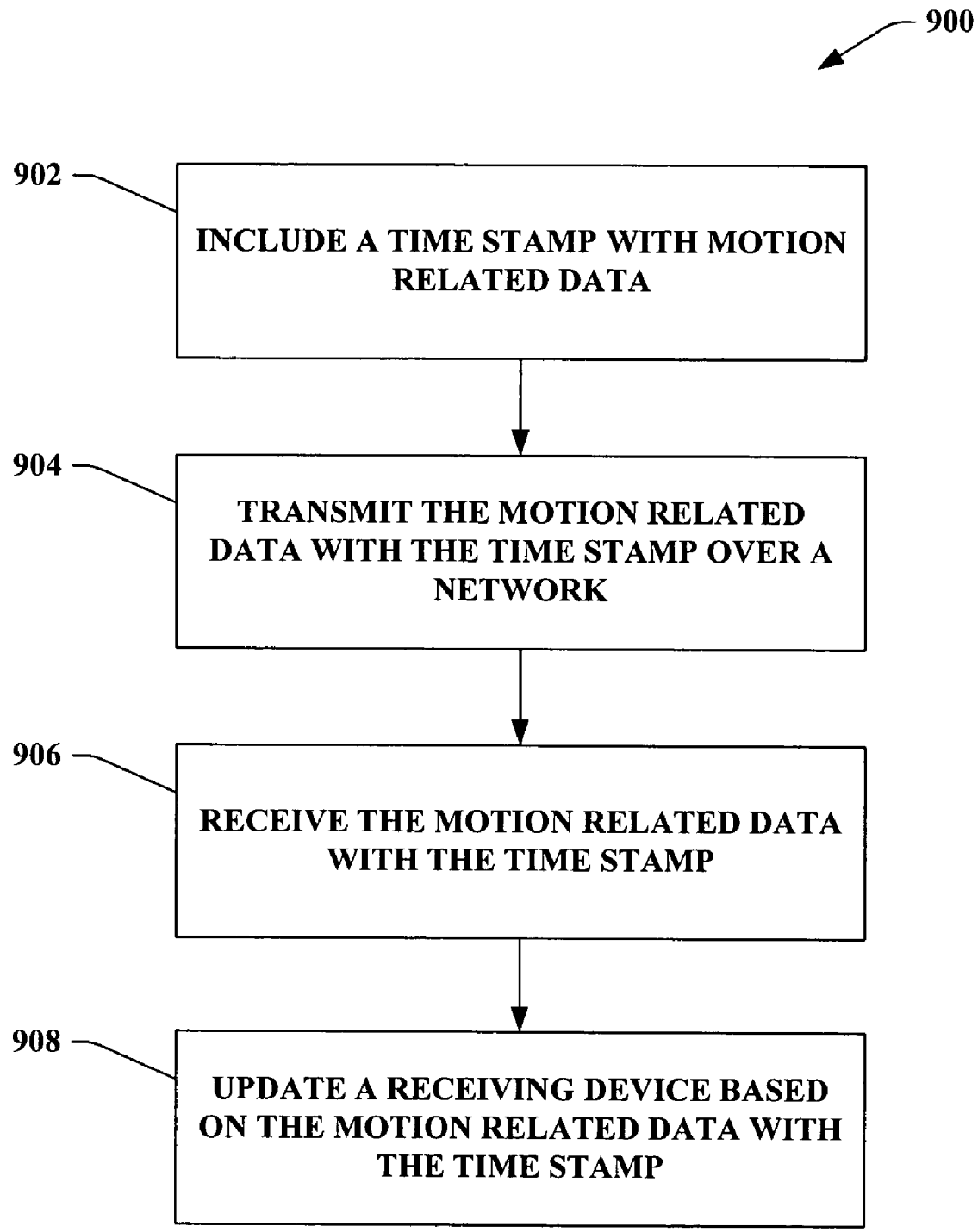
FIG. 9 is a representative flow diagram of a methodology that facilitates controlling motion with a time stamping protocol over a network in an industrial automation environment.
Figure 10:
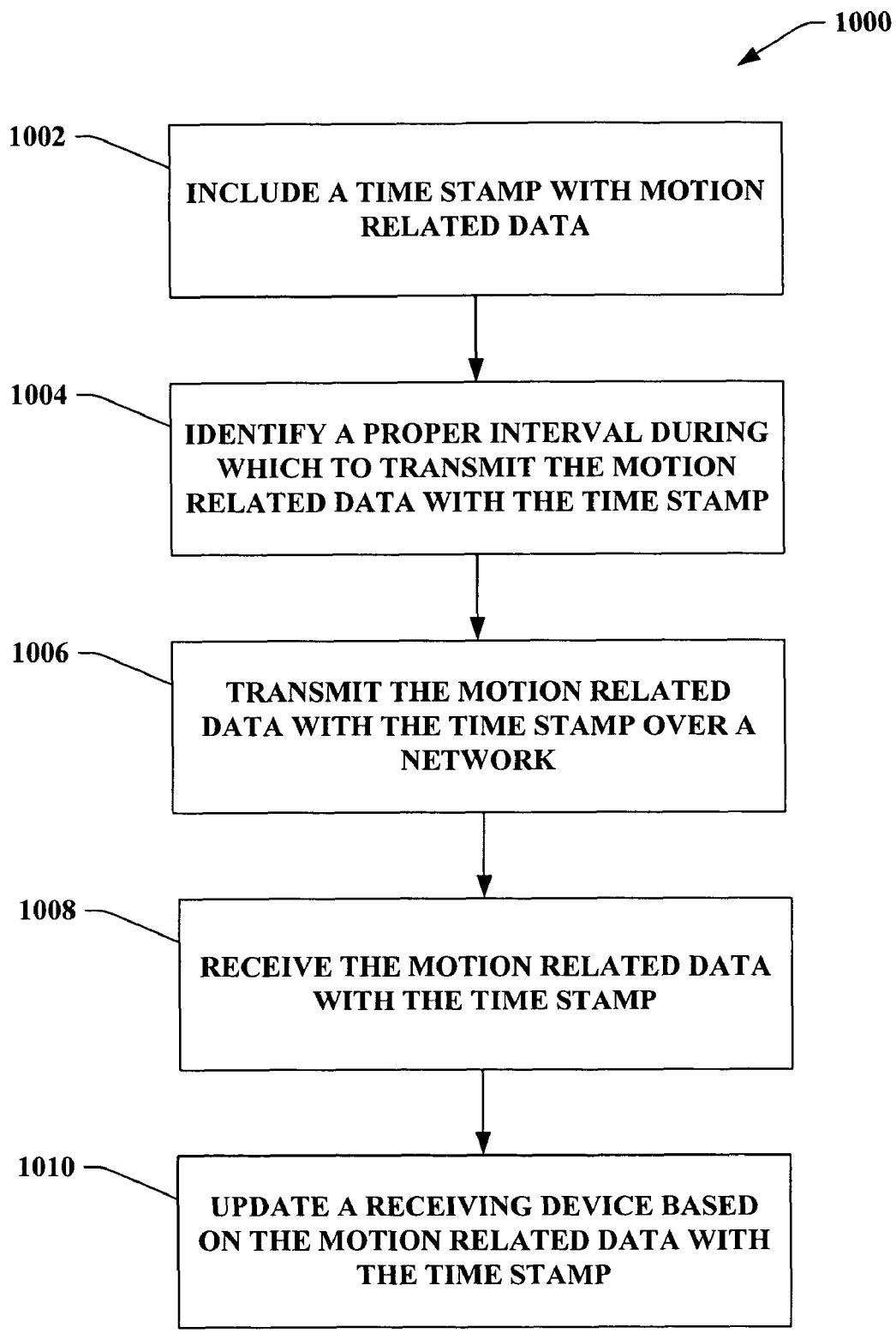
FIG. 10 is a representative flow diagram of a methodology that enables balanced single cycle timing associated with motion control updates for a motion control network.
Figure 11:
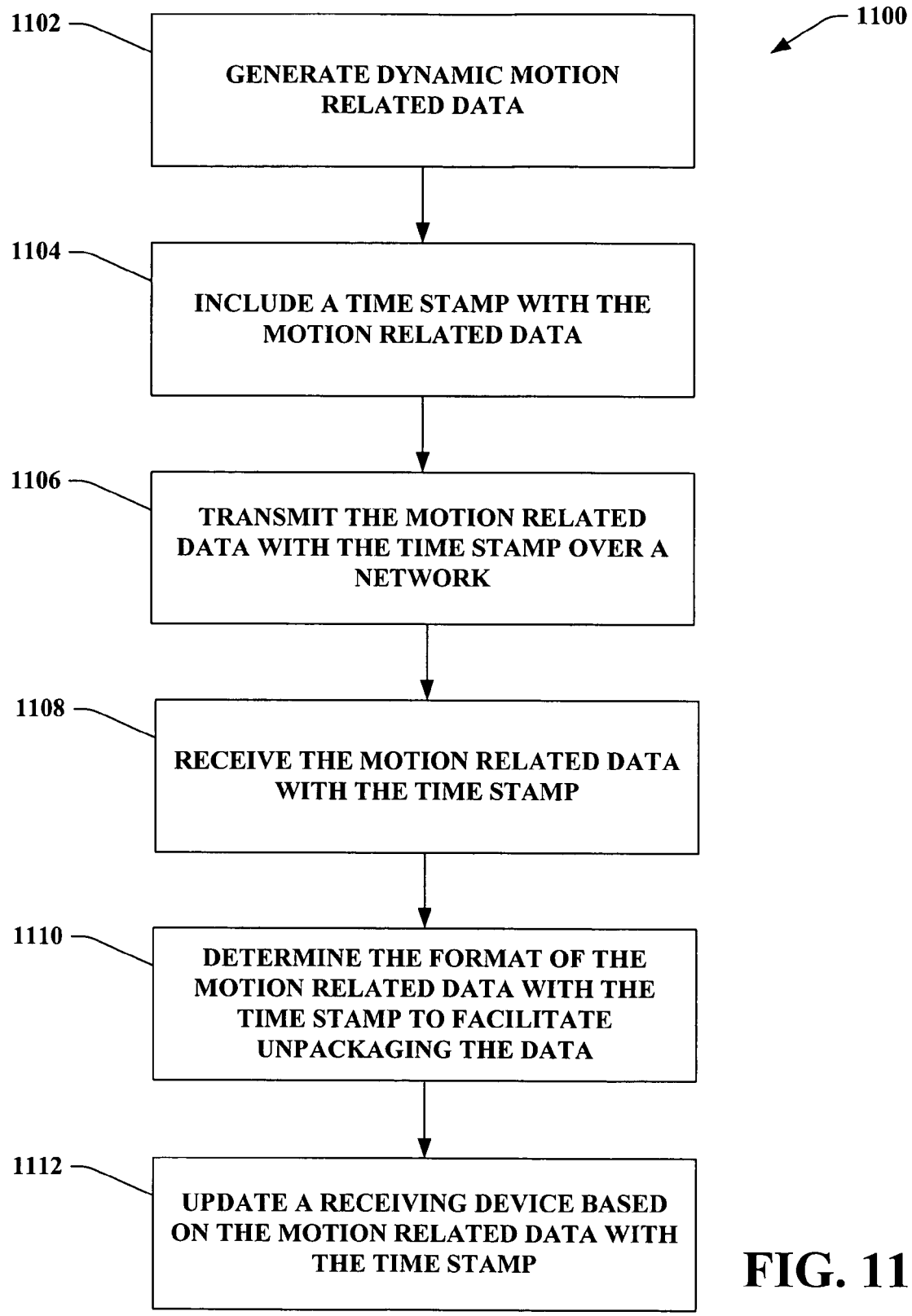
FIG. 11 is a representative flow diagram of a methodology that enables transmission of dynamic motion related data over a motion control network.

Referring to FIGS. 9-11, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 9, illustrated is a methodology 900 that facilitates controlling motion with a time stamping protocol over a network in an industrial automation environment. At 902, a time stamp is included with motion related data. The motion related data can be, for example, command data generated by a controller which can be employed by a drive to effectuate a variation in operation. Pursuant to another example, the motion related data can be actual data (e.g., actual data associated with a drive such as actual primary position, actual secondary position, actual velocity, actual acceleration, actual torque, actual current, actual voltage, actual frequency, . . . ). The actual data can be some measurable value and can be employed by the controller to generate proper commands for use in a next update cycle. The time stamp incorporated into the motion related data can be associated with a time for which a command is to be effectuated (e.g., utilizing command data) and/or a time associated with a measurement (e.g., utilizing actual data). The time stamp can be included into a header of the motion related data packet, for instance.

At 904, the motion related data with the time stamp is transmitted over a network. Utilization of any network and/or network connection is contemplated to fall within the scope of the claimed subject matter. According to an illustration, the data can be transferred over a network that supports motion control such as a CIP network. The data can be transmitted from a controller to a drive (e.g., command data) and/or from a drive to a controller (e.g., actual data), for example. At 906, the motion related data with the time stamp is received. At 908, the receiving device (e.g., controller, control axis object, drive, drive axis object, . . . ) can be updated utilizing the motion related data that includes the time stamp. By way of example, a controller can receive actual data with a time stamp that corresponds to a time at which a measurement was made at a drive. Accordingly, the controller can employ this data to generate new commands that can be transferred back to the drive and/or effectuated by the drive during a next update cycle. Pursuant to another illustration, a drive can receive command data with a time stamp that is associated with a time at which the command is to be effectuated (e.g., drive can be given instructions to change to a particular position, velocity, acceleration, torque, current, frequency, voltage . . . ). The time can be determined by synchronizing nodes within the motion control network; thus, a common understanding of time exists. When a corresponding time is reached, the drive can implement the new commands. Accordingly, in contrast to time slotting techniques, stringent configuration requirements can be mitigated, nodes can be added or removed subsequent to configuration, and data can still be utilized even if delayed due to network latencies via employing this time stamping.

With reference to FIG. 10, illustrated is a methodology 1000 that enables balanced single cycle timing associated with motion control updates for a motion control network. At 1002, a time stamp is associated with motion related data. At 1004, a proper interval for transmitting motion-related data with the time stamp is identified. For example, a clock associated with a node can be synchronized with disparate clocks related to disparate nodes to yield a common understanding of time within the network. Additionally, based on the current time, a particular interval can be identified. According to an aspect, an update cycle can be divided into an input transfer interval, a calculation interval, and an output transfer interval. During the input transfer interval, motion related data can be transmitted from a drive to a controller (e.g., transmitting actual data), while during an output transfer interval, motion related data can be transmitted from a controller to a drive (e.g., transmitting command data). During the calculation interval, motion related data transmission is quiescent, thereby enabling non-motion related data to utilize the available network bandwidth. At 1006, the motion related data is transmitted with the time stamp over a network during the identified time interval. At 1008, the motion related data with the time stamp is received by a receiving node. At 1010, the receiving node (e.g., receiving device) can be updated based on the received motion related data with the time stamp.

Turning to FIG. 11, illustrated is a methodology 1100 that enables transmission of dynamic motion related data over a motion control network. At 1102, dynamic motion related data is generated. The data structure can vary in size and/or content from one update to a next update. The dynamic motion related data can include a description of the structure within the data itself, such as, for example, in the header of a data packet. At 1104, a time stamp is included with the motion related data. For example, the time stamp can be associated with a time at which an action is to be implemented (e.g., utilization of new command data) and/or a time at which an action was taken (e.g., measuring associated with actual data). At 1106, the motion related data with the time stamp is transmitted over a network (e.g., from a controller to a drive, from a drive to a controller). At 1108, the motion related data with the time stamp is received. At 1110, the format of the motion related data with the time stamp is determined. For example, the header of the received data can be evaluated to identify the structure. Such a determination can be effectuated to facilitate unpacking the data. At 1112, the motion related data with the time stamp is utilized to update the receiving device.

FIGS. 12-20 are exemplary timing diagrams that illustrate various aspects associated with time stamping motion control. It is to be appreciated that these timing diagrams are provided as examples and the claimed subject matter is not limited by these examples.

Figure 12:
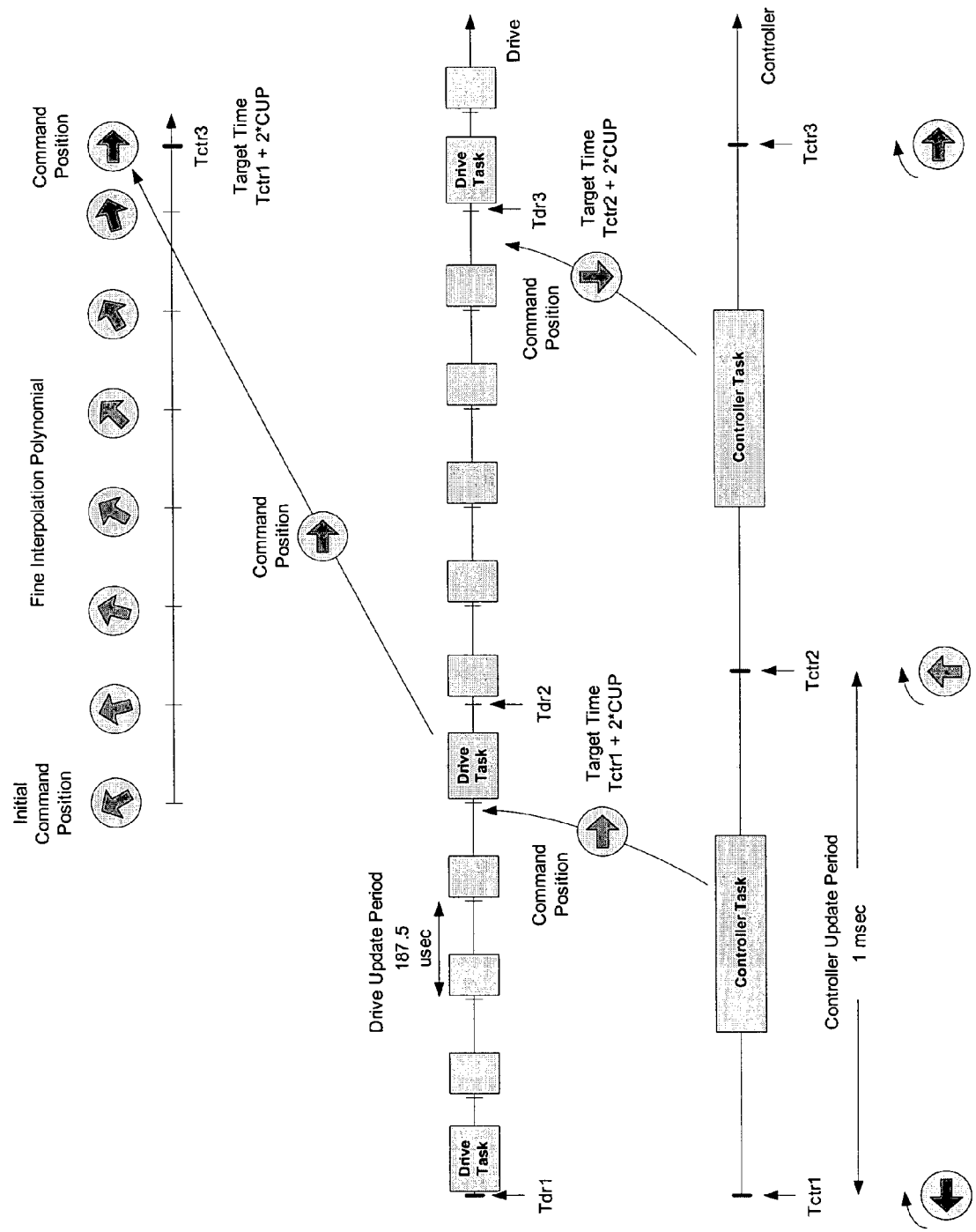
FIGS. 12-20 are exemplary timing diagrams of various aspects associated with time stamping motion control.

Turning specifically to FIG. 12, illustrated is an exemplary timing diagram that depicts how command data and time stamps delivered by a Controller-to-Drive connection can be applied to a drive axis utilizing fine interpolation. According to this example, connection data is transferred from the controller to the drive during a connection cycle where a Controller Update Period (CUP) is not an integer multiple of the drive update period. As part of a Control Task, the controller initiates transmission of a Controller-to-Drive Connection packet with new command data to the targeted drive with an incremental Update ID and a new Controller Time Stamp referencing the time at the start of the current Controller Update Period. The instance data block for the target axis also includes the Command Target Time, which in this example is set to 2 to support a fine interpolation delay of 2*Controller Update Period (CUP) that is to be added to the Controller Time Stamp. The drive runs a periodic Drive Task that checks every Drive Update Period for new Controller-to-Drive Connection packet data, which can be accomplished by checking for a changed Update ID. If the Drive Task discovers fresh data, then this is a command data update cycle and the command data can be further processed.

The drive can then check for synchronous operation. If the drive is not synchronized, then it is not necessary to perform a Late Update Check since bypassing the Late Update Check allows for control of the drive during start-up or when the drive does not have time synchronization services. If the drive is synchronized, the drive computes a difference between the current drive update time stamp and the Controller Time Stamp in the Controller-to-Drive Connection packet. If the difference is greater than Controller Update Delay High Limit*Controller Update Period, the drive throws a Controller Update Fault. Additionally, if the time difference has exceeded twice the Connection Update Period, the current fine interpolator polynomial has become, effectively, an extrapolator polynomial allowing the drive to ride through the late data condition until the new data arrives.

The command data can thereafter be applied. Since a fine interpolator is used in this example, the Drive computes coefficients for the fine interpolation polynomial based on the command reference being applied to the Target Time of the Controller Time Stamp, Tctrl, plus the product of the Command Target Time and Controller Update Period, or 2*CUP. If the Target Time is less than the current System Time in the drive, new coefficients to the polynomial are still computed based on this command data to improve the accuracy of the extrapolation calculations. In general, whenever command data is late, the data still represents the freshest command data available and should be applied as soon as possible.

Figure 13:
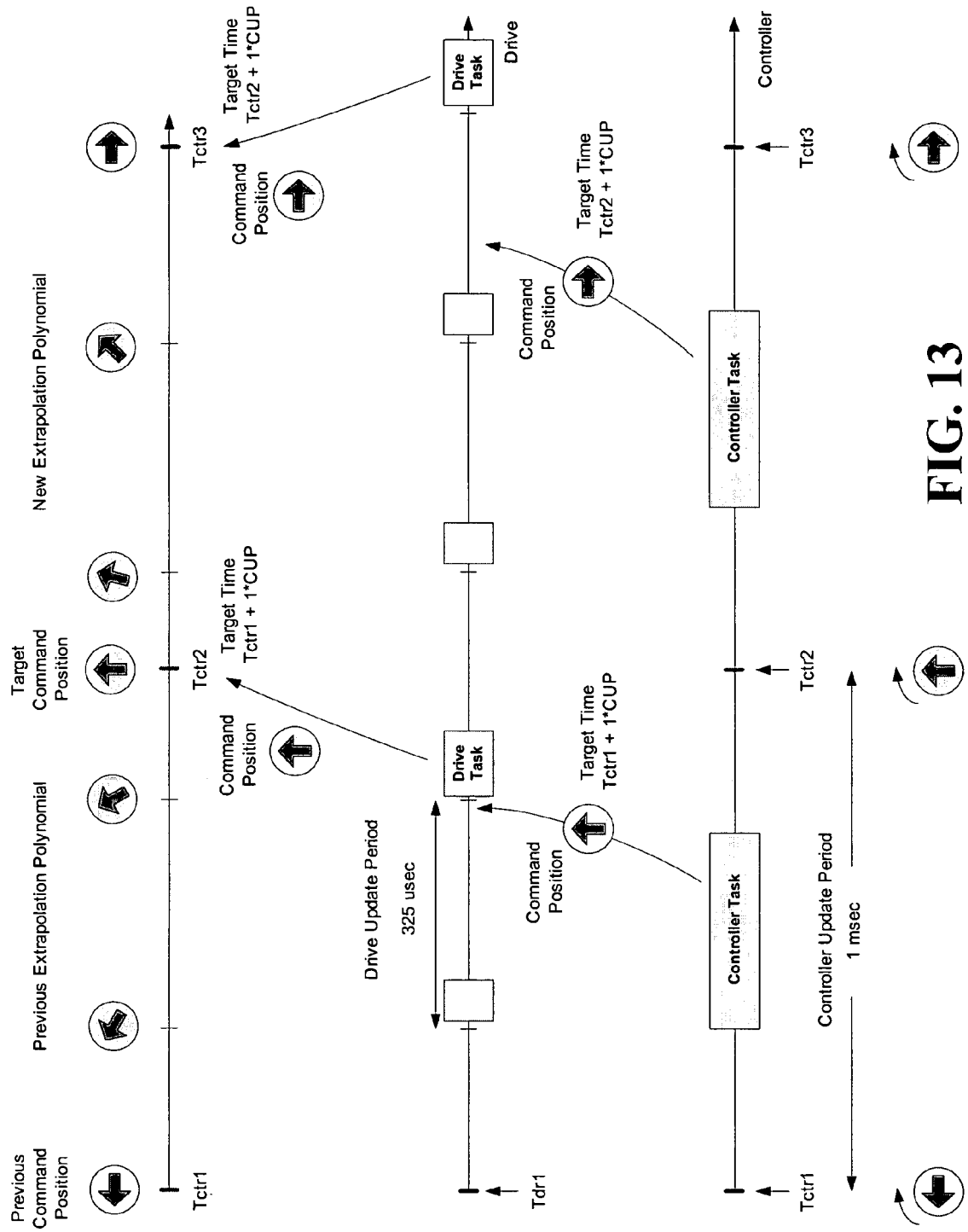

With reference to FIG. 13, illustrated is another exemplary timing diagram where a Controller Update Period (CUP) is not an integer multiple of a drive update period. As depicted in this example, the Command Target Time is set to 1 and the computed polynomial is not applied for the purpose of fine interpolation, but rather for extrapolation; the extrapolation allows the drive to compute an accurate command data value at the time the drive performs its control calculations based on previous axis trajectory.

Figure 14:
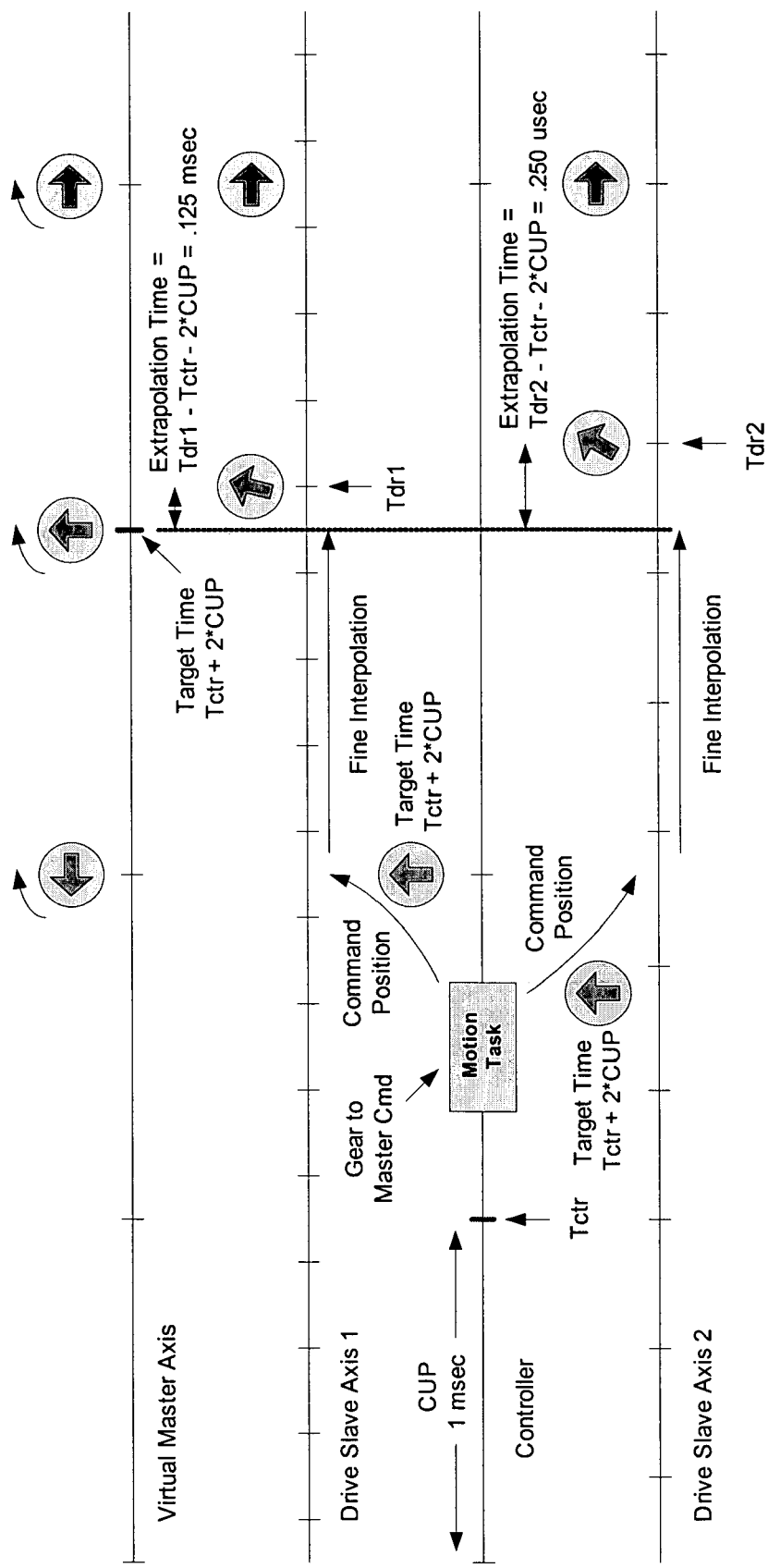

FIG. 14 illustrates an exemplary timing diagram that demonstrates coordination between two drive axes with different Drive Update Periods and an associated Controller Update Period that is not an integer multiple of either Drive Update Period. The controller's motion planner task sends identical command positions and time stamps to two slave drive axes that, while synchronized with System Time, are running at different drive update rates. When the command position data arrives at the two drives, they use the Controller Time Stamp, the Command Target Time, and the Controller Update Period to compute new coefficients to the interpolation polynomial based on the constraint that the polynomial value at time equal to (Controller Time Stamp+Command Target Time*Controller Update Period) is the specified Command Position value. Since there is no dependency on the drive update rate, the polynomial coefficients computed by each drive can be identical. Since neither drive has an update that coincides with this target time, the drives use the fine interpolation polynomial to calculate the command position reference for each drive update until a fresh command position is received from the controller. If a new command position does not arrive until well after the target time, the drive continues to use the same polynomial equation to "extrapolate" command position for subsequent drive updates as shown in the above diagram. This extrapolation continues until fresh data arrives and new coefficients can be calculated. In this way, whether by interpolation or extrapolation, each slave axis runs smoothly and the two axes stay phase locked with the master axis.

Figure 15:
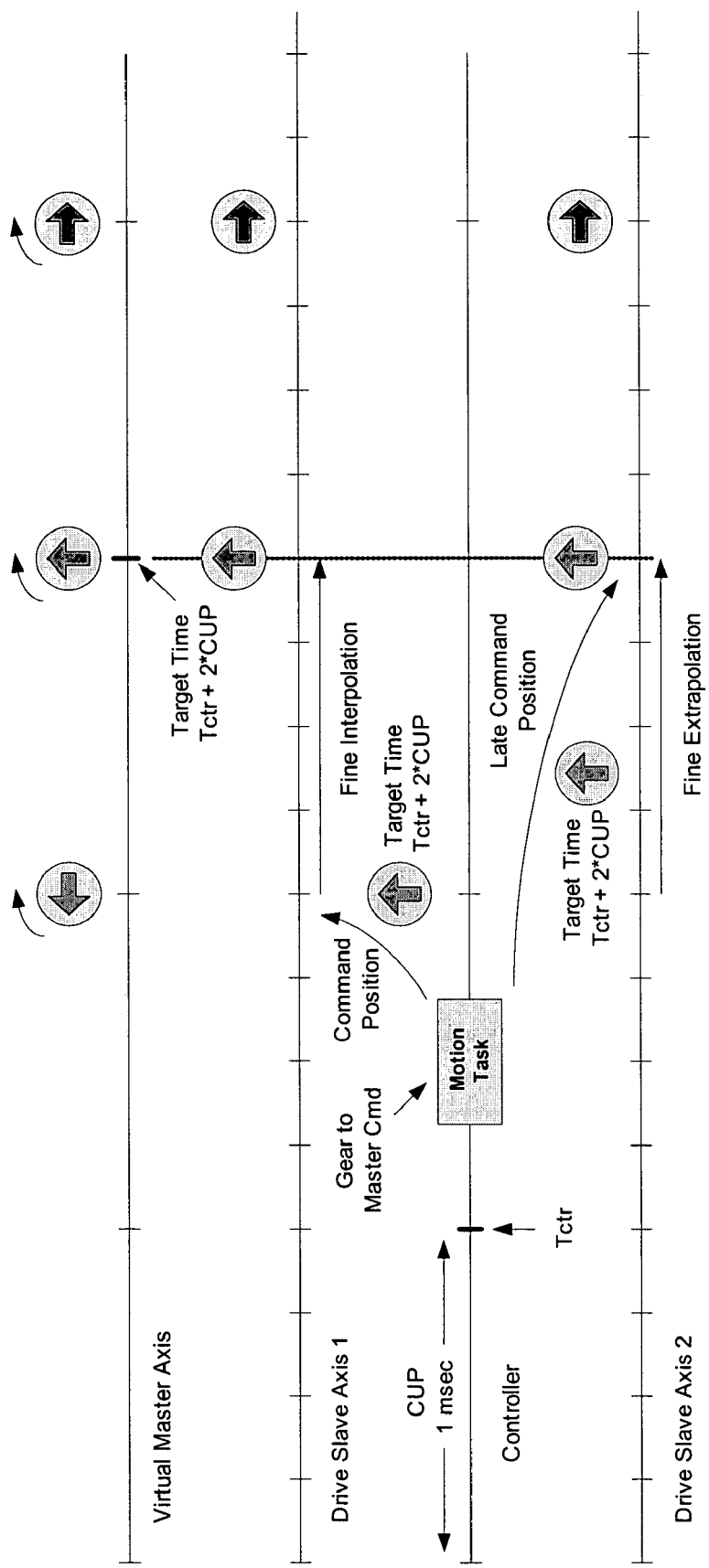

Turning to FIG. 15, illustrated is an exemplary timing diagram demonstrating that precise coordination of multiple CIP Motion drive axes can be maintained even when Controller-to-Drive connection packets incur significant delays while traveling across the CIP network. According to this example, the packet for Slave Drive Axis 2 has incurred a significant delay during transmission. As a result, the command position for this axis is extrapolated from the last fine interpolation polynomial. This allows the axis to move smoothly through a transmission latency disturbance. When the new command data does arrive, the new command value may not agree with extrapolated value due to extrapolation error. This error can result in a disturbance to the motion profile. The magnitude of the extrapolation error depends on the dynamics of the motion profile and the controller update rate. In most real-world applications, transmission latencies lasting several update periods can occur without any noticeable disturbance to the associated motion profile.

Figure 16:
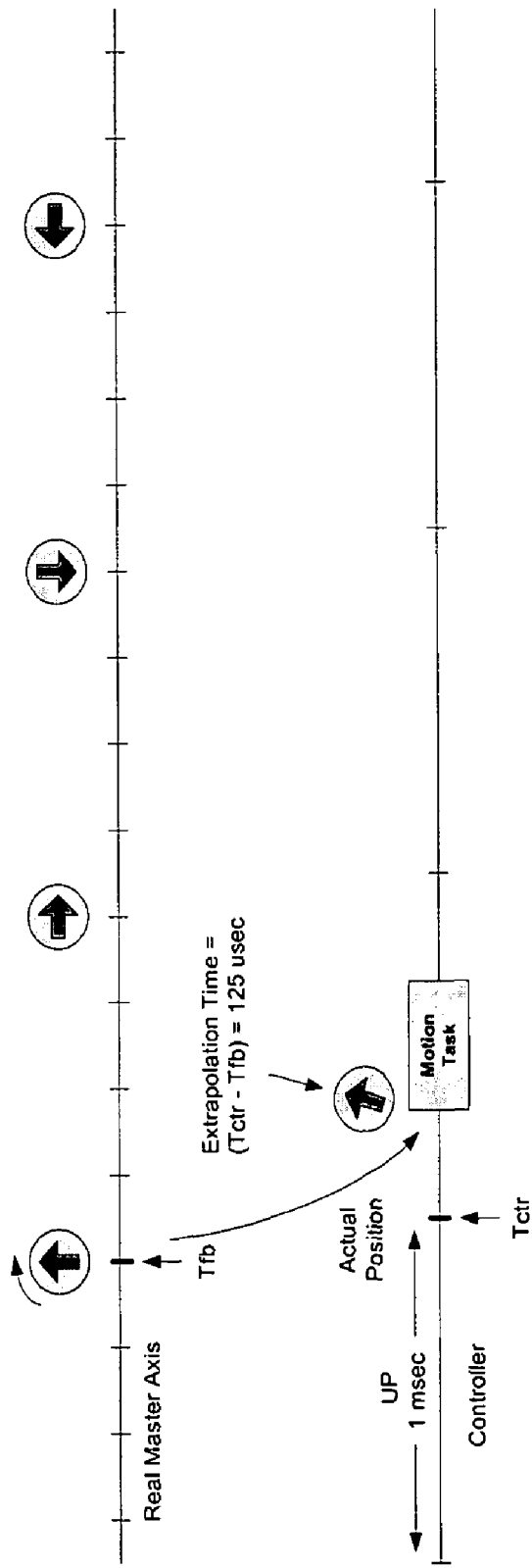

With reference to FIG. 16, depicted is an exemplary timing diagram that illustrates how axis position data from the drive is adjusted by the controller based on the relative time stamps between the drive and the controller. For instance, when the Drive Time Stamp does not match the local update time stamp of the controller, the controller can extrapolate the actual response data value based on trajectory to correspond to the controller's time stamp.

Figure 17:
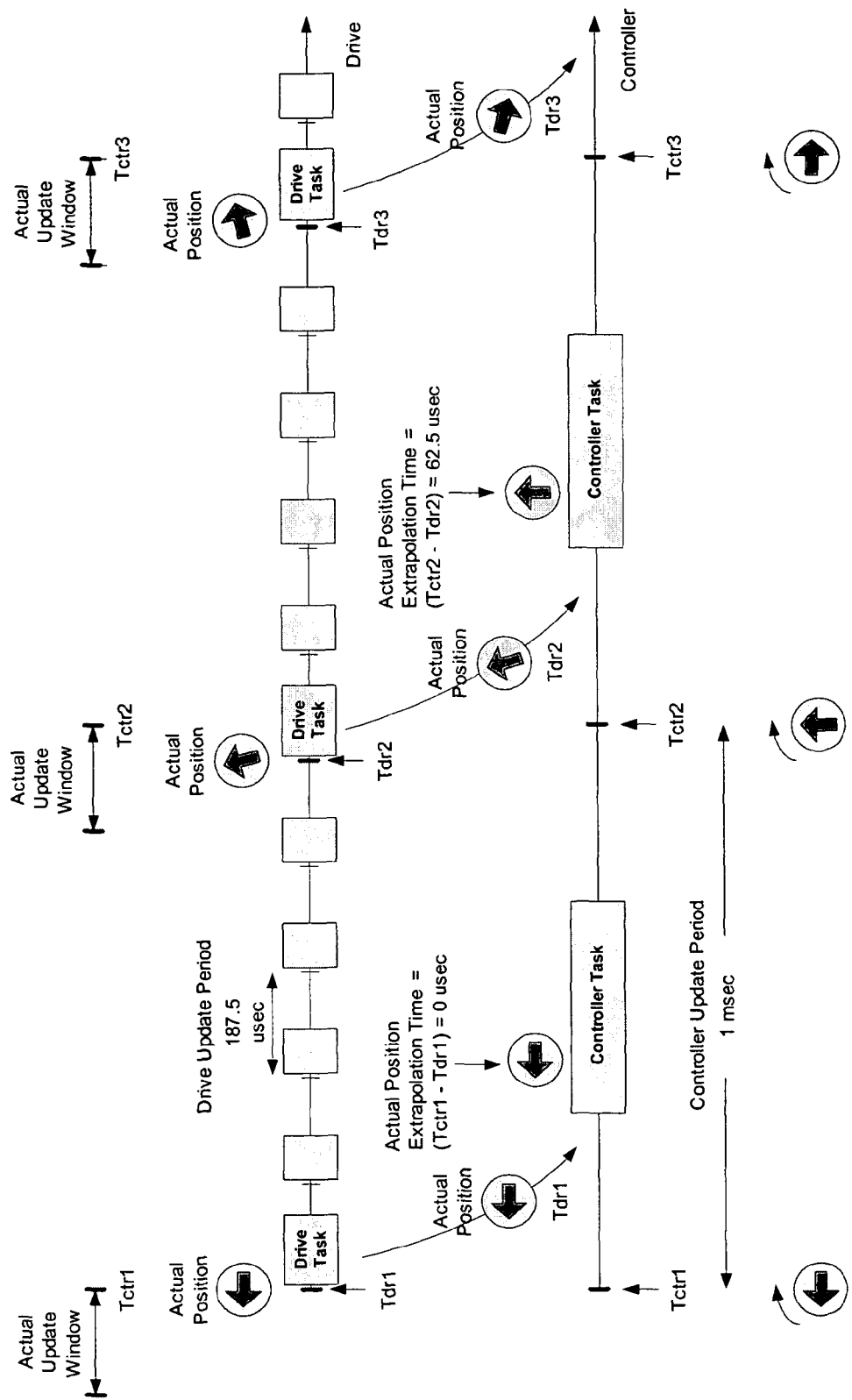

Turning to FIG. 17, illustrated is an exemplary timing diagram that demonstrates how actual data and time stamps delivered by the Drive-to-Controller connection can be used to adjust drive axis actual position to the controller's timebase. If the axis is synchronized, the drive compares a current Drive Task time stamp with the Actual Update Window that is determined during the last command data update. The Actual Update Window has a duration of 1 Drive Update Period and ends at the computed time of the next Controller Update. If the time stamp is within the time window, this is an actual data update cycle. If the time stamp is before the window, then the drive waits for a subsequent drive task to send the actual data to the controller. (This prevents a condition where there is excessive time between the feedback capture and the start of the next Controller Task.) If the axis is not synchronized and a command update is received via the Controller-to-Drive Connection, then this is also an actual update cycle and the drive proceeds as follows. Otherwise, no action is taken and the task is finished.

If an actual update cycle is identified, then the drive sends the Drive-to-Controller Connection packet to the controller with the latest actual data from this Drive Task, including the current drive update Time Stamp, and an incremented Update ID. All additional data sent to the controller in this packet may be derived from the previous Drive Task. This allows the drive transmission to occur at the earliest point in the Drive Task execution. The controller additionally checks for new data from the drive by checking for a changed Update ID. The following is performed regardless of whether or not the Update ID has changed. According to an aspect, the Update ID may be the only way to detect for new actual data when the drive is not synchronized.

Further, the drive checks the Synchronized bit of the Drive Node Control byte to determine if the drive axis is synchronized. If the drive axis is not synchronized, the controller applies actual data to avoid Late Update checking and Time-Stamp Correction. Utilizing such a bypass allows the drive to operate during start-up or even in the case where the drive does not have any time synchronization services.

A Late Update Check can also be utilized such that the controller computes the difference between the current Connection Update Period time stamp and the Time Stamp in the Drive-to-Controller Connection packet. If the difference is greater than Missed Update Tolerance*Update Period, the controller throws a Controller Sync Fault. Additionally, if the previously computed time difference is non-zero, then the actual data value can be extrapolated based on previous axis actual trajectory to line up with the controller's time stamp. This correction may be necessary because the motion planner assumes that actual input is implicitly time stamped to the beginning of the Controller Update Period. Furthermore, the controller can apply actual data as inputs to the motion planner, which computes new command reference data.

Figure 18:
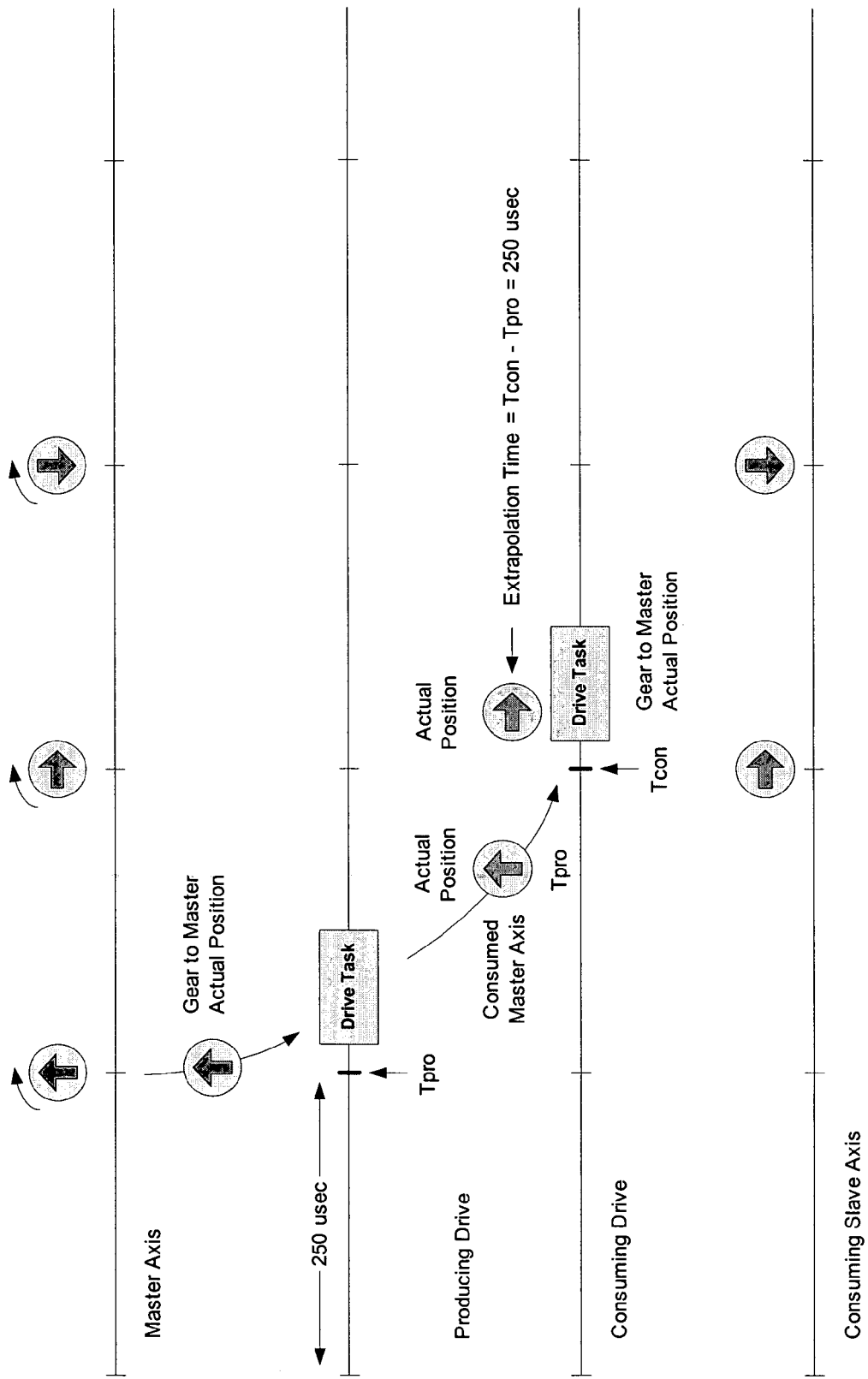

Turning to FIG. 18, illustrated is an exemplary timing diagram that depicts how actual data and time stamps delivered by the Drive-to-Drive Peer connection are used to adjust drive axis actual position to the controller's timebase. In this example, the master axis position is captured by the producing drive and sent to one or more consuming drives via the multicast CIP Motion Peer Drive-to-Drive Connection (e.g., in a line-shafting application). When the master actual position is consumed by another drive, extrapolation is done by the consumer to compensate for the delay incurred over the connection. This is done by using the producer's Time Stamp, Tpro, associated with actual data element being consumed and the consumer's Time Stamp, Tcon, latched by the consuming controller. Once corrected for the peer connection delay, the remote slave axis associated with the consuming drive can be precisely phased relative to the master axis through electronic gearing. This can be utilized when the consuming and producing drives are running at different update rates. Additionally, the consuming drive's update period can be more or less than the producing drive as long as they both operate off distributed System Time.

Figure 19:
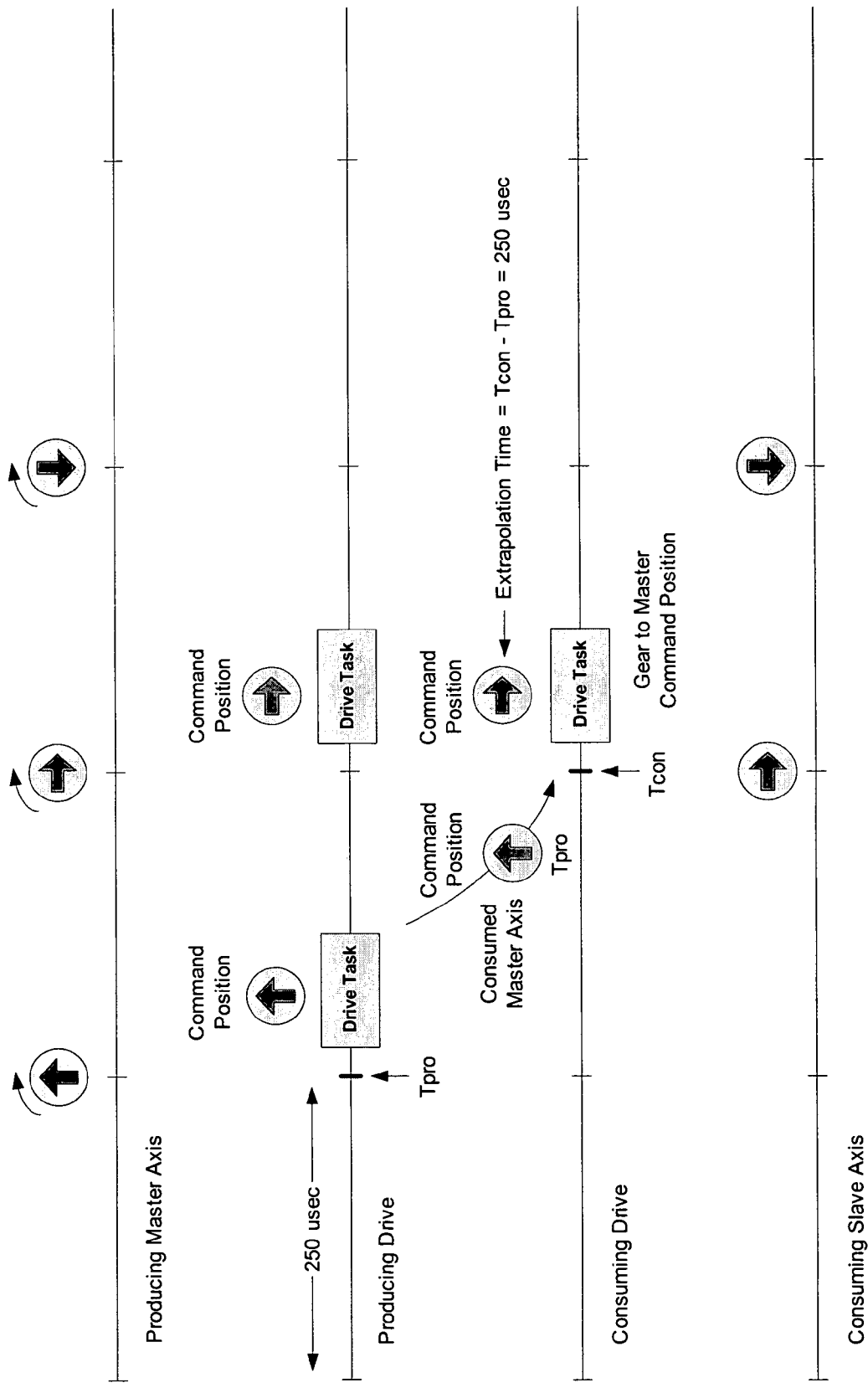

FIG. 19 illustrates an exemplary timing diagram where the producing drive is distributing command position to multiple consuming drives. When the master command position is consumed by another drive, extrapolation is done by the consumer to compensate for the delay incurred over the connection. This can be done by using the producer's Time Stamp, Tpro, associated with actual data element being consumed and the consumer's Time Stamp, Tcon, latched by the consuming controller. Once corrected for the peer connection delay, the remote slave axis associated with the consuming drive can be precisely phased relative to the master axis through electronic gearing.

Figure 20:
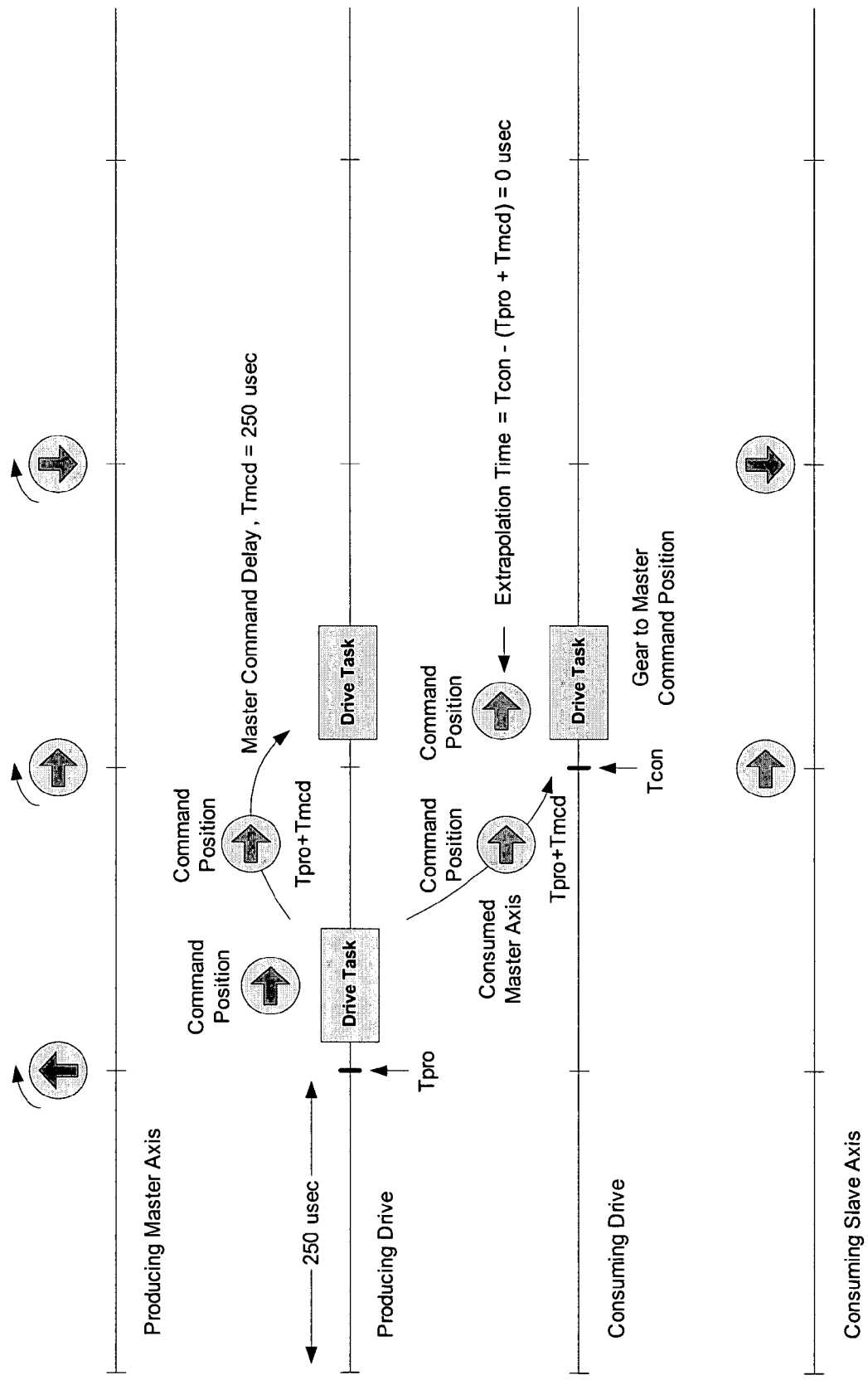

Turning to FIG. 20, illustrated is an exemplary timing diagram where the producing drive is configured to delay the application of the local master command position reference by one Producer Update Period, Tmcd, which represents the Master Command Delay. This minimizes the amount of extrapolation that is required to compensate for the delay incurred over the peer connection. In this example, the Master Command Delay is 250 usec. Since the consuming drive's update period is also 250 usec, the net extrapolation time is 0.

Figure 21:
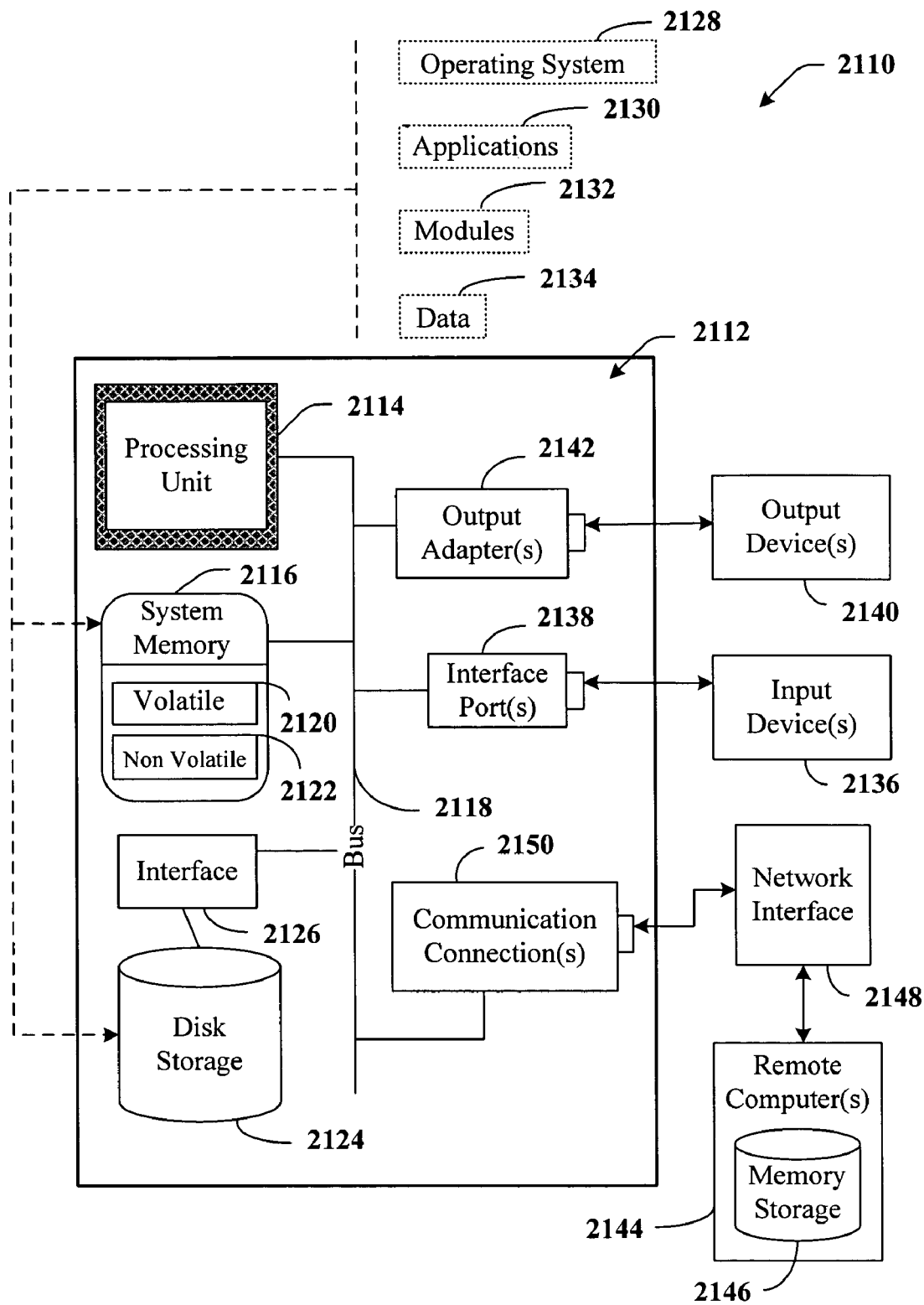
FIG. 21 is an example operating system upon which various features described herein can be implemented.

With reference to FIG. 21, an exemplary environment 2110 for implementing various aspects of the invention includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable ROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer system 2112. System applications 2130 take advantage of the management of resources by operating system 2128 through program modules 2132 and program data 2134 stored either in system memory 2116 or on disk storage 2124. It is to be appreciated that the subject invention can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

Figure 22:
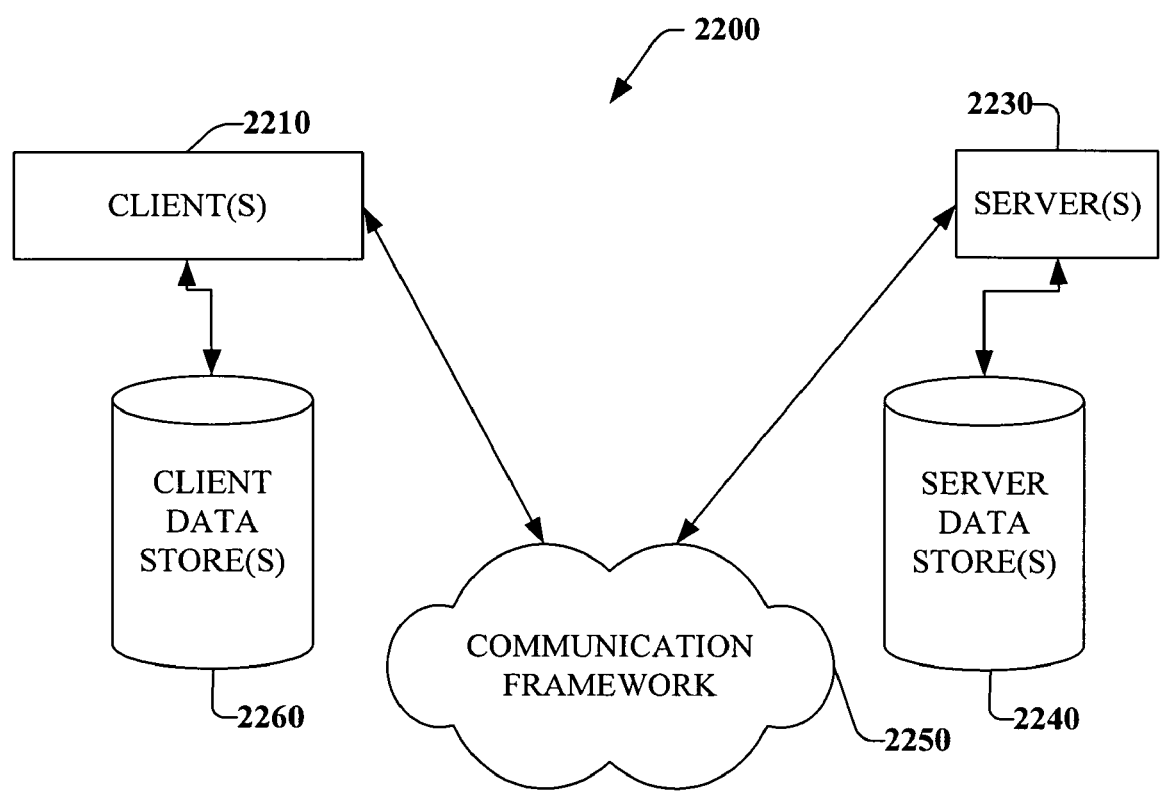
FIG. 22 is an exemplary computing environment within which various features described herein can interact.

FIG. 22 is a schematic block diagram of a sample-computing environment 2200 with which the subject invention can interact. The system 2200 includes one or more client(s) 2210. The client(s) 2210 can be hardware and/or software (e.g., threads, processes, computing devices). The system 2200 also includes one or more server(s) 2230. The server(s) 2230 can also be hardware and/or software (e.g., threads, processes, computing devices). The servers 2230 can house threads to perform transformations by employing the subject invention, for example. One possible communication between a client 2210 and a server 2230 can be in the form of a data packet adapted to be transmitted between two or more computer processes. The system 2200 includes a communication framework 2250 that can be employed to facilitate communications between the client(s) 2210 and the server(s) 2230. The client(s) 2210 are operably connected to one or more client data store(s) 2260 that can be employed to store information local to the client(s) 2210. Similarly, the server(s) 2230 are operably connected to one or more server data store(s) 2240 that can be employed to store information local to the servers 2230.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX A

1 CONNECTIONS

CIP Motion defines three different connection structures that are supported by the Drive Axis Object. They are the Controller-to-Drive Connection, the Drive-to-Controller Connection, and the Drive Peer-to-Peer Connection. The first two connection structures provide a bi-directional connection between the Controller Axis Object and the Drive Axis Object and together are referred to as the CIP Motion Drive Connection. The Drive Peer-to-Peer Connection is a specific application of the CIP Motion Peer Connection that applies equally to peer controllers as it does to drives.

1.1 CIP MOTION DRIVE CONNECTION

The following section is a description of the CIP Motion Drive Connection format that includes the Controller-to-Drive Connection and the Drive-to-Controller Connection for bi-directional data transfer between a motion controller and a drive.

1.1.1 DRIVE CONNECTION FEATURES

The following is a list of features associated with the CIP Motion Drive Connection:

1. Ability to pass cyclic data, and events with a latency of one controller update period.
2. Ability to make lower priority service requests to the drive for drive configuration, tuning, and diagnostics.
3. Applicable to star or daisy-chain network topologies using a bi-directional unicast connection.
4. Ability to handle up to 255 axis instances per network node.
5. Ability to handle drives with multiple axis instances serviced by one communications node.
6. Element definition provides room for standard extensions as well as vendor specific extensions.
7. Individual axis instances can have different connection data structures.
8. Both the drive operating mode and the cyclic command and actual data set configuration are built into the cyclic data structure allowing the drive operating mode to be synchronously changed on-the-fly.
9. Supports multi-channel cyclic parameter read/write access. The contents of each data channel are clearly defined as part of the cyclic connection data so there is no ambiguity as to what attribute the associated data maps to.
10. Supports data buffer/array transfer service. This array data transfer capability can be used to get array data from the drive for high-speed trending or used to set array data to the drive for high-speed gain scheduling or building cam tables.

11. Supports a Drive Control and Drive Response bit handshaking mechanism with error reporting to initiate various basic state control operations such as clearing faults and shutdown requests.
12. Connection header includes a time stamp to provide the System Time when the controller's or drive's update timer event occurred.
13. With time stamped data, the connection timing model can support drives and controllers with different update rates and phase offsets. Thus, the controller's update period no longer needs to be an integer multiple of the drive's update period.
14. The connection timing model also includes the ability to operate with drives that do not have time synchronization services such as low cost VFD drives.
15. Ability to operate reliably in the presence of significant HMI, I/O, messaging, and other Ethernet traffic, CIP or non-CIP, that use standard Ethernet transport protocols (e.g. TCP and UDP).
16. Ability to add or remove Ethernet nodes during runtime without adversely impacting the operation of the CIP Motion Drive Connection to existing nodes. (Network topology dependent).
17. Ability to add or remove CIP Motion drive nodes on-line without disrupting operation of other drive nodes. (Network topology dependent).
18. Improved motion control performance in the presence of late or missed update packets making the best possible use of transmitted command data.
19. Connection format revision built-in to facilitate backward compatibility with existing drive and control devices and earlier versions of the CIP Motion Drive Connection data structure.
20. Connection format is organized such that 32-bit words are 32-bit aligned and 16-bit words are 16-bit aligned. This facilitates easy memory access.

1.1.2

Figure 1–1 — Controller-to-Drive Connection Format

| ← 32-bit Word → |
|---|

| Controller-to-Drive Connection Format |
|---|
| Connection Header |
| Instance Data Blocks |

| Connection Header | | | |
|---|---|---|---|
| Connection Format | Format Revision | Update ID | Node Control |
| Instance Count | - | - | Time Config |
| Controller Update Period ||||
| Controller Time Stamp ||||

| Instance Data Block |
|---|
| Instance Data Header |
| Cyclic Data Block |
| Cyclic Write Data Block |
| Event Data Block |
| Service Data Block |

| Instance Data Header | | | |
|---|---|---|---|
| Instance Num | - | Instance Blk Size | Cyclic Blk Size |
| Cyc. Cmd Blk Size | Cyc. Write Blk Size | Event Blk Size | Service Blk Size |

| Cyclic Data Block | | | |
|---|---|---|---|
| Control Mode | Feedback Config | Drive Control | - |
| Command Data Set | Actual Data Set | Status Data Set | Interpolation Control |
| Cyclic Data ||||

| Cyclic Write Data Block | |
|---|---|
| Cyclic Write Blk ID | Cyclic Read Blk ID |
| Cyclic Write Data ||

| Event Data Block | | | |
|---|---|---|---|
| Event Checking Control ||||
| Event Ack. ID1 | Event Ack. Status 1 | Event Ack. ID2 | Event Ack. Status 2 |
| ... ||||

| Service Data Block | | | |
|---|---|---|---|
| Transaction ID | Service Code | - | - |
| Service Specific Request Data ||||

Figure 1-2 — Drive-to-Controller Connection Format
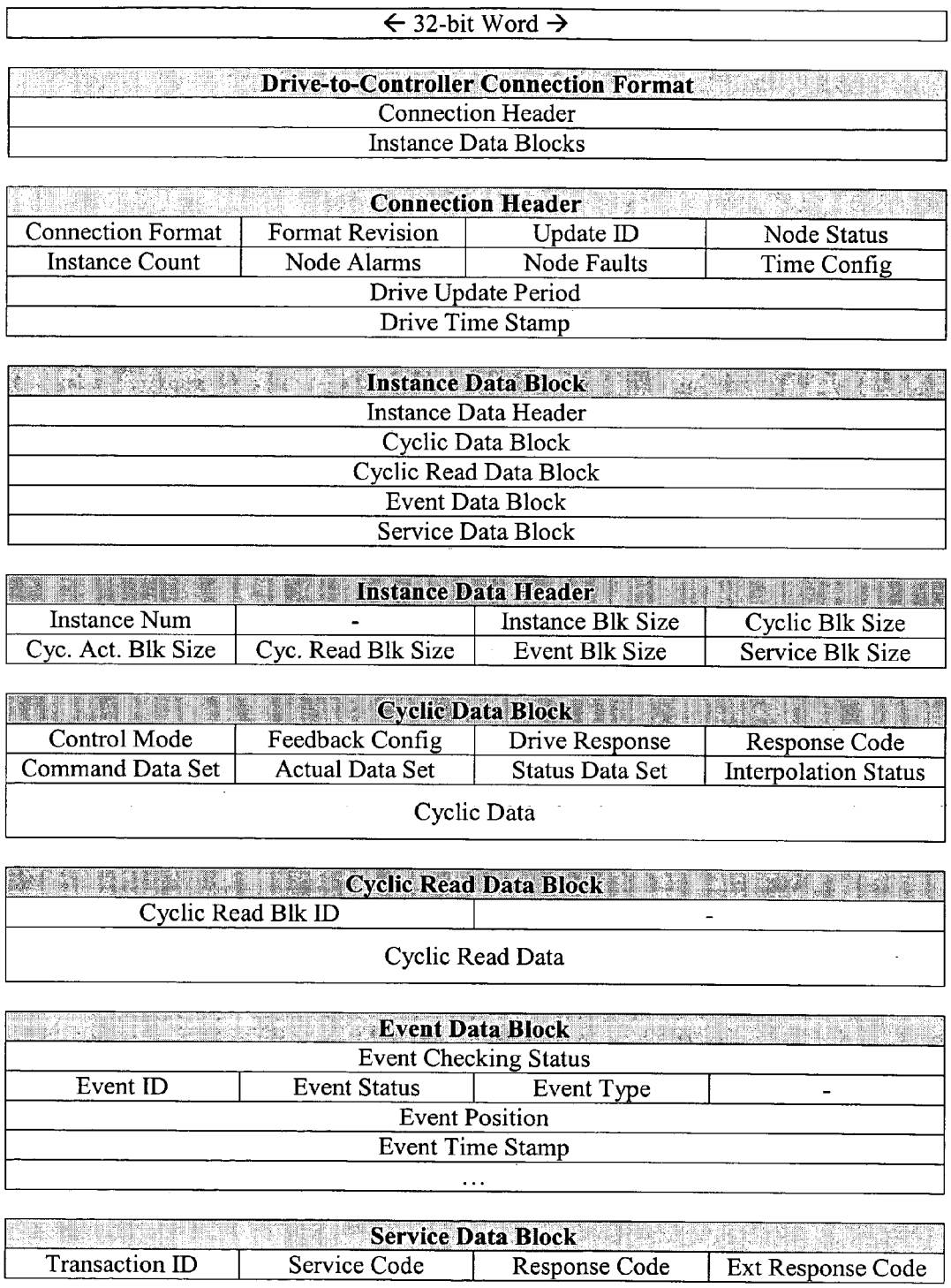

| Service Specific Response Data |
|---|

1.1.3 CIP MOTION DRIVE CONNECTION OVERVIEW

The CIP Motion Drive Connection actually consists of two unidirectional unicast connections; one passing data from the controller to the drive and the other passing data from the drive to the controller. Both connection data structures begin with a Connection Header that includes a 32-bit time stamp, followed by a series of data blocks for each axis instance supported by the drive node.

Data exchange between the drive and the controller is paced by the controller with one Drive-to-Controller data packet sent for every Controller-to-Drive data packet received. The Controller-to-Drive connection packets are sent periodically according to the configured Controller Update Period. The Drive Update Period, i.e. the update period at which the drive performs its control calculations, is typically much faster than the Controller Update Period and most motion control protocols require the Controller Update Period to be an integer multiple of the Drive Update Period. But because the CIP Motion drive connection packet includes a timestamp, the update period of the controller does not need to have any fixed relationship with the update period of the drive. A detailed timing diagram is included at the end of this document.

Each instance data block within the CIP Motion Drive Connection packet consists of three sets of data blocks associated with the cyclic, event, and service data channels. The size of these data blocks for a given update is variable and determined by the connection and instance data block headers. From the drive's perspective, these three distinct data channels have different data processing priorities as illustrated in Fig. 8.

The specific functionality of these three data channels is as follows:

- Cyclic Data Channel – carries cyclic data blocks that are sampled or calculated every Controller Update Period and synchronized with other nodes in the motion control system through use of distributed System Time. Cyclic data is high priority data that must be immediately processed and applied to the drive axis within one Drive Update Period.

- Event Data Channel - carries event data associated with drive event(s) (e.g. registration, homing, etc.) that have occurred within the last Controller Update Period. Event data is medium priority and should be processed and applied within one Controller Update Period.

- Service Data Channel – carries data associated with service requests to read or write attribute values of the Drive Axis Object as part of on-line configuration and diagnostic functionality, as well as service requests to affect Drive Axis Object behavior as part of controller instruction execution. Service data has lowest priority and is typically buffered and processed as a background task. There is no guarantee that a service request will be processed within Controller Update Period.

Taken together, these three data channels provide a comprehensive controller to drive data connection solution for industrial motion control.

1.2 CONTROLLER-TO-DRIVE CONNECTION

To facilitate a detailed description of each of its constituent data elements, the CIP Motion Controller-to-Drive Connection is organized as follows:

Figure 1-3 — CIP Motion Controller-to-Drive Connection Format

| CIP Motion Controller-to-Drive Connection Format |
| --- |
| Connection Header |
| Instance Data Blocks |

1.2.1 CONTROLLER-TO-DRIVE CONNECTION HEADER

The Controller-to-Drive Connection Header contains critical axis configuration information needed to parse the Instance Data Blocks. The fixed portion of the connection header is defined as follows.

Figure 1-4 — Connection Header

| Connection Header | | | |
| --- | --- | --- | --- |
| Connection Format | Format Revision | Update ID | Node Control |

- Connection Format: This enumerated byte determines what the format of CIP Motion connection is according to the following definition:

Figure 1-5 — Connection Format

Bit 7 Bit 0

| Connection Format | |
| --- | --- |
| (Reserved) | Connection Type |

- Connection Type: This 4-bit enumeration defines the CIP Motion connection type as shown below. Valid values for a Controller-to-Drive Connection are 2 and 6. Fixed connections have a fixed connection size during operation to support lower-performance CIP networks like ControlNet and DeviceNet and typically associated with a simple single axis drive device that does not support time synchronization services. Variable connections allow the connection data structure to vary in size during operation and is targeted for high-performance CIP networks like EtherNet/IP.

0 = Fixed Controller Peer-to-Peer Connection

1 = Fixed Drive Peer-to-Peer Connection
2 = Fixed Controller-to-Drive Connection
3 = Fixed Drive-to-Controller Connection
4 = Variable Controller Peer-to-Peer Connection
5 = Variable Drive Peer-to-Peer Connection
6 = Variable Controller-to-Drive Connection
7 = Variable Drive-to-Controller Connection
8-15 = Reserved.

- Format Revision: With an initial release of 1, this value is incremented by 1 for every revision of the Controller-to-Drive Connection format that impacts the interface. The Format Revision allows newer drives to support the connection formats generated by an older controller. It also allows older drives to recognize a newer connection format from a controller that it cannot support and generate an appropriate error.

- Update ID: This cyclic transaction number is incremented every update period. The Update ID is like the CIP sequence count and is used by the drive to determine whether the connection buffer contains fresh data. If the Update ID has not changed, the drive attempts to ride through the missed update by extrapolation based on previous trajectory until fresh data arrives. In the case where the drive axis is not synchronized, or does not support time synchronization services, the time stamp data is either not included or invalid, so no ride through extrapolation is attempted. In that case, the Update ID is the only way for the drive to detect new connection data.

- Node Control: Contains bits used to control the state of the associated drive communications node.

Table 1-1 — Node Control

| Bit | Definition | Syntax |
|---|---|---|
| 0 | Remote Control | 0 = local control request<br>1 = remote control request |
| 1 | Synchronous Control | 0 = enter asynchronous mode<br>1 = enter synchronous mode |
| 2 | Controller Data Valid | 0 = instance data invalid<br>1 = instance data valid |
| 3 | Node Fault Reset | 0 = no action<br>1 = initiate node fault reset |
| 4-7 | (Reserved) | |

The Remote Control bit is used to request that the drive node turn over complete control of the drive device to the controller. If this bit is clear, the drive is under the exclusive control of the local interface; the CIP Motion controller cannot affect the behavior of the drive in any way other than to switch the drive back to Remote Control mode.

The Synchronous Control bit is used by the controller to request synchronous operation of the drive. Synchronous operation is defined as having the drive node's local timer synchronized with System Time and that the drive node is using the Controller Time Stamps to process the connection data. The Synchronous Control bit also implies that the Controller Time Stamp is valid. The bit shall remain set for the duration of synchronous operation. In asynchronous mode, there is no requirement for the local timer to be synchronized nor is time-stamping necessary or even valid.

The Controller Data Valid bit must be set for the drive node to process the instance data blocks. During the connection initialization sequence there may be a period of time where the connection data in the instance data blocks is not yet initialized. This condition can be recognized by the drive by checking first this bit and finding it clear.

The Node Fault Reset bit used to request that the drive perform a reset of the communications node and attempt to clear the Node Fault bit. When the controller detects that the Node Fault bit is clear, the Node Fault Reset bit is cleared. If the communication fault persists, the Node Fault bit may stay set, in which case a power cycle or a complete reconfiguration process must be performed.

1.2.1.1 FIXED CONNECTION HEADER

If the Connection Format is a Fixed Controller-to-Drive Connection the above header is immediately followed by the instance data block.

1.2.1.2 VARIABLE CONNECTION HEADER

If the Connection Format is a Variable Controller-to-Drive Connection then the connection header contains additional fields related to multi-axis drive addressing and time stamping.

Figure 1-6 — Connection Header

| Connection Header | | | |
|---|---|---|---|
| Connection Format | Format Revision | Update ID | Node Control |
| Instance Count | - | - | Time Config |
| Controller Update Period |||| 
| Controller Time Stamp ||||

- Instance Count: This value reflects the number of instance data blocks present in the CIP Motion Controller-to-Drive Connection data structure.

- Time Configuration: This bit-mapped byte contains flags that determine the usage and format of the controller's timing information.

Table 1-2 — Time Configuration

| Bit | Definition | Syntax |
|---|---|---|
| 0 | Update Period | 0 = no update period<br>1 = update period included |
| 1 | Time Stamp | 0 = no time stamp<br>1 = time stamp included |
| 2-7 | (Reserved) | |

- Controller Update Period: This element specifies the update period of the controller data in nanoseconds. When the connection is synchronized, the Controller Update Period can be used by the drive along with the Controller Time Stamp to check for missed or late updates. If the difference between the last Controller Time Stamp and the current local drive time stamp exceeds the maximum value given by, Max Delay = Controller Update Delay High Limit * Controller Update Period, the Controller Update Fault bit is set in the Node Faults class attribute of the Drive Axis Object. An optional Controller Update Delay Low Limit attribute is also available. If the difference between the last Controller Time Stamp and the current local drive time stamp exceeds the maximum value given by, Max Delay = Controller Update Delay Low Limit * Controller Update Period, the Controller Update Alarm bit is set in the Node Alarm class attribute of the Drive Axis Object.

When the connection is synchronized and fine interpolation is enabled, the Controller Update Period is also used by the drive along with the Controller Time Stamp value to compute new coefficients to the interpolation/extrapolation polynomial.

In the case where the connection is not synchronized, no late update checks are performed by the drive. In this case the command data should be applied immediately, which means applying the data immediately as a command reference.

- Controller Time Stamp: This element carries the lower 32-bits of the 64-bit System Time value at the beginning of the Controller Update Period when the controller's update timer event occurred. The Controller Time Stamp is therefore directly associated with the command data contained in the connection. This value is restored to its original 64-bit representation by the drive using the upper 32-bits of drive's local System Time value. The units time stamp are expressed in nanoseconds. Taken together with the Controller Update Period, the drive has all the information it needs compute command interpolation/extrapolation polynomials to correct command data values for differences between the drive and controller update timing. These differences can occur when the Controller Update Period is not an integer multiple of the Drive Update Period or when the drive updates are phase shifted relative to the controller.

1.2.2 INSTANCE DATA BLOCKS

After the Connection Header are one or more Instance Data Blocks as determined by the above Instance Count. The Instance Data Block has the following basic structure:

Figure 1–7 — Instance Data Block

| Instance Data Block |
|---|
| Instance Data Header |
| Cyclic Data Block |
| Event Data Block |
| Service Data Block |

1.2.2.1 INSTANCE DATA HEADER

The Instance Data Header contains critical axis configuration information needed to parse and apply the data contained in the three data channels. This header is only included in the Variable Connection format to accommodate multi-axis drive applications. Information within the header can be used by the drive communications interface to copy the individual data blocks into separate fixed memory locations for processing.

If configured for a Fixed Connection format, only the Cyclic Data Block for a single axis instance is supported so there is no need for any information to specify instance number or block sizing. The Instance Data Header is therefore not included.

Figure 1–8 — Instance Data Header

| Instance Data Header | | | |
|---|---|---|---|
| Instance Num | (Reserved) | Instance Blk Size | Cyclic Blk Size |
| Cyc. Act. Blk Size | Cyc. Write Blk Size | Event Blk Size | Service Blk Size |

- Instance Number: This is the number that identifies the specific Drive Axis Object instance the following instance data block applies to. Drive Axis Object instances are created as a contiguous series of instance numbers starting with instance 1. Within the connection data structure the Instance Numbers for each consecutive instance data block should be an ordinal sequence, i.e. 1, 2, 3, etc... (Note, instance 0 is defined as the class instance and not generally used as part of the connection data.) Thus, in theory, up to 255 instances can be serviced by the CIP Motion Drive Connection.

- Instance Block Size: This value represents the size of the Instance Data Block in 32-bit words including the header. The Instance Block Size is useful when the drive wants to directly access the next instance data block without having to add the sizes of the cyclic, event, and service blocks.

- Cyclic Block Size: This value represents the size to the Cyclic Data Block in 32-bit word units including the header.

- Cyclic Command Block Size: This value represents the size to the Cyclic Command Data Block in 32-bit word units including the header.

- Cyclic Write Block Size: This value represents the size to the Cyclic Write Data Block in 32-bit word units including the header. If the Cyclic Write Block Size of 0 indicates, the drive does not need to support the Cyclic Read/Write functionality.

- Event Block Size: This value represents the size to the Event Data Block in 32-bit word units including the header. If the Event Block Size is 0, the drive does not need to support the event functionality.

- Service Block Size: This value represents the size to the Service Data Block in 32-bit word units including the header. A Service Block Size value of 0 indicates there is no service request to process.

1.2.2.2 CYCLIC DATA BLOCK

The Cyclic Data Header at the top of the Cyclic Data Block is always included regardless of the connection format. This header contains key elements related to the content of the Cyclic Data Block of both the Controller-to-Drive Connection and Drive-to-Controller Connection, and, the context of the data as determined by the Control Mode and Feedback Configuration. The header also provides a mechanism to control the state of the targeted drive axis.

Figure 1-9 — Cyclic Data Header

| Cyclic Data Header ||||
|---|---|---|---|
| Control Mode | Feedback Config | Drive Control | - |
| Command Data Set | Actual Data Set | Status Data Set | Interpolation Control |
| Cyclic Command Data (if Motion Planner in Controller) ||||

- Control Mode: This 8-bit enumerated value that determines the control mode context of the command data as presently configured in the motion controller. This value can be changed while on-line and even while the drive axis is in the Running state. If a particular Control Mode transition is not supported by the drive, an exception is generated that can be configured to perform any one of a number of actions in response to the illegal transition.

- Feedback Configuration: This 8-bit enumerated value that indicates the feedback context of the command data as presently configured in the motion controller. Command data can be referenced to either feedback channel, Feedback 1 or Feedback 2, or no feedback for sensorless operation. This value can be changed while on-line and even while the drive axis is in the Running state. If a particular Feedback Configuration transition is not supported by the drive, an exception is generated that can be configured to perform any one of a number of actions in response to the illegal transition.

- Drive Control: This 8-bit word is an enumerated parameter that can be used to directly execute drive operations that do not require either passing or returning drive parameters, and therefore, do not require a CIP service to initiate. Valid enumerations for this data element are shown below:

Table 1-3 — Drive Control

| Request Code | Requested Operation |
|---|---|
| 0 | No Request |
| 1 | Drive Enable Request |
| 2 | Drive Disable Request |
| 3 | Drive Shutdown Request |
| 4 | Drive Shutdown Reset Request |
| 5 | Drive Abort Request |
| 6 | Drive Fault Reset Request |
| 7-127 | (Reserved) |
| 128-255 | (Vendor Specific) |

Executing a drive operation via the Drive Control mechanism works as follows:

1. Controller sets the desired Drive Control Request Code.
2. Drive detects a new Drive Control Request Code and initiates the requested operation.
3. Once the requested operation is complete, the Drive sets the matching Acknowledge Code in the Drive Response element of the Drive-to-Controller Connection to acknowledge the operation. At the same time the Drive sets the Response Code to 0 if the requested action is successful or to an appropriate error code if the requested operation fails.

4. Controller sees the matching Drive Response Acknowledge Code, processes the Response Code, and then zeroes the originating Drive Control Request Code for the next update cycle. (Alternatively, a different Drive Control Request Code can be issued and we repeat with step 2.)
5. Drive sees the Drive Control Request Code is zero and zeroes the corresponding Drive Response Acknowledge Code prior to the next update cycle.

- Command Data Configuration: This bit mapped value has a bit defined for each possible real-time command reference. Command data appears in the same order in the Command Data Set as the bit numbers, so Command Position would appear before Command Torque in the real-time data structure of the Controller-to-Drive Connection.

Table 1-4 — Command Data Configuration

| Bit | Controller Command Data Element | Data Type |
|---|---|---|
| 0 | Command Position | LINT |
| 1 | Command Velocity | REAL |
| 2 | Command Acceleration | REAL |
| 3 | Command Torque | REAL |
| 4 | Position Trim | LINT |
| 5 | Velocity Trim | REAL |
| 6 | Acceleration Trim | REAL |
| 7 | Torque Trim | REAL |

The Command Data Block can appear in either the Controller-to-Drive connection or the Drive-to-Controller connection depending on the location of the active motion planner. The location of the active motion planner is determined by the Planner Mode value contained in the Drive Control Mode attribute.

If the Planner Mode indicates that the motion planner is running in the controller, the above Controller Command Data Elements apply to the Controller-to-Drive Connection's cyclic data structure and map to corresponding attributes in the Drive Axis Object as shown in the table below. The units of the Command Data Elements match the units defined for the associated Drive Axis Object attribute.

Table 1-5 — Command Data Element to Drive Object Mapping with Controller-based Planner

| Bit | Command Data Element | Drive Axis Object Attribute |
|---|---|---|
| 0 | Command Position | Controller Position Command |
| 1 | Command Velocity | Controller Velocity Command |
| 2 | Command Acceleration | Controller Acceleration Command |
| 3 | Command Torque | Controller Torque Command |
| 4 | Position Trim | Position Trim |
| 5 | Velocity Trim | Velocity Trim |
| 6 | Acceleration Trim | Acceleration Trim |
| 7 | Torque Trim | Torque Trim |

If the Planner Mode indicates that the motion planner is running in the drive, the above Controller Command Data Elements apply to Drive-to-Controller Connection's cyclic data structure and map to corresponding attributes in the Drive Axis Object as shown in the following table.

Table 1-6 — Command Data Element to Drive Object Mapping with Controller-based Planner

| Bit | Command Data Element | Drive Axis Object Attribute |
|---|---|---|
| 0 | Command Position | Planner Command Position |
| 1 | Command Velocity | Planner Velocity |
| 2 | Command Acceleration | Planner Acceleration |
| 3 | Command Torque | - |
| 4 | Position Trim | - |
| 5 | Velocity Trim | - |
| 6 | Acceleration Trim | - |
| 7 | Torque Trim | - |

It is the job of the controller to insure that the necessary Command Data Elements are included in the connection data to support the specified Drive Operating Mode.

- Actual Data Configuration: This bit mapped value has a bit defined for each possible real-time actual data attribute that is to be included in the Actual Data Set of the Drive-to-Control connection's Instance Data Block in the next update. Actual data appears in the same order as the bit numbers, so Actual Position would appear before Actual Torque in the Actual Data Set structure. Using this mechanism, the contents of the Actual Data Set may be changed at any time during drive operation.

Table 1-7 — Actual Data Configuration

| Bit | Actual Data Element Produced | Data Type |
|---|---|---|
| 0 | Actual Position | LINT |
| 1 | Actual Velocity | REAL |
| 2 | Actual Acceleration | REAL |
| 3 | Actual Torque | REAL |
| 4 | Actual Current | REAL |
| 5 | Actual Voltage | REAL |
| 6 | Actual Frequency | REAL |
| 7 | (Reserved) | |

The above Actual Data Elements map to corresponding attributes in the Drive Axis Object as shown in the table below. The units of the Actual Data Elements match the units defined for the associated Drive Axis Object attribute.

Table 1-8 — Actual Data Element to Drive Axis Object Attribute Mapping

| Bit | Command Data Element | Drive Axis Object Attribute |
|---|---|---|
| 0 | Actual Position | Position Feedback |
| 1 | Actual Velocity | Velocity Feedback |
| 2 | Actual Acceleration | Acceleration Feedback |
| 3 | Actual Torque | Torque Reference |
| 4 | Actual Current | Output Current |
| 5 | Actual Voltage | Output Voltage |
| 6 | Actual Frequency | Output Frequency |
| 7 | | |

- Status Data Configuration: This bit-mapped byte contains flags that determine the contents of the Status Data Set of the Drive-to-Control connection's Instance Data Block in the next update. Status data appears in the same order as the bit numbers, so Drive Status would appear before, say, Fault History data in the Status Data Set structure. The definitions of each of these Status Data Elements can be found by looking up the corresponding Drive Axis Object attribute specification.

Table 1-9 — Status Data Configuration

| Bit | Status Data Element Produced | Data Type |
|---|---|---|
| 0 | Drive State<br>Mfg Drive State<br>Drive Status<br>Mfg Drive Status | WORD<br>WORD<br>WORD<br>WORD |
| 1 | Drive Fault Code<br>Initialization Fault Code<br>Start Inhibit Code<br>Drive Alarm Code<br>Fault Time Stamp | USINT<br>USINT<br>USINT<br>USINT<br>UDINT |
| 2 | Drive Fault Status<br>Mfg Drive Fault Status | LWORD<br>LWORD |
| 3 | Drive Alarm Status<br>Mfg Drive Alarm Status | LWORD<br>LWORD |
| 4 | Start Inhibit Status<br>Mfg Start Inhibit Status | WORD<br>WORD |
| 5 | Drive I/O Status<br>Mfg Drive I/O Status | DWORD<br>DWORD |
| 6 | Planner Status<br>Mfg Planner Status<br>Jog Process Status<br>Move Process Status<br>Master Move Process Status<br>Gear Process Status<br>Home Process Status<br>TCam Process Status<br>PCam Process Status | WORD<br>WORD<br>WORD<br>WORD<br>WORD<br>WORD<br>WORD<br>DWORD<br>DWORD |
| 7 | (Reserved) | |

- Interpolation Control: The byte contains information needed to control the fine interpolation algorithm and determine the target time of the command data to the drive control structure.

Table 1-10 — Interpolation Control

| Bit | Definition | Syntax |
|---|---|---|
| 0-1 | Command Target Time | 0 = Immediate<br>1 = +1 Update Period<br>2 = +2 Update Periods |
| 3-5 | (reserved) | |
| 6-7 | (vendor specific) | |

Command Target Time - This 2-bit integer defines a specific time relative to the Connection Time Stamp that the Command Data is targeted for, as defined by the controller's motion planner. The absolute command target time is the sum of the Controller Time Stamp from the controller and the product, Command Target Time * Controller Update Period.

A Command Target Time of 0 implies that the Command Data is targeted for the beginning of the current update cycle and, thus, needs to be applied to the control structure Immediately. In this case there is no need for any find interpolation. This situation can occur when the Controller Update Period is significantly shorter than the Drive Update Period, or when the controlled motion of the axis is nearly constant during the span of the Controller Update Period.

A Command Target Time of 1 implies the target for the Command Data is the next Connection Update timer event. In this case, the command interpolator functions primarily as an extrapolator that estimates the next Command Data value based on the present trajectory of the axis. This is a typical setting when the Controller Update Period is comparable to the Drive Update Period or when the controlled motion of the axis is relatively constant during the span of the Controller Update Period.

A Command Target Time of 2 implies the target for the Command Data is two Connection Update timer events from the Connection Time Stamp. In this case, the command interpolator can compute a smooth trajectory based on the current dynamics of the motor to reach the Command Data value at the targeted time. This is true fine interpolation and is applicable when the Controller Update Period is significantly larger than the Drive Update Period.

- Cyclic Command Data: The Cyclic Command Data contains high priority data that needs to be applied to the associated drive axis instance during the next drive update. This block consists of command data elements that are applied as references to the drive's control algorithms and explicitly determined by the Command Data Set element in the Cyclic Command Data Header.

1.2.2.3 CYCLIC WRITE DATA BLOCK

The Cyclic Write Data Block can be used to synchronously update one or more targeted Drive Axis Object configuration parameters within the drive. This mechanism can be used in conjunction with a Function Block program to implement sophisticated outer loop control, gain scheduling, and dynamic limiting algorithms. Unlike service channel Set Drive Attribute service requests, which may take several drive update cycles to process, the Cyclic Write Data mechanism guarantees the targeted parameter is applied at the next available drive update.

The Cyclic Write Data Block is only supported in the Variable Connection format.

Figure 1-10 — Cyclic Write Data Block

| Cyclic Write Data Block ||
|---|---|
| Cyclic Write Blk ID | Cyclic Read Blk ID |
| Cyclic Write Data ||

The associated header for this block contains key elements related to the content of the Cyclic Write Data Block.

- Cyclic Write Block ID: This 16-bit ID determines the pre-defined Cyclic Write Block structure to apply to the Cyclic Write Data for this update. Cyclic Write Block structures are defined using the Set Cyclic Write Data List service. A successful response to this service includes a new Cyclic Write Blk ID that can be used in the next connection update to pass cyclic data in this format.

- Cyclic Read Block ID: This 16-bit ID determines the pre-defined Cyclic Read Block structure to apply to the Cyclic Read Data for next Drive-to-Controller connection update. Cyclic Read Block structures are defined using the Set Cyclic Read Data Block service. A successful response to this service includes a new Cyclic Read Blk ID that can be used in the next connection update to allow the drive to use the new Cyclic Read Data format for next available Drive-to-Controller connection update.

- Cyclic Write Data: The Cyclic Write Data contains high priority data that needs to be applied to the associated drive axis instance during the next drive update. This block consists of parametric data elements that are applied to Drive Axis Object attributes that are used by the control algorithms. The contents of the Cyclic Write Data are explicitly determined by the structure identified by the Cyclic Write Blk ID found in the Cyclic Write Data Header.

1.2.3 EVENT DATA BLOCK

The Event Data Block is used to convey information regarding the event channel. In particular the Event Data Block for the Controller-to-Drive Connection is used to control the arming of event checking functions in the drive as well as acknowledge receipt of event notifications from the drive that are sent via the Drive-to-Controller Connection's Event Data Block.

The Event Data Block for the Controller-to-Drive Connection has the following format.

Figure 1–11 — Event Data Block

| Event Data Block | | | | |
|---|---|---|---|---|
| Event Checking Control | | | | |
| Event Ack. ID1 | Event Ack. Status 1 | Event Ack. ID2 | Event Ack. Status 2 | |
| ... | | | | |

- Event Checking Control: This 32-bit word is copied into the Drive Axis Object attribute of the same name that is used to enable various drive inputs, e.g. marker and registration inputs, to generate events. When these events occur, the drive captures both the time and exact axis position when the event occurred. The last 4 bits of the Event Checking Control is a binary value that specifies the number of active events, which is literally the number of Event Acknowledge IDs listed in this Event Data Block.

The Event Control mechanism works as follows:

1. Controller sets the appropriate Event Checking bit to look for a specific event condition to occur. Multiple bits in the Event Checking Control word may be set at any given time.
2. Drive detects the Event Checking Control request bit is set and initiates the requested event checking action.
3. Drive sets the corresponding Event Checking Status bit to acknowledge that the drive is now actively checking for the specified event condition.
4. Controller sees the Event Checking Status bit from the drive is set indicating that specified event trigger is "armed" at the drive. Starting with this update the controller can process any event notifications from the drive that match the specified event condition.
5. Drive detects the specified event condition and sends an Event Notification Data Block to the controller. If the associated Auto-rearm bit is clear in the Event Checking Control word, the drive discontinues checking for the specified event. However, the Event Checking Status bit remains set until the Event Checking Request bit is cleared by the controller. Note that notifications for other events can be sent in the same update.
6. Controller processes the Event Notification, sends the Event Acknowledge to the drive and, if Auto-rearm is not enabled, clears the associated Event Checking bit for the next Controller-to-Drive connection update.
7. Drive detects the Event Checking Request bit is clear and clears the corresponding Event Checking Status bit prior to the next Drive-to-Controller connection update.

8. Controller is able to set the Event Checking bit again as soon as it sees the associated Event Checking Status bit has been reset. So, the minimum time between when the Event Notification was received by the controller to the time when the drive is rearmed for the next event is one Controller Update Period.

In the case of a Registration event where Auto-rearm Event Checking is requested, the event handling sequence would be as follows:

1. Controller sets the appropriate Event Checking bit to look for a specific event condition to occur and also sets the Auto-rearm bit for that event condition.
2. Drive detects the Event Checking Control request bit is set and initiates the requested event checking action.
3. Drive sets the corresponding Event Checking Status and Auto-rearm bits to acknowledge that the drive is now actively checking for the specified event condition.
4. Controller sees the Event Checking Status bit from the drive is set indicating that specified event trigger is "armed" at the drive. Starting with this update the controller can process any event notifications from the drive that match the specified event condition.
5. Drive detects the specified event condition and sends an Event Notification Data Block to the controller. Since the corresponding Auto-rearm bit is set, the drive continues checking for the specified event. The Event Checking Status bit remains set until the Event Checking Request bit is cleared by the controller.
6. Controller processes the Event Notification, sends the Event Acknowledge to the drive but, since the Auto-rearm bit is enabled, it leaves the associated Event Checking bit set for the next Controller-to-Drive connection update.
7. Drive receives the Event Acknowledge from the controller. It can now send another Event Notification if the specified event has occurred again. Otherwise...
8. Drive continues checking for the specified event condition and sends an Event Notification Data Block to the controller whenever the event condition occurs. The Event Checking Status bit remains set until the Event Checking Request bit is cleared by the controller. With the Auto-rearm feature, event checking is continuously enabled, insuring that no registration events are missed during the normal one cycle delay in re-arming the event checking mechanism. The down side of Auto-rearm feature is that it can generate a multitude of uninteresting events to process, theoretically, as many as one specified event per Controller Update Period.

- Event Acknowledge ID: Transaction number assigned to this event by the original event notification. Each event is assigned a new Event ID by incrementing the current Event ID stored in the drive. Using the Event ID, the drive is able to match the event acknowledgement to the appropriate event notification to complete the event data transaction.

- Event Acknowledge Status: Enumerated value indicating controller response to the event. A value of 0 indicates that the event was successfully processed. A non-zero value indicates that an error occurred in the event processing and the event should be resent.

1.2.4 SERVICE DATA BLOCK

The service data block allows one service request per instance to be sent to the drive in a given update. The service request requires a specific service response from the drive indicating success or an error. In some cases the response service contains requested data. In any case, the service request data persists in the Controller-to-Drive Connection data structure until the controller receives the associated service response from the drive.

Each service request is represented by a block of data organized as shown below.

The first 4 bytes of the service data block may not follow the traditional CIP standard messaging format. That is primarily because this connection structure is, fundamentally, a CIP Implicit I/O connection, not an Explicit Messaging connection. However, the case of a Fixed Connection format, the Service Specific Request Data defined below is sent via an Explicit Messaging connection and follows the CIP rules for explicit service request format.

Figure 1-12 — Service Data Block

| Service Data Block | | | |
|---|---|---|---|
| Transaction ID | Service Code | - | - |
| Service Specific Request Data ||||

- Transaction ID: Transaction number assigned to this service request by the controller. Each service request is assigned a new Transaction ID by incrementing the current Transaction ID stored in the controller. Using the Transaction ID, the controller is able to match the service response to the appropriate service request and complete the service transaction.

- Service Code: Identifier that determines the object specific service request that follows. The list of supported Service Codes can be found in the Object Specific Services section of this document. CIP Common services are generally not applicable to the Service Data Block.

- Service Specific Request Data: The format and syntax of the Service Specific Request Data depends on the specified Service Code. This is true regardless of whether the service specific request data is passed in the Controller-to-Drive connection or as part of an Explicit messaging connection.

1.2.5 CONTROLLER-TO-DRIVE CONNECTION TIMING

The CIP Motion Drive connection data exchange is initiated by the controller via the Controller-to-Drive Connection packet. The inclusion of Time Stamp information along with the command data in this packet relieves the stringent timing requirements imposed by other motion control network protocols. The diagram in Fig. 12 illustrates how command data and time stamps delivered by the Controller-to-Drive connection are applied to the drive axis when fine interpolation is required.

The following steps describe in detail how connection data is transferred from the controller to the drive during a typical connection cycle in the general case where the Controller Update Period (CUP) is not an integer multiple of the drive update period.

1. Controller Transmit: As part of the Control Task, the controller initiates transmission of a Controller-to-Drive Connection packet with new command data to the targeted drive with an incremented Update ID and a new Controller Time Stamp referencing the time at the start of the current Controller Update Period. The instance data block for the targeted axis also contains the Command Target Time, which in this example is set to 2 to support a fine interpolation interval of 2 * Controller Update Period (CUP).

2. Command Update ID Check: The drive runs a periodic Drive Task that checks every Drive Update Period for new Controller-to-Drive Connection packet data. This can be easily done by checking for a changed Update ID. If the drive task discovers fresh data, then this is a command data update cycle and the command data must be further processed according to the following sequence.

3. Synchronous Operation Check: Next, the drive checks if it is synchronized. If not synchronized, skip to the Apply Command Data step since there is no need to perform the Late Update Check. Bypassing the Late Update Check allows for control of the drive during start-up or even in the case where the drive does not have any time synchronization services.

4. Late Update Check: If the drive is synchronized, the drive computes the difference between the current drive update time stamp and the Controller Time Stamp in the Controller-to-Drive Connection packet. If the difference is greater than Controller Update Delay High Limit * Controller Update Period, the drive throws a Controller Update Fault. Note that if the time difference has exceeded twice the Connection Update Period, the current fine interpolator polynomial has become, effectively, an extrapolator polynomial allowing the drive to ride through the late data condition until the new data arrives.

5. Apply Command Data: Since a fine interpolator is used in this example, the Drive computes coefficients for the fine interpolation polynomial based on the command reference being applied to the Target Time of the Controller Time Stamp, Tctrl, plus the product of the Command Target Time and Controller Update Period, or 2 * CUP. If the Target Time is less than the current System Time in the drive, new coefficients to the polynomial are still computed based on this command data to improve the accuracy of the extrapolation calculations. In general, whenever command data is late, the data still represents the freshest command data available and should be applied as soon as possible.

If the Command Target Time is set to 1, the computed polynomial in step 5 is not applied for the purpose of fine interpolation but rather for extrapolation; the extrapolation polynomial allows the drive to compute an accurate command data value at the time the drive performs its control calculations based on previous axis trajectory. The diagram in Fig. 13 illustrates this timing model in the general case where the Controller Update Period (CUP) is not an integer multiple of the drive update period.

Note in the above example there are not many Drive Update Periods in a given Controller Update Period. When this is the case, fine interpolation is not critical to drive performance and command data can be applied more directly to the drive's control structure without the extra delay required to support fine interpolation. Extrapolation has the disadvantage however that extrapolation error is manifested more directly to the command data resulting in rougher motion than when using fine interpolation..

All cyclic data associated with the Controller-to-Drive Connection packet should be applied in the Drive Task command update to make the earliest possible use of fresh command data, computing new polynomial coefficients, regardless of the Command Target Time.

1.2.5.1 DRIVE UPDATE PERIOD INDEPENDENCE

The timing diagram in Fig. 14 illustrates how two drive axes can be tightly coordinated despite having different Drive Update Periods and despite having an associated Controller Update Period that is not an integer multiple of either Drive Update Period.

In the timing diagram of Fig. 14, the controller's motion planner task sends identical command positions and time stamps to two slave drive axes that, while synchronized with System Time, are running at different drive update rates. When the command position data arrives at the two drives, they use the Controller Time Stamp, the Command Target Time, and the Controller Update Period to compute new coefficients to the interpolation polynomial based on the constraint that the polynomial value at time equal to (Controller Time Stamp + Command Target Time * Controller Update Period) is the specified Command Position value. Since there is no dependency on the drive update rate, the polynomial coefficients computed by each drive are identical. Since neither drive has an update that coincides with this target time, the drives use the fine interpolation polynomial to calculate the command position reference for each drive update until a fresh command position is received from the controller. If a new command position does not arrive until well after the target time, the drive continues to use the same polynomial equation to "extrapolate" command position for subsequent drive updates as shown in the above diagram. This extrapolation continues until fresh data arrives and new coefficients can be calculated. In this way, whether by interpolation or extrapolation, each slave axis runs smoothly and the two axes stay phase locked with the master axis.

1.2.5.2 TRANSMISSION LATENCY INDEPENDENCE

Precise coordination of multiple CIP Motion drive axes can be maintained even when the Controller-to-Drive connection packets incur significant delays while traveling across the CIP network. In the diagram in Fig. 15, the packet for Slave Drive Axis 2 has incurred a significant delay during transmission. As a result, the command position for this axis must be extrapolated from the last fine interpolation polynomial. This allows the axis to move smoothly through a transmission latency disturbance. When the new command data does arrive, the new command value may not agree with extrapolated value due to extrapolation error. This error can result in a disturbance to the motion profile. The magnitude of the extrapolation error depends on the dynamics of the motion profile and the controller update rate. In most real-world applications, transmission latencies lasting several update periods can occur without any noticeable disturbance to the associated motion profile.

1.3 DRIVE-TO-CONTROLLER CONNECTION

Like the Controller-to-Drive Connection data structure described above, the CIP Motion Controller-to-Drive Connection is organized as follows:

Figure 1–13 — CIP Motion Controller-to-Drive Connection Format

| CIP Motion Controller-to-Drive Connection Format |
|---|
| Connection Header |
| Instance Data Blocks |

1.3.1 DRIVE-TO-CONTROLLER CONNECTION HEADER

The Drive-to-Controller Connection Header contains critical axis configuration information needed to parse the Drive-to-Controller connection data block. The fixed portion of the connection header is defined as follows:

Figure 1–14 — Connection Header

| Connection Header | | | |
|---|---|---|---|
| Connection Format | Format Revision | Update ID | Node Status |

- Connection Format: Same as Controller-to-Drive definition except the required value for the Connection Type is either 3, indicating a Fixed Drive-to-Controller connection type or 7, indicating a Fixed Drive-to-Controller connection type.

0 = Fixed Controller Peer-to-Peer Connection
    1 = Fixed Drive Peer-to-Peer Connection
    2 = Fixed Controller-to-Drive Connection
    3 = Fixed Drive-to-Controller Connection
    4 = Variable Controller Peer-to-Peer Connection
    5 = Variable Drive Peer-to-Peer Connection
    6 = Variable Controller-to-Drive Connection
    7 = Variable Drive-to-Controller Connection
    8-15 = Reserved.

- Format Revision: Same as Controller-to-Drive definition.

Update ID: The Drive-to-Controller connection Update ID should match the Update ID of the preceding Controller-to-Drive Update ID and therefore should be incremented every update period. In the case where the associated Controller-to-Drive packet is lost or late, the Drive-to-Controller Update ID should be incremented as if the Controller-to-Drive packet had arrived on time. This allows the CIP Motion control system to ride through a lost or missed Controller-to-Drive packet and maintain synchronization with matching Update IDs.

The Update ID is like the CIP message sequence count and is used by the controller to determine whether the connection buffer contains fresh data. If the Update ID has not changed, the controller attempts to ride through the missed update by extrapolation based on previous trajectory until a fresh update arrives. In the case where the axis is not synchronized, or does not support time synchronization services, the time stamp data is either not included or invalid, so no ride through extrapolation is attempted. In that case, the Update ID is also the only way for the controller to detect new connection data.

- Node Status: Contains bits used to indicate the status of the associated drive communications node.

Table 1-11 — Node Status

| Bit | Definition | Syntax |
|---|---|---|
| 0 | Remote Mode | 0 = local control mode<br>1 = remote control mode |
| 1 | Synchronization Mode | 0 = asynchronous mode<br>1 = synchronous mode |
| 2 | Drive Data Valid | 0 = instance data invalid<br>1 = process instance data |
| 3 | Drive Node Fault | 0 = no node fault condition<br>1 = node fault condition |
| 4-5 | (Reserved) | |
| 6-7 | (Vendor Specific) | |

The Remote Mode bit is used to indicate that the drive node has turned over total control of the drive device to the controller. If this bit is clear, the drive will not act on any data contained in the Controller-to-Drive cyclic or service channels.

The Synchronization Mode bit indicates whether or not the drive node is synchronized. Synchronous operation is defined as having the drive node's local timer synchronized with System Time and that the drive node is using the connection time stamps to process the connection data. The Synchronization Mode bit being set also implies that the Drive Time Stamp is valid. The bit shall remain set for the duration of synchronous operation. If the Synchronization Mode bit is clear the drive is said to be in Asynchronous mode. In Asynchronous mode, there is no requirement for the local timer to be synchronized nor is time-stamping necessary or even valid.

The Drive Data Valid bit must be set for the controller to process the instance data blocks from the drive node. During the connection initialization sequence there may be a period of time where the connection data in the instance data blocks is not yet initialized. This condition can be recognized by the controller by first checking this bit.

The Drive Node Fault bit is used to indicate that the drive has detected one or more fault conditions related to the communications node. Specific fault conditions can be determined by the Node Fault attribute. If this bit is clear, there are no fault conditions present. The Drive Node Fault bit may be cleared by setting the Node Fault Reset bit in the Node Control word. All associated axes are disabled when a Node Fault condition is present.

1.3.1.1 FIXED CONNECTION HEADER

If the Connection Format is a Fixed Drive-to-Controller Connection the above header is immediately followed by the instance data block.

1.3.1.2 VARIABLE CONNECTION HEADER

If the Connection Format is a Variable Drive-to-Controller Connection then the connection header contains additional fields related to multi-axis drive addressing and time stamping.

Figure 1–15 — Connection Header

| Connection Header ||||
|---|---|---|---|
| Connection Format | Format Revision | Update ID | Node Control |
| Instance Count | Node Alarms | Node Faults | Time Config |
| Drive Update Period ||||
| Drive Time Stamp ||||

- Instance Count: Same as Controller-to-Drive definition.

- Node Alarms: Contains bits used to indicate the alarm conditions of the associated drive communications node.

Table 1-12 — Node Alarms

| Bit | Definition | Syntax |
|---|---|---|
| 0 | Control Update Alarm | |
| 1 | Peer Update Alarm | |
| 2 | Processor Alarm | |
| 3 | Hardware Alarm | |
| 4-5 | (Reserved) | |
| 6-7 | (Vendor Specific) | |

The Sync Update Alarm bits indicate that updates from the controller have been excessively late.

The Processor Alarm indicates that the processor associated with drive is experiencing overload conditions that could eventually lead to a fault The Hardware Fault indicates that the critical support hardware (FPGA, ASIC, etc.) associated with the drive node is experiencing conditions that could lead to a fault.

- Node Faults: Contains bits used to indicate the fault conditions of the associated drive communications node.

Table 1-13 — Node Faults

| Bit | Definition | Syntax |
|---|---|---|
| 0 | Control Update Fault | |
| 1 | Peer Update Fault | |
| 2 | Processor Fault | |
| 3 | Hardware Fault | |
| 4-5 | (Reserved) | |
| 6-7 | (Vendor Specific) | |

The Sync Update Fault bits indicate that updates from the controller have been excessively late.

The Processor Fault indicates that the processor associated with the drive node has experienced a fault condition such as an excessive overload condition that has tripped the associated processor watchdog mechanism.

The Hardware Fault indicates that the critical support hardware (FPGA, ASIC, etc.) associated with the drive node has experienced a fault condition.

- Time Configuration: Same as Controller-to-Drive definition.

- Drive Update Period: This element represents the current period between drive control calculations that apply the command data. This value is used by the controller to configure the behavior of the fine interpolation blocks that are applied to the command data. If the Controller Update Period is much longer than the Drive Update Period, fine interpolation is generally applied. When the Controller Update Period is comparable to the Drive Update Period, fine interpolation is unnecessary and only extrapolation is required to perform time stamp corrections.

- Drive Time Stamp: This time stamp value reflects the lower 32-bits of the 64-bit System Time value, in nanoseconds, when the drive's update timer event occurred. This value is restored to its original 64-bit representation by the controller using the upper 32-bits of controller's local System Time value. With the Drive Time Stamp, the controller has all the information it needs to correct actual response data values for differences between the drive and controller update timing that result when the Controller Update Period is not an integer multiple of the Drive Update Period or when the drive updates are phase shifted relative to the controller. It is assumed in this timing model that the Drive Time Stamp is registered to the beginning of the drive update period and is also the time when feedback was last captured. In the case where the Drive Time Stamp does not match the local update time stamp of the controller, the controller extrapolates the actual response data value based on trajectory to correspond to the controller's time stamp. The timing diagram in Fig. 16 illustrates how axis position data from the drive is adjusted by the controller based on the relative time stamps between the drive and the controller.

1.3.2 INSTANCE DATA BLOCKS

After the Connection Header are one or more Instance Data Blocks as determined by the above Instance Count. The Instance Data Block is very similar to that of the Controller-to-Drive Connection and has the following basic structure:

Figure 1-16 —Instance Data Block

| Instance Data Block |
|---|
| Instance Data Header |
| Cyclic Data Block |
| Event Data Block |
| Service Data Block |

1.3.2.1 INSTANCE DATA HEADER

The Instance Data Header contains critical axis configuration information needed to parse and apply the data contained in the three data channels. This header is only included in the Variable Connection format to accommodate multi-axis drive applications. Information within the header can be used by the drive communications interface to copy the individual data blocks into separate fixed memory locations for processing.

If configured for a Fixed Connection format, only the Cyclic Data Block for a single axis instance is supported so there is no need for any information on instance number or block sizing. Hence, the Instance Data Header is not included in the connection structure.

Figure 1–17 — Instance Data Header

| Instance Data Header | | | |
|---|---|---|---|
| Instance Num | - | Instance Blk Size | Cyclic Blk Size |
| Cyc. Act. Blk Size | Cyc. Read Blk Size | Event Blk Size | Service Blk Size |

- Instance Number: Same as Controller-to-Drive definition

- Instance Block Size: Same as Controller-to-Drive definition.

- Cyclic Block Size: Same as Controller-to-Drive definition.

- Cyclic Actual Block Size: Same as Controller-to-Drive definition.

- Cyclic Read Block Size: Same as Controller-to-Drive definition.

- Event Block Size: Same as Controller-to-Drive definition.

- Service Block Size: Same as Controller-to-Drive definition.

1.3.2.2 CYCLIC DATA BLOCK

The Cyclic Data Header at the top of the Cyclic Data Block of the Drive-to-Controller Connection is always included regardless of the connection format. This header contains key elements related to the content of the Cyclic Data Block and the context of the data within the block with respect to the drive. Most of these elements are established by, and are therefore direct copies of, corresponding elements of the previous Controller-to-Drive Connection Cyclic Data Block. Thus, the content of the Cyclic Data Block for the Drive-to-Controller Connection is ultimately determined by the controller.

Figure 1–18 — Cyclic Data Block

| Cyclic Data Block | | | |
|---|---|---|---|
| Control Mode | Feedback Config | Drive Response | Response Code |
| Command Data Set | Actual Data Set | Status Data Set | Interpolator Status |
| Cyclic Command Data (if Motion Planner in Drive) | | | |
| Cyclic Actual Data | | | |
| Cyclic Status Data | | | |

- Control Mode: Same as Controller-to-Drive definition.

- Feedback Config: Same as Controller-to-Drive definition.

- Drive Response: The 8-bit Drive Response is an enumerated value that is used for handshaking with the corresponding Drive Control element of the Controller-to-Drive Connection to directly initiate drive operations that do not require a CIP service request. Valid Acknowledge Codes match the corresponding Request Codes of the Drive Control element, and are shown below:

Table 1-14 — Drive Response

| Acknowledge Code | Drive Response |
|---|---|
| 0 | No Acknowledge |
| 1 | Drive Enable Acknowledge |
| 2 | Drive Disable Acknowledge |
| 3 | Drive Shutdown Acknowledge |
| 4 | Drive Shutdown Reset Acknowledge |
| 5 | Drive Abort Acknowledge |
| 6 | Drive Fault Reset Acknowledge |
| 7-127 | (Reserved) |
| 128-255 | (Vendor Specific) |

See Controller-to-Drive definition for Drive Control for details on the Drive Control/Response sequencing.

- Response Code: When there is a non-zero Acknowledge Codes in the Drive Response, a Response Code value is also provided to indicate success or failure of the requested Drive Control operation. A Response Code of 0 indicates success, while a non-zero value indicates an error. The Response Code values comply with the CIP Common standard for General Status codes.

- Command Data Configuration: Same as Controller-to-Drive definition.

- Actual Data Configuration: Same as Controller-to-Drive definition.

- Status Data Configuration: Same as Controller-to-Drive definition.

- Interpolator Status: The byte contains flags to indicate the current status of the interpolation block according to the table shown below.

Table 1-15 — Interpolator Status

| Bit | Definition | Syntax |
|---|---|---|
| 0-1 | Command Target Time | 0 = Immediate<br>1 = +1 Update Period<br>2 = +2 Update Periods |
| 2-5 | (reserved) | |
| 6-7 | (vendor specific) | |

The Command Target Time is used to determine the current target time being applied to the command position by the fine interpolator for this axis instance. This knowledge is important to the proper function of the Controller's motion planner Update Delay compensation algorithm.

- Cyclic Command/Actual/Status Data: The Cyclic Command/Actual/Status Data contains high priority data that needs to be applied to the associated drive axis instance during the next drive update. This block consists of actual data elements and status data elements that are consumed by the controller as explicitly determined by the Actual Data Set and the Status Data Set elements in the Cyclic Actual/Status Data Header.

1.3.2.3 CYCLIC READ DATA BLOCK

The Cyclic Read Data Block can be used to synchronously update one or more targeted Controller Axis Object attributes within the controller based on the current value of associated attributes in the drive. This mechanism can be used in conjunction with a Function Block program to implement sophisticated outer loop control based on a wide variety of available drive control signals. Unlike service channel Get Drive Attribute service requests, which may take several drive update cycles to process, the Cyclic Read Data mechanism guarantees the targeted parameter is updated every connection cycle.

The Cyclic Read Data Block is only supported in the Variable Connection format.

Figure 1-19 — Cyclic Read Data Block

| Cyclic Read Data Block | |
|---|---|
| Cyclic Read Blk ID | - |
| Cyclic Read Data | |

The associated header for this block contains key elements related to the content of the Cyclic Write Data Block.

- Cyclic Read Block ID: This 16-bit ID determines the pre-defined Cyclic Read Block structure to apply to the Cyclic Read Data for this update. Cyclic Read Block structures are defined using the Set Cyclic Read Data List service. A successful response to this service includes a new Cyclic Read Blk ID that can be used in the next connection update to pass cyclic data in this format.

- Cyclic Read Data: The Cyclic Read Data contains high priority data that needs to be applied to the associated controller axis instance. This block consists of signal and status data elements that are to be scaled and applied to corresponding Motion Axis Object attributes. The contents of the Cyclic Read Data are explicitly determined by the structure identified by the Cyclic Read Blk ID found in the Cyclic Read Data Header.

1.3.3 EVENT DATA BLOCK

The Event Data Block allows multiple event notifications to be sent to the drive in a given update. Each event notification requires a specific event acknowledge indicating success or an error. The event notification data persists in the Drive-to-Controller Connection data structure until the drive receives the corresponding event acknowledgement from the controller.

The Event Data Block for the Drive-to-Controller Connection has the following format.

Figure 1-20 — Event Data Block

| Event Data Block ||||
|---|---|---|---|
| Event Checking Status ||||
| Event ID | Event Status | Event Type | - |
| Event Position ||||
| Event Time Stamp ||||
| ... ||||

- Event Checking Status: This 32-bit word is a bit mapped parameter used to indicate if the drive is currently checking for events based on various drive inputs, e.g. marker, home, and registration inputs. Event checking is initiated when the corresponding Event Checking Control bit is set in the Controller-to-Drive connection. When an event occurs, the drive captures both the time and exact axis position and passes this information to the controller in event data blocks. But for the controller to process the event data, the corresponding event checking status bit must be set.

- Event ID: Transaction number assigned to this event by the original event notification. Each event is assigned a new Event ID by incrementing the current Event ID stored in the drive. Using the Event ID, the drive is able to match the event acknowledgement to the appropriate event notification to complete the event data transaction.

- Event Status: Enumerated value indicating controller response to the event. A value of 0 indicates that the event was successfully processed. A non-zero value indicates that an error occurred in the event processing and the event should be resent.

- Event Type: This enumerated value describes the type of event that occurred. Valid event type are as follows:

Table 1-16 — Event Type

| Event Type | Event Description |
|---|---|
| 0 | Registration 1 Positive Edge |
| 1 | Registration 1 Negative Edge |
| 2 | Registration 2 Positive Edge |
| 3 | Registration 2 Negative Edge |
| 4 | Marker 1 Positive Edge |
| 5 | Marker 1 Negative Edge |
| 6 | Marker 2 Positive Edge |
| 7 | Marker 2 Negative Edge |
| 8 | Home Switch Positive Edge |
| 9 | Home Switch Negative Edge |
| 10 | Home Switch-Marker Positive Edge |
| 11 | Home Switch-Marker Negative Edge |
| 12-127 | (reserved) |
| 128-256 | (vendor specific) |

- Event Position: 64-bit integer representation of the axis position when the designated event occurred.

- Event Time Stamp: This element carries the lower 32-bits of the System Time when the specified event occurred. The units are expressed in nanoseconds. The Event Time Stamp can be combined with the upper 32-bits of system time at the controller to produce an absolute 64-bit event time stamp.

1.3.4 SERVICE DATA BLOCK

The service data block allows one service response per instance to be sent to the controller in a given update. Each service request requires a specific service response from the drive indicating success or an error. In some cases the response service contains requested data. In any case, the service response data persists in the Drive-to-Controller Connection data structure until the drive sees the associated service request removed from the Controller-to-Drive connection instance data block (Service Block Size = 0) or a new service request is issued by the controller (incremented Transaction ID).

Each service response is represented by a block of data organized as shown below.

Like the request structure, the structure of the service response may not follow the traditional CIP standard messaging format. That is primarily because this connection structure is, fundamentally, a CIP Implicit I/O connection, not an Explicit Messaging connection. However, the case of a Fixed Connection format, the Service Specific Request Data defined below is sent via an Explicit Messaging connection and follows the CIP rules for explicit service request format.

Figure 1-21 — Service Data Block

| Service Data Block | | | |
|---|---|---|---|
| Transaction ID | Service Code | Response Code | Ext Response Code |
| Service Specific Response Data ||||

- Transaction ID: Transaction number assigned to this service response derived from the Transaction ID of the original request. Each service request is assigned a new Transaction ID by incrementing the current Transaction ID stored in the controller. Using the Transaction ID in the response, the controller is able to match the service response to the appropriate service request.

- Service Code: Identifier that determines the specific service response that follows which should match the Service code of the originating service request. A list of valid Service Codes for the CIP Drive Axis Object is given in the Controller-to-Drive section.

- Response Code: The Response Code value is provided to indicate success or failure of the requested service request. A Response Code of 0 indicates success, while a non-zero value indicates an error. The Response Code values comply follow the CIP Common standard for General Status codes.

- Extended Response Code: The Extended Response Code provides a method for defining vendor specific or service specific error codes. There is currently no standard definition for these codes.

- Service Specific Response Data: The format and syntax of the Service Specific Response Data depends on the specified Service Code.

1.4 FIXED DRIVE CONNECTION FORMAT

By specifying a Fixed Connection Format, the CIP Motion Drive Connection can be reduced to a size that is readily applicable to lower-performance CIP Networks like DeviceNet and ControlNet. In the context of a DeviceNet or ControlNet network the following features have been removed from the connection structure to support the requirements of a fixed connection size and limited network bandwidth.

- Time Stamping
- Node Faults/Alarms
- One Instance Only
- Dynamic Block Sizing
- Cyclic Read/Write Data Block
- Event Data Block
- Service Data Block Service requests to the Drive Axis Object are supported only as an Explicit Messaging service.

Figure 1-22 — Fixed Controller to Drive Connection Format (fixed size = 16 bytes)

| | Controller to Drive Connection Structure |||
|---|---|---|---|
| Connection Format | Format Revision | Update ID | Node Control |
| Control Mode | Feedback Config | Drive Control | - |
| Command Data Set | Actual Data Set | Status Data Set | Interpolation Control |
| Command Velocity ||||

Figure 1-23 — Fixed Drive to Controller Connection Format (fixed size = 16 bytes)

| | Drive to Controller Connection Structure |||
|---|---|---|---|
| Connection Format | Format Revision | Update ID | Node Status |
| Control Mode | Feedback Config | Drive Response | Response Code |
| Command Data Set | Actual Data Set | Status Data Set | Interpolation Status |
| Actual Velocity ||||

1.4.1 DRIVE-TO-CONTROLLER CONNECTION TIMING

When in synchronous mode, the CIP Motion Drive-to-Controller connection includes a Drive Time Stamp with the actual data to allow the controller to determine the position of the drive axis at the time the Controller Task update occurs. Time stamping allows the drive to sample feedback and compute actual data values based on its own Drive Update Period that, unlike other motion control network protocols, does not need be strictly related to the Controller Update Period. The diagram of Fig. 17 illustrates how actual data and time stamps delivered by the Drive-to-Controller connection are used to adjust drive axis actual position to the controller's timebase.

The following steps describe in detail how connection data is transferred from the controller to the drive during a typical connection cycle in the general case where the Controller Update Period (CUP) is not an integer multiple of the drive update period.

1. Actual Update Window Check: If the axis is synchronized, the drive compares current Drive Task time stamp with the Actual Update Window that is determined during the last command data update. The Actual Update Window has duration of 1 Drive Update Period and ends at the computed time of the next Controller Update. If the time stamp is within the time window, this is an actual data update cycle. If the time stamp is before the window, then the drive must wait for a subsequent drive task to send the actual data to the controller. (This prevents a condition where there is excessive time between the feedback capture and the start of the next Controller Task.) If the axis is not synchronized and we have just received a command update via the Controller-to-Drive Connection, then this is also an actual update cycle, so move on to the Drive Transmit step. Otherwise, there is nothing to be done and we are done with this task.
2. Drive Transmit: If this is an actual update cycle, then the drive sends the Drive-to-Controller Connection packet to the controller with the latest actual data from this Drive Task, including the current drive update Time Stamp, and an incremented Update ID. All additional data sent to the controller in this packet may be derived from the previous Drive Task. This allows the drive transmission to occur at the earliest point in the Drive Task execution.
3. Actual Update ID Check: In the next Controller Task, the controller checks for new data from the drive by checking for a changed Update ID. The following steps are performed regardless of whether on not the Update ID has changed. Note that the Update ID is the only way to detect for new actual data when the drive is not synchronized.
4. Sync Flag Check: Drive checks the Synchronized bit of the Drive Node Control byte to determine if the drive axis is synchronized. If not, skip to the Apply Actual Data step to avoid Late Update checking and Time-Stamp Correction. Bypassing these subsequent steps allows the drive to operate during start-up or even in the case where the drive does not have any time synchronization services.
5. Late Update Check: The controller computes the difference between the current Connection Update Period time stamp and the Time Stamp in the Drive-to-Controller Connection packet. If the difference is greater than Missed Update Tolerance * Update Period, the controller throws a Controller Sync Fault.
6. Time-Stamp Correction: If the previously computed time difference is non-zero, then extrapolate the actual data value based on previous axis actual trajectory to line up with the controller's time stamp. This correction is necessary because the motion planner assumes that actual input is implicitly time stamped to the beginning of the Controller Update Period.
7. Apply Actual Data: Controller applies actual data as inputs to the motion planner, which computes new command reference data.

1.5 CIP MOTION PEER CONNECTION

The following section is a description of the CIP Motion Peer Connection format that includes the Drive-to-Drive Peer Connection that is applicable to the Drive Axis Object.

1.5.1 PEER CONNECTION FEATURES

The following is a list of features associated with the CIP Motion Peer Connection:

1. The proposal effectively addresses the requirements of the dominant use cases for a peer-to-peer connection, which are line shafting applications where multiple axes are gearing or camming off a common master axis, and torque follower applications where the commanded torque of a master drive is distributed to multiple slave drives in an effort to share the load.
2. Follows the Monitor Only philosophy; the consumers can only monitor the status of the produced axis and cannot affect the state or motion of the produced axis.
3. Applicable to star or daisy-chain network topologies using a unidirectional multicast producer-to-consumer connection.
4. Ability to pass event notification data associated with the produced axis to the consumers to address use case where master checks for registration events and produces the registration event info to downstream slaves for phase correction.
5. Ability to configure the produced axis to produce additional application specific attributes to the consumers. The identity of these produced attributes is defined as part of the connection data structure so there is no ambiguity as to what consumed axis attribute the produced attribute data maps to. An array transfer mechanism is also supported.
6. The producer's real-time data format is built into the CIP Motion Peer Connection data structure to allow the consumers to determine the contents of the produced data, which allows the data structure to be changed at any time.
7. Since consumers may want to consume different real-time data from a single producer, the CIP Motion Peer Connection is designed to provide a configurable combination of real-time data elements. Individual consumers are responsible for determining which real-data elements they are to consume.
8. Real-time connection data is time stamped based on System Time, typically derived from PTP (Precision Time Protocol) with nanosecond resolution and ~1 sec dynamic range.
9. Connection supports the possibility of different peer update rates and sample delays for position, velocity, and torque data, as well as phase offsets within a peer device. Time stamps and/or delays are associated with individual axis instances.
10. Ability to operate reliably in the presence of significant HMI, I/O, messaging, and other Ethernet traffic that use standard Ethernet transport protocols (e.g. TCP and UDP).
11. Ability to add or remove Ethernet nodes during runtime without adversely impacting the operation of the CIP Motion Peer Connection to existing nodes. (Network topology dependent).

12. Ability to add or remove CIP Motion consumers while on-line without disrupting operation. (Network topology dependent).
13. Connection format revision built-in to facilitate backward compatibility with existing peer devices and earlier versions of the CIP Motion Peer Connection data structure.
14. Connection format is organized such that 32-bit words are 32-bit aligned and 16-bit words are 16-bit aligned. This facilitates easy memory access.

1.5.2 CIP MOTION PEER CONNECTION FORMAT

Figure 1–24 — CIP Motion Peer Connection Format

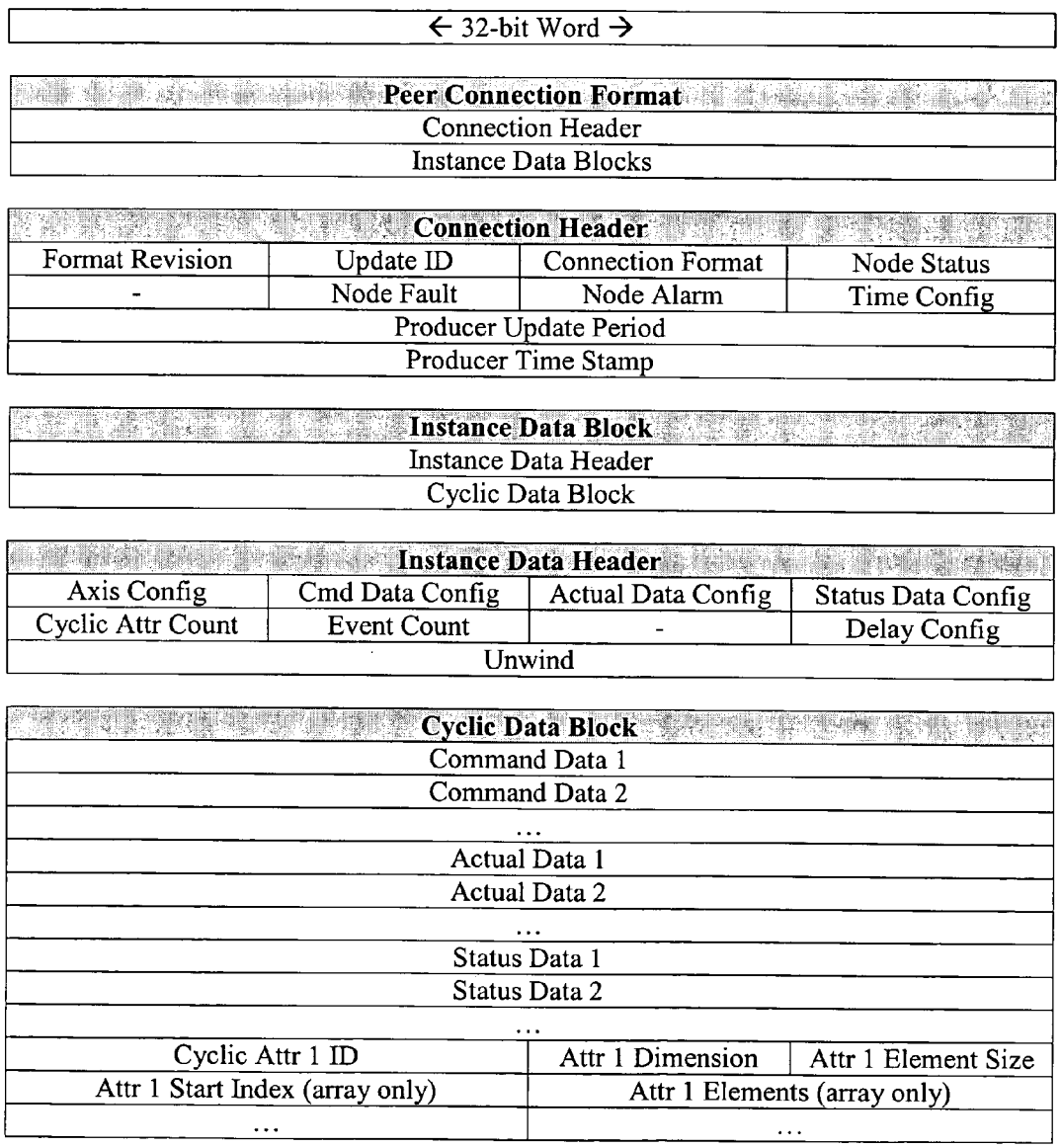

| 101 | | | 102 |
|---|---|---|---|
| Cyclic Attr 1 Data ||||
| ... ||||
| Event ID | Event Status | Event Type | Input Instance |
| Event Position ||||
| Event Time Stamp ||||
| ... ||||

1.5.3 PEER CONNECTION FORMAT OVERVIEW

The CIP Motion Peer Connection Format consists of a general header followed by a block of data associated with a produced axis instance. The content of the data block is periodically updated and sent to the consumers via a multicast connection at the specified Controller Update Period of the producer. This update is synchronized with other peer devices in the motion control system through use of distributed System Time, e.g. PTP. Since a Time Stamp is included in the connection data, the Producer Update Period does not need to have any fixed relationship with the update periods of the various consumers.

In the context of discussion that follows it is important to know that while peer producers and consumers can be either controllers or drives, in the case of the Drive Axis Object specification, only the drive peer-to-peer functionality is truly applicable.

To facilitate a detailed description of each of its constituent data elements, the CIP Motion Peer Connection data block is organized as follows:

Figure 1–25 — Peer Connection Format

| Peer Connection Format |
| --- |
| Connection Header |
| Instance Data Blocks |

1.5.4 CONNECTION HEADER

The Connection Header contains critical axis configuration information from the producer that is needed to parse the Instance Data Blocks.

Figure 1–26 — Connection Header

| Connection Header | | | |
| --- | --- | --- | --- |
| Format Revision | Update ID | Connection Format | Node Status |

- Format Revision: With an initial release of 1, this value is incremented by 1 for every revision of the CIP Motion Peer Connection Format that impacts the interface. The Format Revision allows newer consumers to support the connection formats generated by older producers. It also allows older consumers to recognize a newer connection format from a producer that it cannot support and generate an appropriate error.

- Update ID: This cyclic transaction number is incremented every update of the producer. The Update ID is used by the consuming control or drive to determine whether the data block contains fresh data. If the Update ID has not changed, a regular occurrence when the update period of the producer axis is longer than that of the consumer axis, the consuming control or drive can extrapolate through the lack of new data based on previous produced axis trajectory. In the case where the producer is not synchronized, the time stamp data is either not included or is invalid. In such a case, the Update ID is the only way for the consumer to detect the presence of new data. Operation of the CIP Motion Peer Connection without synchronization or time stamping is not recommended.

- Connection Format: This enumerated byte determines what the format of CIP Motion connection is according to the following definition:

Figure 1-27 — Connection Format

| (Reserved) | Connection Type |

Connection Type: This 4-bit enumeration defines the CIP Motion connection type. Valid values for this connection are 1 for the Fixed Drive Peer-to-Peer Connection and 5 for the Variable Drive Peer-to-Peer Connection.

0 = Fixed Controller Peer-to-Peer Connection
1 = Fixed Drive Peer-to-Peer Connection
2 = Fixed Controller-to-Drive Connection
3 = Fixed Drive-to-Controller Connection
4 = Variable Controller Peer-to-Peer Connection
5 = Variable Drive Peer-to-Peer Connection
6 = Variable Controller-to-Drive Connection
7 = Variable Drive-to-Controller Connection
8-15 = Reserved.

- Node Status: Contains bits used to indicate the status of the associated drive communications node.

Table 1-17 — Node Status

| Bit | Definition | Syntax |
|---|---|---|
| 0 | (reserved) | - |
| 1 | Synchronization Mode | 0 = asynchronous mode<br>1 = synchronous mode |
| 2 | Drive Data Valid | 0 = instance data invalid<br>1 = process instance data |
| 3 | Drive Node Fault | 0 = no node fault condition<br>1 = node fault condition |
| 4-5 | (Reserved) | |
| 6-7 | (Vendor Specific) | |

The Synchronization Mode bit indicates whether or not the producing drive node is synchronized. Synchronous operation is defined as having the producing drive node's local timer synchronized with System Time and that valid connection time stamps are being supplied in the connection header. The bit shall remain set for the duration of synchronous operation. If the Synchronization Mode bit is clear the drive is said to be in Asynchronous mode. In Asynchronous mode, there is no requirement for the local timer to be synchronized nor is time-stamping necessary or even valid.

The Drive Data Valid bit must be set for the controller to process the instance data blocks from the drive node. During the connection initialization sequence there may be a period of time where the connection data in the instance data blocks may not valid. This condition can be recognized by the consuming drive node by first checking this bit.

The Drive Node Fault bit is used to indicate that the producing drive has detected one or more fault conditions related to the communications node. Specific fault conditions can be determined by the Node Fault attribute. If this bit is clear, there are no fault conditions present. The Drive Node Fault bit may be cleared by setting the Node Fault Reset bit in the Node Control word. All associated axes are disabled when a Node Fault condition is present.

1.5.4.1 FIXED CONNECTION HEADER

If the Connection Format is a Fixed Peer-to-Peer Connection the above header is immediately followed by the instance data block.

1.5.4.2 VARIABLE CONNECTION HEADER

If the Connection Format is a Variable Peer-to-Peer Connection then the connection header contains additional fields related to node diagnostics and time stamping.

Figure 1–28 — Connection Header

| Connection Header | | | |
|---|---|---|---|
| Connection Format | Format Revision | Update ID | Node Control |
| - | Node Fault | Node Alarm | Time Config |
| Producer Update Period ||||
| Producer Time Stamp ||||

- Time Stamp Configuration: This bit-mapped byte contains flags that determine the usage and format of the producer's timing information.

Table 1-18 — Time Configuration

| Bit | Definition | Syntax |
|---|---|---|

| 0 | Update Period | 0 = no update period<br>1 = update period included |
|---|---|---|
| 1 | Time Stamp | 0 = no time stamp<br>1 = time stamp included |
| 2-7 | (Reserved) | |

- Producer Update Period: This element specifies the update period of the produced axis data in nanoseconds. This value is used by the consumer to determine if the consumer has missed too many connection updates. If the connection is synchronized, the consumer can simply check the Producer Time Stamp against the consumer's own local time stamp. If the difference between the two time stamps exceeds the maximum value given by, Max Delay = Peer Update Delay High Limit * Producer Update Period, the Peer Update Fault bit is set in the Node Faults class attribute of the Drive Axis Object. An optional Peer Update Delay Low Limit attribute is also available. If the difference between the last Producer Time Stamp and the current local drive time stamp exceeds the maximum value given by, Max Delay = Peer Update Delay Low Limit * Producer Update Period, the Peer Update Alarm bit is set in the Node Alarm class attribute of the Drive Axis Object. In the case where the connection is not synchronized, no late update checks are performed by the consumer.

- Producer Time Stamp: This element carries the lower 32-bits of the 64-bit System Time value when the producer's update timer event occurred. This value is restored to its original 64-bit representation by the consumer using the upper 32-bits of consumer's local System Time value. The units for the Producer Time Stamp are in nanoseconds. This value is effectively the time when the produced axis' actual data (e.g. position feedback) was sampled or the command data was calculated. Using this value in conjunction with the consumer's own time stamp when it received the produced data, the consumer can extrapolate the producer's current actual and command position.

1.5.5 INSTANCE DATA BLOCKS

Following the Connection Header comes the Instance Data Block with its own, format defining, Instance Data Header. The Instance Data Block with the following basic structure:

Figure 1-29 — Instance Data Block

| Instance Data Block |
|---|
| Instance Data Header |
| Cyclic Data Block |

1.5.6 INSTANCE DATA HEADER

The Instance Header, shown below, contains a complete description of the cyclic data to follow.

Figure 1-30 — Instance Data Header

| Instance Data Header ||||
|---|---|---|---|
| Axis Config | Cmd Data Config | Actual Data Config | Status Data Config |
| Cyclic Attr Count | Event Count | - | Delay Control |
| Unwind ||||

- Axis Configuration: The byte contains flags to indicate the configuration data included in the produced axis header according to the table shown below.

Table 1-19 — Axis Configuration

| Bit | Definition | Syntax |
|---|---|---|
| 0 | Rotary - This flag is used by the consumer to determine if it is necessary to unwind the extrapolated remote actual and command position values using the Unwind value before storing in the consumer's axis object. This flag is not applicable to Drive-to-Drive Peer connections. | 0 = linear<br>1 = rotary |
| 1-7 | (Reserved) | |

- Command Data Configuration: This bit mapped value has a bit defined for each possible real-time command reference. Command data appears in the same order as the bit numbers, so Command Position would appear before Command Torque in the real-time data structure. Consuming devices can determine which real-time data elements to consume by comparing the producer's passed Command Data Configuration to its own Command Data Configuration attribute that is contained in the consumer's axis object.

Table 1-20 — Command Data Configuration

| Bit | Command Data Element Produced |
|---|---|
| 0 | Command Position |
| 1 | Command Velocity |
| 2 | Command Acceleration |

| 3 | Command Torque |
|---|---|
| 4-7 | (Reserved) |

- Actual Data Configuration: This bit mapped value has a bit defined for each possible real-time actual values. Actual data appears in the same order as the bit numbers, so Actual Position would appear before Actual Torque in the real-time data structure. Consuming devices can determine which real-time data elements to consume by comparing the producer's passed Actual Data Configuration to its own Actual Data Configuration attribute that is contained in the consumer's axis object.

Table 1-21 — Actual Data Configuration

| Bit | Actual Data Element Produced |
|---|---|
| 0 | Actual Position |
| 1 | Actual Velocity |
| 2 | Actual Acceleration |
| 3 | Actual Torque |
| 4-7 | (Reserved) |

- Status Configuration: This bit mapped value has a bit defined for each of the basic axis status attributes that can be passed as part of the CIP Peer Connection data structure. Status Data is not transferred as part of the Drive-to-Drive Peer Connection so this value is always zero.

Table 1-22 — Status Data Configuration

| Bit | Status Data Element Produced |
|---|---|
| 0 | Axis Status |
| 1 | Alarm Status |
| 2 | Fault Status |
| 3 | Motion Status |
| 4 | Event Status |
| 5-7 | (Reserved) |

- Cyclic Attribute Count: The number of Cyclic Attribute blocks contained Cyclic Attribute Data Set.

- Event Count: The number of Event blocks contained in the Event Data Block. Events are not applicable to Drive-to-Drive Peer Connections.

- Delay Control: The byte contains information needed to control the fine interpolation algorithm and determine the target time of the command data to the drive control structure.

Table 1-23 — Interpolation Control

| Bit | Definition | Syntax |
|---|---|---|
| 0-1 | Command Target Time | # of Producer Update Periods |
| 2-3 | Master Command Delay | # of Producer Update Periods |
| 3-5 | (reserved) | |
| 6-7 | (vendor specific) | |

Command Target Time - This 2-bit integer defines a specific time relative to the Producer Time Stamp that the Command Data is targeted for, as defined by the producer's motion planner. The absolute command target time is the sum of the Producer Time Stamp from the producing drive and the product, Command Target Time * Producer Update Period. This value is used by the Update Delay Compensation algorithm associated with gearing or camming that references the produced axis as a master.

> A Command Target Time of 0 implies that the Command Data is targeted for the beginning of the current update cycle and, thus, needs to be applied to the control structure immediately. In this case there is no need for any find interpolation. This situation can occur when the Producer Update Period is significantly shorter than the Consumer Update Period, or when the controlled motion of the axis is nearly constant during the span of the Producer Update Period.

> A Command Target Time of 1 implies the target for the Command Data is the next Producer Update timer event. In this case, the command interpolator functions primarily as an extrapolator that estimates the next Command Data value based on the present trajectory of the axis. This is a typical setting when the Producer Update Period is comparable to the Consumer Update Period or when the controlled motion of the axis is relatively constant during the span of the Producer Update Period.

> A Command Target Time of 2 implies the target for the Command Data is two Connection Update timer events from the Producer Time Stamp. In this case, the command interpolator can compute a smooth trajectory based on the current dynamics of the motor to reach the Command Data value at the targeted time.

This is true fine interpolation and is applicable when the Producer Update Period is significantly larger than the Consumer Update Period.

Master Command Delay - This 2-bit integer defines how many Producer Update Periods that the Command Data is delayed in the producing drive before application to the local control structure, as defined by the producer's motion planner. This value is used to determine the amount of extrapolation that needs to be applied to the producer's command data value when received by the consumer. The Master Command Delay is added to the Producer's Time Stamp before comparing with the Consumer's time stamp. When the Producer Update Period is comparable to the Consumer Update Period, a value of 1 for the Master Command Delay minimizes the amount of extrapolation applied to the produced command data.

- Unwind: Should the Rotary bit be set in the Axis Configuration byte, the producer's configured Unwind value (32-bit UINT) is added to the Instance Format Header. This value, if applicable, is used by the consumer to unwind the extrapolated absolute Actual or Command Position data. This value is not applicable to the drive-to-drive Peer Connection.

1.5.7 CYCLIC DATA BLOCK

The Cyclic Data Block is the main data payload of the CIP Motion Peer Connection data structure. It is organized into six different sets of data.

Figure 1-31 — Cyclic Data Block

| Cyclic Data Block |
|---|
| Command Data Set |
| Actual Data Set |
| Status Data Set |
| Attribute Data Set |

1.5.7.1 COMMAND DATA SET

This data set contains elements related to the producer's command reference data. The mapping of these data elements to object attributes of the producer and consumer depends on the peer connection type, i.e. a Controller Peer-to-Peer Connection or a Drive Peer-to-Peer Connection. The tables below define the mapping for each peer connection type.

Table 1-24 — Drive-to-Drive Command Data Set Element Mapping

| Command Data Element | Data Type | Producing Drive Object Attribute | Consuming Drive Object Attribute |
|---|---|---|---|
| Command Position | LINT | Position Command | Peer Cmd. Position |
| Command Velocity | REAL | Velocity Command | Peer Cmd. Velocity |

| Command Acceleration | REAL | Acceleration Command | Peer Cmd. Acceleration |
|---|---|---|---|
| Command Torque | REAL | Torque Command | Peer Cmd. Torque |

Table 1-25 — Controller-to-Controller Command Data Set Element Mapping

| Command Data Element | Data Type | Producing Controller Object Attribute | Consuming Controller Object Attribute |
|---|---|---|---|
| Command Position | LINT | Command Position | Command Position |
| Command Velocity | REAL | Command Velocity | Command Velocity |
| Command Acceleration | REAL | Command Acceleration | Command Acceleration |
| Command Torque | REAL | Command Torque | Command Torque |

Notice the mapped names are identical for the C-to-C case but not for the D-to-D case. That is primarily because in the controller we dedicate an axis instance to the consumed data, so it is an "image" of the produced axis. In the drive we are bringing in the produced data directly into the primary drive axis instance as separate signals.

Here is a summary of the individual command data elements:

- Command Position: This element contains the producer's absolute command position in counts. The consumer uses this value to determine the change in command position (delta command position) since the last update. This information is used when gearing or camming to a consumed axis' command position. The delta command position is given by, Delta Command Pos = Command Position − Last Command Position.

- Command Velocity: This element contains the producer's command velocity in counts/sec.

- Command Acceleration: This element contains the producer's commanded acceleration in counts/sec$^2$.

- Command Torque: This element contains the producer's commanded torque in % Rated Torque.

1.5.7.2 ACTUAL DATA SET

This data set contains elements related to the producer's command reference data. The mapping of these data elements to object attributes of the producer and consumer depends on the peer connection type, i.e. a Controller Peer-to-Peer Connection or a Drive Peer-to-Peer Connection. The tables below define the mapping for each peer connection type.

Table 1-26 — Drive-to-Drive Actual Data Set Element Mapping

| Actual Data Element | Data Type | Producing Drive Object Attribute | Consuming Drive Object Attribute |
|---|---|---|---|
| Actual Position | LINT | Position Feedback | Peer Cmd. Position |
| Actual Velocity | REAL | Velocity Feedback | Peer Cmd. Velocity |
| Actual Acceleration | REAL | Acceleration Feedback | Peer Cmd. Acceleration |
| Actual Torque | REAL | Torque Reference | Peer Cmd. Torque |

- Actual Position: This element contains the producer's absolute actual position in counts. The consumer also uses this value to determine the change in actual position (delta actual position) since the last update. This information is used when gearing or camming to a consumed axis' actual position. The delta actual position is given by, Delta Actual Pos = Actual Position – Last Actual Position.

- Actual Velocity: This element contains the producer's actual velocity in counts/sec.

- Actual Acceleration: This element contains the producer's actual acceleration in counts/sec$^2$.

- Actual Torque: This element contains the producer's actual torque in % Rated Torque.

1.5.7.3 STATUS DATA SET

The Status Data Set contains Status Data values of the produced axes as determined by the Status Configuration byte in the Instance Data Header and defined in the Controller Axis Object (a.k.a., the Motion Axis Object). Currently supported attributes are Axis Status, Fault Status, and Motion Status. The Status Data Set is not applicable to the Drive-to-Drive Peer connection.

1.5.7.4 ATTRIBUTE DATA SET

The Attribute Data Set can be used to cyclically update targeted CIP Motion object attributes with the current value of corresponding attributes in the producer. If the attribute is not supported by a given consumer, the data block is simply ignored. The Attribute Count specified in the Connection Header determines the number of produced attributes in the set. Each attribute passed has the structure shown below:

Figure 1-32 — Attribute Data Block

| Attribute Data Block | | |
|---|---|---|
| Attr ID | Attr Dimension | Attr Element Size |
| Attr Start Index 1 (array only) | Attr Data Elements 1 (array only) | |
| ... | ... | |
| Attr Data | | |
| ... | | |

- Attr ID – identifies the specific producing axis status attribute whose value is to be included in the Extended Data Block.

- Attr Dimension – determines the dimension of the attribute array. A dimension of zero means the attribute is a singular data element and, therefore, not really an array at all. Multidimensional arrays (dimension > 1) are supported by adding additional Attr Start Index and Addr Data Elements values prior to the Attr Data sequence.

- Attr Element Size – determines the size, in bytes, of the produced attribute data element.

- Attr Start Index – identifies the starting index for the array of attribute values in the Attr Data section. This field is only present when the attribute data type is an array (i.e., dimension > 0).

- Attr Data Elements – determines the number of data element values in the Attr Data section. This field is only present when the attribute data type is an array (i.e., dimension > 0).

- Attr Data – represent the produced value that is to be applied to the consumed motion axis object attribute given by the Attr ID. If the attribute is an array, the new values are applied according to the Start Index and the number of Data Elements. For multidimensional arrays (dimension > 1), the sequence of data move sequentially through the indices from left to right. For example, Figure 1-33 — Attribute Data Block – Array Example

| Attribute Data Block – Array Example | | |
|---|---|---|
| Attr ID = 27 | Attr Dimension = 2 | Attr Elem Size = 4 |
| Attr Start Index 1 = 0 | Attr Data Elements 1 = 2 | |
| Attr Start Index 2 = 2 | Attr Data Elements 2 = 3 | |
| Attr Data (0, 2) = ? | | |
| Attr Data (1, 2) = ? | | |

| Attr Data (0, 3) = ? |
|---|
| Attr Data (1, 3) = ? |
| Attr Data (0, 4) = ? |
| Attr Data (1, 4) = ? |

This array passing mechanism is particularly useful for applications requiring real-time access to a specific producer attribute that is not included in the standard command or actual data sets.

1.5.8 DRIVE-TO-DRIVE PEER CONNECTION TIMING

When in synchronous mode, the CIP Motion Drive-to-Drive connection includes a Drive Time Stamp with the produced data to allow the controller to determine the command or actual data value of the drive axis at the time the Controller Task update occurs. Time stamping allows the drive to sample feedback and compute actual data values based on its own Drive Update Period that, unlike other motion control network protocols, does not need be strictly related to the Producer's Update Period. The diagram of Fig. 18 illustrates how actual data and time stamps delivered by the Drive-to-Drive Peer connection are used to adjust drive axis actual position to the controller's timebase.

In this example, the master axis position is captured by the producing drive and sent to one or more consuming drives via the multicast CIP Motion Peer Drive-to-Drive Connection in, say, a line-shafting application. When the master actual position is consumed by another drive, extrapolation is done by the consumer to compensate for the delay incurred over the connection. This is done by using the producer's Time Stamp, Tpro, associated with actual data element being consumed and the consumer's Time Stamp, Tcon, latched by the consuming controller. Once corrected for the peer connection delay, the remote slave axis associated with the consuming drive can be precisely phased relative to the master axis through electronic gearing. This method even works when the consuming and producing drives are running at different update rates. In fact, a careful examination of the method reveals that the consuming drive's update period can be more or less than the producing drive as long as they both operate off distributed System Time.

In the diagram of Fig. 19, the producing drive is distributing command position, rather than actual position, to multiple consuming drives. When the master command position is consumed by another drive, extrapolation is done by the consumer to compensate for the delay incurred over the connection. Again, this is done by using the producer's Time Stamp, Tpro, associated with actual data element being consumed and the consumer's Time Stamp, Tcon, latched by the consuming controller. Once corrected for the peer connection delay, the remote slave axis associated with the consuming drive can be precisely phased relative to the master axis through electronic gearing.

Alternatively, the producing drive can be configured to delay the application of the local master command position reference by one Producer Update Period, Tmcd, which represents the Master Command Delay. This minimizes the amount of extrapolation that is required to compensate for the delay incurred over the peer connection. In the example in Fig. 20, the Master Command Delay is 250 usec. Since the consuming drive's update period is also 250 usec, the net extrapolation time is 0. This results in the smoothest possible gearing performance.

What is claimed is:

1. A system that enables controlling motion over a network, comprising:
   an interface that receives motion control data that includes a time stamp from the network during a connection cycle, the connection cycle includes a drive update period which is not an integer multiple of a controller update period (CUP); and
   a motion control component that utilizes the received motion control data to update properties associated with the motion control component within the drive update period or the CUP, based at least in part on the time stamp.

2. The system of claim 1, the interface transmits disparate motion control data that includes a disparate time stamp to a disparate motion control component via the network.

3. The system of claim 1, the motion control component is a controller.

4. The system of claim 1, the motion control component is a control axis object.

5. The system of claim 1, the motion control component is a drive.

6. The system of claim 1, the motion control component is a drive axis object.

7. The system of claim 1, the motion control data is command data that is transmitted from a controller to a drive.

8. The system of claim 7, the time stamp associated with the command data relates to a time that modifications to the motion control component are effectuated.

9. The system of claim 1, the motion control data is actual data that is transmitted from a drive to a controller.

10. The system of claim 9, the time stamp associated with the actual data relates to a time that the actual data is measured.

11. The system of claim 1, the motion control component further comprises a clock that is synchronized with disparate clocks associated with disparate motion control components located on the network.

12. The system of claim 11, the clock is synchronized utilizing IEEE 1588 precision time protocol.

13. The system of claim 1, the motion control component modifies commands to conform to the motion control data at a time associated with the time stamp.

14. The system of claim 1, the motion control component analyzes the motion control data to generate commands that are to be utilized by a disparate motion control component.

15. The system of claim 1, the motion control component measures data, incorporates a time stamp associated with a current time that the data is measured, and transmits the data as motion control data to a disparate motion control component.

16. The system of claim 1, the motion control component further comprises a time stamp component that enables at least one of incorporating a time stamp into data that is generated for transfer over the network via the interface or evaluating the received motion control data to identify a time associated with the time stamp.

17. The system of claim 1, the motion control component further comprises a cycle timing component that identifies a particular interval of a motion control update cycle.

18. The system of claim 17, the cycle timing component identifies at least one of an input transfer interval during which motion control data is transferred from a drive to a controller, a calculation interval during which motion control data is not transferred via the network, or an output transfer interval during which motion control data is transferred from the controller to the drive.

19. The system of claim 18, wherein the interface at least one of transmits or receives non-motion related data via the network during the calculation interval.

20. The system of claim 1, the motion control component further comprises a dynamic data generator that produces data structures of at least one of varying size or varying content, and incorporates a description of the data structures into the data structures.

21. The system of claim 1, the motion control component further comprises a data format evaluator that determines at least one of a size or content associated with the motion control data that is associated with a dynamic data structure.

22. The system of claim 1, the motion control component further comprises a node population component that at least one of adds a node to the network or removes a node from the network during runtime.

23. The system of claim 1, further comprising a data adjustment component that at least one of interpolates or extrapolates the motion control data to a current time based at least in part upon the time stamp.

24. The system of claim 1, the motion control component is associated with an update period that is different from that of a disparate motion control component.

25. The system of claim 1, the network includes at least one of Ethernet, ControlNet, or DeviceNet.

26. A system that enables controlling motion in an industrial automation environment, comprising:
   a controller that generates command data, which includes a time stamp associated with a time to effectuate modifications, during a controller update period (CUP) and transmits the command data over a network; and
   a drive that receives the command data and modifies associated commands based on the command data at a time that corresponds with the time stamp, within a drive update period,
   wherein the drive update period is not an integer multiple of the CUP.

27. The system of claim 26, the drive further measures actual data, includes a time stamp in the actual data associated with a time the measurement was taken, and transmits the actual data to the controller over the network.

28. The system of claim 27, the controller further generates the command data based at least in part on the actual data.

29. The system of claim 27, the actual data is at least one of actual primary position, actual secondary position, actual velocity, actual acceleration, actual torque, actual current, actual voltage, or actual frequency.

30. The system of claim 26, further comprising M additional controllers that communicate via the network, where M is a positive integer.

31. The system of claim 26, further comprising N additional drives that communicate via the network, where N is a positive integer.

32. The system of claim 26, the controller communicates with a disparate controller via a peer-to-peer connection.

33. The system of claim 26, the drive communicates with a disparate drive via a peer-to-peer connection.

34. A method that facilitates controlling motion over a network in an industrial automation environment, comprising:
   incorporating a time stamp with motion related data;
   transmitting the motion related data with the time stamp over a network, during a first update period, to a motion control component that employs a second update period, wherein the first update period is different from an integer multiple of the second update period;

receiving disparate motion related data with a disparate time stamp from the motion control component; and updating a receiving node based on the disparate motion related data with the disparate time stamp.

35. The method of claim 34, further comprising identifying an interval during which to transmit the motion related data with the time stamp.

36. The method of claim 35, further comprising transmitting the motion related data from a drive to a controller when the identified interval is an input transfer interval.

37. The method of claim 35, further comprising transmitting the motion related data from a controller to a drive when the identified interval is an output transfer interval.

38. The method of claim 35, further comprising inhibiting transmission of motion related data when the identified interval is a calculation interval.

39. The method of claim 34, further comprising:
generating dynamic motion related data which has a time stamp included and is to be transmitted and received; and determining a format of the dynamic motion related data with the time stamp to facilitate unpackaging the dynamic motion related data.

40. The method of claim 34, updating the receiving node comprises at least one of:

varying operation of a drive by modifying associated commands; or generating new commands via utilizing a controller.

41. The method of claim 34, further comprising synchronizing a clock with disparate nodes in the network.

42. The method of claim 34, further comprising at least one of:

adding a node after the network has been configured without reconfiguring the network; or removing a node after the network has been configured without reconfiguring the network.

43. The method of claim 34, further comprising prioritizing the motion related data with respect to non-motion related data transmitted via the network.

44. A method that enables controlling motion over a network, comprising:

receiving motion control data that includes a time stamp from the network from a component employing a first update period; and employing the received motion control data to update properties associated with the motion control component based at least in part on the time stamp, within a second update period, wherein the first update period is disparate from an integer multiple of the second update period.

* * * * *